US006769063B1

(12) United States Patent
Kanda et al.

(10) Patent No.: US 6,769,063 B1
(45) Date of Patent: Jul. 27, 2004

(54) DATA CONVERTER AND RECORDING MEDIUM ON WHICH PROGRAM FOR EXECUTING DATA CONVERSION IS RECORDED

(75) Inventors: Masayuki Kanda, Tokyo (JP); Youichi Takashima, Tokyo (JP); Kazumaro Aoki, Tokyo (JP); Hiroki Ueda, Tokyo (JP); Kazuo Ohta, Tokyo (JP); Tsutomu Matsumoto, Yokohama (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/600,955

(22) PCT Filed: Jan. 27, 1999

(86) PCT No.: PCT/JP99/00337

§ 371 (c)(1),
(2), (4) Date: Sep. 14, 2000

(87) PCT Pub. No.: WO99/38143

PCT Pub. Date: Jul. 29, 1999

(30) Foreign Application Priority Data

Jan. 27, 1998  (JP) .......................... 10/013572
Jan. 27, 1998  (JP) .......................... 10/013573
May 28, 1998  (JP) .......................... 10/147479

(51) Int. Cl.$^7$ .......................... H04K 1/00; H04L 9/00; G09C 1/00

(52) U.S. Cl. .......................... 713/193; 380/29

(58) Field of Search .......................... 380/37, 29

(56) References Cited

U.S. PATENT DOCUMENTS 4,850,019 A    7/1989  Shimizu et al.

FOREIGN PATENT DOCUMENTS

EP    0 719 007 A    6/1996

OTHER PUBLICATIONS

M. Kanda, et al, A New 128–bit Block Cipher E2, Technical Report of IEICE, vol. 98, No. 227, (Sep. 30, 1998), p. 13–24 (ISEC98–12).
M. Kanda, et al. A round function structure consisting of few S–boxes (Part II), The 1998 Symposium on Cyptography and Information Security, (Jan. 28, 1998), 2.2.D, (in Japanese).
M. Kanda, et al., A round function structure consisting of few s–boxes (Part III), Technical Report of IEICE, vol. 98, No. 48, (May 15, 1998), p. 21–30 (ISEC98–3) (in Japanese).

(List continued on next page.)

*Primary Examiner*—Gregory Morse
*Assistant Examiner*—Minh Dieu Nguyen
(74) *Attorney, Agent, or Firm*—Connolly, Bove, Lodge & Hutz, LLP

(57) ABSTRACT

A plurality of round processing parts (38) are provided each of which contains a nonlinear function part (304), and each nonlinear function part (304) comprises: a first key-dependent linear transformation part (341) which performs a linear transformation based on a subkey; a splitting part (342) which splits the output from the first key-dependent linear transformation part into n pieces of subdata; a first nonlinear transformation part (343) which nonlinearly transforms those pieces of subdata, respectively; a second key-dependent linear transformation part (344) which linearly transforms those nonlinearly transformed outputs based on a subkey and outputs n pieces of transformed subdata; a second nonlinear transformation part (345) which nonlinearly transforms those transformed subdata; and a combining part (346) which combines the nonlinearly transformed outputs. An n×n matrix, which represents the linear transformation in the second key-dependent linear transformation part (344), is formed by n vectors whose Hamming weights are equal to or larger than T−1 for a security threshold T, thereby increasing the invulnerability against differential cryptanalysis and linear cryptanalysis.

54 Claims, 25 Drawing Sheets

OTHER PUBLICATIONS

V. Rijmen, et al., "The Cipher SHARK," Lecture Notes in Computer Science, vol. 1039, (1996), p. 99–111.

M. Matsui, "New Structure of Block Ciphers with Provable Security Against Defferential and Linear Cryptanalysis," Lecture Notes in Computer Science, vol. 1039, (1996), p. 205–218.

A. Shimizu, et al., "Fast Data Encipherment Algorithm FEAL," Lecture Notes in Computer Science, vol. 304, (1987), p. 276–278.

Matsui M: "New Structure of Block Ciphers with Provaable Security Against Differential and Linear Cryptanalysis" Lecture Notes in Computer Science, Springer Verlag, New York, NY, US, vol. 1039, 1996, pp. 205–218,XP002914985 ISSN: 0302–9743.

Hikaru Morita et al: "FEAL–LSI and its Application" NTT Review, Telecommunications Association, Tokyo, JP, vol. 3, No. 6, Nov. 1, 1991, pp. 57–63, XP000270157 ISSN: 0915–2334.

DATA CONVERTER AND RECORDING MEDIUM ON WHICH PROGRAM FOR EXECUTING DATA CONVERSION IS RECORDED

TECHNICAL FIELD

The present invention relates to a transformation device that is used in a cryptographic device for concealing data in data communication or storage and, more particularly, to a data transformation device suitable for use in an encryption device of a secret-key encryption algorithm which encrypts or decrypts data blocks using a secret key, and a recording medium on which there is recorded a program for execution by the data transformation device.

PRIOR ART

With a view to constructing a fast and secure secret-key encryption algorithm, a block cipher is used according to which data for encryption is split into blocks of a suitable length and encrypted for each block. Usually, the block cipher comprises a data diffusion part which randomizes input data to be encrypted, and a key scheduling part which is supplied with a secret common key (hereinafter referred to as a master key) input to the encryption device and generates a sequence of subkeys for use by the data diffusion part. A typical secret-key encryption algorithm, which is used in the data transformation device to conceal data, is DES (Data Encryption Standard) that was FIPS-approved algorithm for encryption.

FIG. 1 illustrates the functional configuration of DES. DES uses a 64-bit secret key (8 bits being used for parity), and encrypts or decrypts data in blocks of 64 bits. In FIG. 1 the encryption process is executed in a data diffusion part 10, which begins with initial permutation of 64 bits of a plaintext M in an initial permutation part 11, followed by splitting the permuted data into two pieces of 32-bit block data $L_0$ and $R_0$. The block data $R_0$ is input to a function operation part (referred to also as a round function) 12 which is a data transformation part shown as an i-th round processing part 14$_i$ (i=0, 1, ..., 15) in FIG. 2, wherein it is transformed to $f(R_0, k_0)$ using a 48-bit subkey $k_0$. The thus transformed data $f(R_0, k_0)$ and the block data $L_0$ are exclusive ORed in an XOR circuit 13, and its output and the block data $R_0$ are swapped to obtain the next block data $L_1$, $R_1$. That is, $$R_1 = L_0 \oplus f(R_0, k_0)$$
$$L_1 = R_0$$

where $\oplus$ represents an exclusive OR. A 0-th round processing part 14$_0$ comprises the function operation part 12 and the XOR circuit 13 and swaps the two pieces of block data to provide the two pieces of output block data $L_1$ and $R_1$; similar round processing parts 14$_1$ to 14$_{15}$ are provided in cascade. The processing by the i-th round processing part 14$_i$ will hereinafter be referred to as i-th processing, where i=0, 1, ..., 15. That is, each round processing part 14$_i$ (where 0≤i≤15) performs the following processing $$R_{i+1} = L_i \oplus f(R_i, k_i)$$
$$L_{i+1} = R_i$$

And finally concatenation two pieces of data $R_{16}$ and $L_{16}$ into 64-bit data, which is permuted in a final permutation part 15 to provide a 64-bit ciphertext. Incidentally, the operation of the final permutation part 15 corresponds to an inverse transform of the operation of the initial permutation part 11.

The decryption process can be executed following the same procedure as that for the encryption process except inputting subkeys $k_0, k_1, \ldots, k_{14}, k_{15}$ to the function f (the function operation part 12) in the order $k_{15}, k_{14}, \ldots, k_1, k_0$ which is reverse to that in the encryption process. In such an instance, the outputs $L_{16}$ and $R_{16}$ from the final round processing part 14$_{15}$ are further swapped as depicted, and in the decryption process the ciphertext is input to the initial permutation part 11 for execution of the process of FIG. 1, by which the plaintext is provided intact at the output of the final permutation part 15. In a key scheduling part 20 an expanded key generation part 21: splits a master key of 64 bits, except 8 bits used for parity, into two pieces of 28-bit right and left key data; then performs 16-round swapping of the two pieces of 28-bit right and left key data; and performs reduced permutation of the permuted right and left data (a total of 56 bits) provided from the respective rounds to generate 16 48-bits subkeys $k_0, k_1, \ldots, k_{14}, k_{15}$ which are provided to the corresponding round processing parts of the data diffusion part 10.

The processing in the function operation part 12 is performed as depicted in FIG. 2. To begin with, the 32-bit block data $R_i$ is transformed to 48-bit data $E(R_i)$ in an expanded permutation part 17. This output data and the subkey $k_i$ are exclusive ORed in an XOR circuit 18, whose output is transformed to 48-bit data $E(R_i) \oplus k_i$, which is then split to eight pieces of 6-bit sub-block data. The eight pieces of sub-block data are input to different S-boxes $S_0$ to $S_7$ to derive therefrom a 4-bit output, respectively. Incidentally, the S-box $S_j$ (where j=0, 1, ..., 7) is a nonlinear transformation table that transforms the 6-bit input data to the 4-bit output data, and is an essential part that provides security of DES. The eight pieces of output data from the S-boxes $S_0$ to $S_7$ are concatenated again to 32-bit data, which is applied to a permutation part 19 to provide the output $f(R_i, k_i)$ from the function operation part 12 as shown in FIG. 2. This output is exclusive ORed with $L_i$ to obtain $R_{i+1}$.

Next, a description will be given of cryptanalysis techniques. A variety of cryptanalysis techniques have been proposed for DES and other traditional secret-key encryption algorithms; extremely effective cryptanalysis techniques among them are differential cryptanalysis proposed by E. Biham and A. Shmir, ("Differential Cryptanalysis of DES-like Cryptosystems," Journal of Cryptology, Vol. 4, No. 1, pp.3–72) and linear cryptanalysis proposed by Matsui, ("Linear Cryptanalysis Method for DES cipher," Advances in Cryptology-EUROCRYPT' 93 (Lecture Notes in Computer Science 765), pp. 386–397.)

Assuming that a difference between two pieces of data X and X* is defined as $$\Delta X = X \oplus X^*,$$

differential cryptanalysis aims to obtain the subkey $k_{15}$ in the final round processing part 14$_{15}$ by applying to the following equations two sets of plaintext-ciphertext pair that an attacker possesses. In the encryption process of FIG. 1, let $(L_i, R_i)$ and $(L^*_i, R^*_i)$ represent input data into the round processing part 14$_i$ for first and second plaintexts respectively. With the difference defined as mentioned above, the following equations hold.

$$\Delta L_i = L_i \oplus L^*_i$$
$$\Delta R_i = R_i \oplus R^*_i$$

In FIG. 1, since $L_{15}=R_{14}$, $L^*_{15}=R^*_{14}$, $L_{16}=R_{15}$ and $L^*_{16}=R^*_{15}$, the following equations hold $$R_{16}=L_{15}\oplus f(R_{15}, k_{15})$$

$$R^*_{16}=L^*_{15}\oplus f(R^*_{15}, k_{15})$$

and the exclusive OR of both sides of these two equations is obtained as follows:

$$\Delta R_{16}=\Delta L_{15}\oplus f(L_{16}, k_{15})\oplus f(L_{16}\oplus \Delta L_{16}, k_{15}).$$

The exclusive ORing of its both sides with $\Delta R_{14}=\Delta L_{15}$ gives the following equation:

$$f(L_{16}, k_{15})\oplus f(L_{16}\Delta L_{16}, k_{15})=\Delta R_{16}\oplus \Delta R_{14}.$$

At this time, since $L_{16}$, $\Delta L_{16}$ and $\Delta R_{16}$ are data available from the ciphertext, they are known information. Hence, if the attacker can correctly obtain $\Delta R_{14}$, then only $k_{15}$ in the above equation is an unknown constant; the attacker can find a correct $k_{15}$ without fail by an exhaustive search for $k_{15}$ using the known sets of plaintext-ciphertext pair. Accordingly, once the subkey $k_{15}$ is found out, the remaining eight (i.e., 56–48) bits can easily be obtained even by another exhaustive search.

On the other hand, generally speaking, it is difficult to obtain $\Delta R_{14}$ since this value is an intermediate difference value. Then, assume that each round processing is approximated by the following equations with a probability $p_i$ in the 0-th to the last round but one (i.e.; the 14-th):

$$\Delta R_{i+1}=\Delta L_i\oplus\Delta\{f(\Delta R_i)\}$$

$$\Delta L_{i+1}=\Delta R_{i+1}.$$

The point is that, when certain $\Delta R_i$ is input to the i-th round processing part, $\Delta\{f(\Delta R_i)\}$ can be predicted with the probability $p_i$ regardless of the value of the subkey $k_i$. The reason why such approximations can be made is that, the S-boxes, which are nonlinear transformation tables, provide an extremely uneven distribution of output differences for same input differences. For example, in the S-box $S_0$, an input difference "$110100_{(2)}$" is transformed to an output difference "$0010_{(2)}$" with a probability of 1/4. Then, the approximation for each round is obtained by assuming that the S-boxes are each capable of predicting the relationship between the input difference and the output difference with a probability $P_{si}$ and by combining them. Furthermore, the concatenation of such approximations in the respective rounds makes it possible to obtain $\Delta R_{14}$ from $\Delta L_0$ and $\Delta R_0$ ($\Delta L_0$ and $\Delta R_0$ are data derivable from the plaintext, and hence they are known) with a probability $P=\Pi_{i=0}^{13}p_i$. Incidentally, the higher the probability P, the easier the cryptanalysis. After the subkey $k_{15}$ is thus obtained, a similar calculation is made of the subkey $k_{14}$ regarding it as a 15-round DES that is one round fewer than in the above; such operations are repeated to obtain the subkeys one by one to $k_0$.

It depends on the probability P whether this cryptanalysis succeeds; the higher the probability P, the more likely the success. Biham et al. say that DES could be broken by this cryptanalysis if $2^{47}$ sets of chosen plaintext-ciphertext pair are available.

Linear cryptanalysis aims to obtain subkeys by constructing the following linear approximate equation and using the maximum likelihood method with sets of known plaintext-ciphertext pair possessed by an attacker.

$$(L_0, R_0)\Gamma(L_0, R_0)\oplus(L_{16}, R_{16})\Gamma(L_{16}, R_{16})=(k_0, k_1, \ldots, k_{15})\Gamma(k_0, k_1, \ldots, k_{15})$$

where $\Gamma(X)$ represents the vector that chooses a particular bit position of X, and it is called a mask value.

The role of the linear approximation expression is to approximately replace the cryptographic algorithm with a linear expression and separate it into a part concerning the set of plaintext-ciphertext pairs and a part concerning the subkeys. That is, in the set of plaintext-ciphertext pairs, the all exclusive Ors between the values at particular bit positions of the plaintext and those of the ciphertext take a fixed value, which indicates that it equals the exclusive OR of the values at particular positions of the subkeys. This means that the attacker gets information $(k_0, k_1, \ldots, k_{15})\Gamma(k_0, k_1, \ldots, k_{15})$ (one bit)

from information $(L_0, R_0)\Gamma(L_0, R_0)\oplus(L_{16}, R_{16})\Gamma(L_{16}, R_{16}).$ At this time, $(L_0, R_0)$ and $(L_{16}, R_{16})$ are the plaintext and the ciphertext, respectively, and hence they are known. For this reason, if the attacker can correctly obtain $\Gamma(L_0, R_0)$, $\Gamma(L_{16}, R_{16})$ and $\Gamma(k_0, k_1, \ldots, k_{15})$, then he can obtain $(k_0, k_1, \ldots, k_{15})\Gamma(k_0, k_1, \ldots, k_{15})$ (one bit).

In DES only S-boxes perform nonlinear transformation; hence, if linear representations can be made for only the S-boxes, the linear approximation expression can easily be constructed. Then, assume that the each S-box can be linearly represented with a probability $p_{si}$. The point here is that when the input mask value for the S-box is given, its output mask value can be predicted with the probability $p_{si}$. The reason for this is that the S-boxes, which form a nonlinear transformation table, provide an extremely uneven distribution of output mask values according to the input mask values. For example, in the S-box $S_4$, when the input mask value is "$010000_{(2)}$," an output mask value "$1111_{(2)}$" is predicted with a probability 3/16. By combining the mask values in these S-boxes, a linear representation of each round with the input and output mask values can be made with a probability $p_i$, and by concatenating the linear representations of the respective rounds, $\Gamma(L_0, R_0)$, $\Gamma(L_{16}, R_{16})$ and $\Gamma(k_0, k_1, \ldots, k_{15})$ are obtained wit the following probability:

$$P=1/2+2^{15}\Pi_{i=0}^{15}|p_i-1/2|.$$

The higher the probability P, the easier the cryptanalysis.

According to Matsui, he has succeeded in the analysis of DES by this cryptanalysis using $2^{43}$ sets of known plaintext-ciphertext pair.

To protect ciphers against the above cryptanalysis techniques, the probability P needs only to be reduced to be sufficiently small. A wide variety of proposals have been made to lessen the probability P, and the easiest way to provide increased security in the conventional cryptosystems is to increase the number of rounds. For example, Triple-DES with three DESs concatenated is an algorithm that essentially increases the number of rounds from 16 to 48, and it provides a far smaller probability P than does DES.

However, to increase the number of rounds with a view to avoiding the cryptanalysis techniques described above inevitably sacrifices the encryption speed. For example, if the number of rounds is tripled, the encryption speed is reduced down to ⅓. That is, since the encryption speed of the present DES is about 10 Mbps on the Pentium PC class, the encryption speed of Triple-DES goes down to around 3.5 Mbps. On the other hand, networks and computers are becoming increasingly faster year by year, and hence there is also a demand for data transformation devices that keep up with such speedups. With conventional data transformation devices, it is extremely difficult, therefore, to simultaneously meet the requirements of security and speedup.

Moreover, according to differential and linear cryptanalysis, the subkey in the final round is obtained as described above. Since DES has a defect that the main key can easily be derived from the subkey in the final round, there is proposed in U.S. Pat. No. 4,850,019: a method which provides increased security by increasing the complexity of the correspondence between the subkeys and the main key in the key scheduling part 20. Its fundamental configuration is shown in FIG. 3. In the above-mentioned U.S. patent, the subkeys are generated from the main key by data diffusion parts ($f_k$), therefore it is expected that the main key cannot easily be derived from the subkeys.

Next, a description will be given, with reference to FIG. 3, of the general outlines of a key scheduling part 20 disclosed in the above-mentioned U.S. patent. An expanded key generation part 21 comprises N/2 (N=16, for example) rounds of key processing parts $21_0$ to $21_{N/2-1}$ which have key diffusion parts $22_0$ to $22_{N/2-1}$, respectively. The key processing parts $21_j$ (where j=0, 1, . . . , N/2−1) each perform diffusion processing of two pieces of 32-bit right and left key data, and interchange them to provide two pieces of right and left key data for input to the next-round key processing part $21_{j+1}$. The key processing parts $21_j$, except the first round, each have an exclusive OR part $23_j$, which calculates the exclusive OR of the left input key data to the key processing part $21_{j-1}$ of the preceding round and the left output key data therefrom and provides the calculated data to the key diffusion part $22_j$. The left input key data of the key processing part $21_j$ is diffused by the output from the exclusive OR part $23_j$ in the key diffusion part $22_j$, from which the diffused data is output as right key data for input to the next round, and the right input key data of the key processing part $21_j$ is output as left key data for input to the next round. The output from each key diffusion part $22_j$ is bit-split into two subkeys $Q_{2j}$ and $Q_{2j+1}$ (that is, $k_i$ and $k_{i+1}$), which are provided to the corresponding (i=$2_j$)-th round processing part and (i+1=2j+1)-th round processing part in FIG. 1.

The 64-bit main key is split into two pieces of 32-bit right and left key data, then in the first-round key processing part $21_0$ the left key data is diffused by the right key data in the key difflusion part $22_0$ to obtain diffused left key data, and this diffused left key data and the right key data are interchanged and provided as right and left key data next to the key processing part $21_1$. The outputs from the key diffusion parts $22_0$ to $22_{N/2-1}$ of the key processing parts $21_0$ to $21_{N/2-1}$ are applied as subkeys $k_0$ to $k_{N-1}$ to the corresponding round processing parts $14_0$ to $14_{N-1}$ of the data diffusion part 10 depicted in FIG. 1.

In the expanded key generation part 21 of FIG. 3, however, each key diffusion part $22_j$ is a function for generating a pair of key data (subkeys $Q_{2j}$, $Q_{2j+1}$) from two pieces of input data. In the case where when one of the two pieces of input data and the output data are known the other input data can be found out, if it is assumed that three pairs of subkeys ($Q_{2j-2}$ and $Q_{2j-1}$), ($Q_{2j}$ and $Q_{2j+1}$), ($Q_{2j+1}$ and $Q_{2j+3}$) are known, since the output (subkeys $Q_{2j+2}$ and $Q_{2j+3}$) from the (j+1)-th key diffusion part $22_{j+1}$ and the one input data (subkeys $Q_{2j-2}$ and $Q_{2j-1}$) thereto are known, the other input data (i.e., the output data from the exclusive OR part $23_{j+1}$) can be obtained; and it is possible to derive, from the thus obtained data and the subkeys $Q_{2j}$ and $Q_{2j+1}$ which constitute the one input data to the exclusive OR part $23_{j+1}$, the input data to the preceding j-th) key diffusion part $22_j$ which constitute the other input data to the exclusive OR part $23_{j+1}$, that is, the subkeys $Q_{2j-4}$ and $Q_{2j-3}$ which constitute the output from the three-round-preceding ((j−2)-th) key difflusion part $22_{j-2}$. By repeating such operations in a sequential order, it is possible to determine all subkeys through data analysis only in the key scheduling part 20 without involving data analysis in the data diffusion part 10. It has been described just above that when subkeys of three consecutive rounds are known, all the subkeys concerned can be obtained, but when subkeys of two consecutive rounds, cryptanalysis will succeed even by estimating subkeys of the remaining one round by an exhaustive search.

Letting the final stage of the round processing in FIG. 1 be represented by i=N, subkeys $k_N$ and $k_{N-1}$ are easy to obtain by differential and linear cryptanalysis. By analyzing the key data in the expanded key scheduling part 21 as described above using the obtained subkeys, there is the possibility of obtaining all the subkeys concerned.

A first object of the present invention is to provide a data transformation device in which the round function f (the function operation part) is so configured as to simultaneously meet the requirements of security and speedup to thereby ensure security and permit fast encryption processing without involving a substantial increases in the number of rounds, and a recording medium having recorded thereon a program for implementing the data transformation.

A second object of the present invention is to implement a key scheduling part which does not allow ease in determining other subkeys and the master key by a mere analysis of the key scheduling part even if some of the subkeys are known.

DISCLOSURE OF THE INVENTION

To attain the first object of the present invention, a nonlinear function part, in particular, comprises: a first key-dependent linear transformation part which linearly transforms input data of the nonlinear function part based on first key data stored in a key storage part; a splitting part which splits the output data of the first key-dependent linear transformation part into n pieces of subdata; first nonlinear transformation parts which nonlinearly transform these pieces of subdata, respectively; a second key-dependent linear transformation part which linearly transforms respective pieces of output subdata of the first nonlinear transformation parts based on second key data; second nonlinear transformation parts which nonlinearly transform respective pieces of output subdata of the second key-dependent linear transformation part; and a combining part which combines output subblocks of the second nonlinear transformation part into output data of the nonlinear function part; and the second key-dependent linear transformation part contains a linear transformation part which performs exclusive ORing of its inputs which is defined by an n×n matrix.

According to the present invention, it is guaranteed that when the differential probability/linear probability in the first and second nonlinear transformation parts is p (<1), the differential probability/linear probability of approximating each round is $p_i \leq p^2$ (when the input difference to the function f(the nonlinear function part) is not 0 in the case of differential cryptanalysis, and when the output mask value from the function is not 0 in the case of linear cryptanalysis). And when the function f is objective, if the number of rounds of the cryptographic device is set at 3r, then the probability of the cipher becomes $P \leq p_i^{2r} \leq p^{4r}$. Furthermore, if the second key-dependent linear transformation part in the case of n=4, in particular, has a configuration that exclusive ORs combination of three of four pieces of subdata with one of four pieces of key data, the probability of approximating each round is $p_i \leq p^4$ and the probability of the cipher is $P \leq p_i^{2r} \leq p^{8r}$. If the second key-dependent linear transformation part in the case of n=8 has a configuration that exclusive ORs combination of six or five of eight pieces of subdata with one of eight pieces of key data, the probability of approximating each round is $p_i \leq p^5$ and the probability of the cipher is $P \leq p_i^{2r} \leq p^{10r}$.

Moreover, the first and second nonlinear transformation parts are arranged so that their processing can be performed completely in parallel—this contributes to speedup.

It is possible, therefore, to construct a fast and source nonlinear function against differential and linear cryptanalysis, and to permit the implementation of a data transformation device which copes with both security and speedup.

To attain the second object of the present invention, the key scheduling part is provided with: a G-function parts which perform the same function as that of the key diffusion part (the function $f_k$), L components which are output from the G-function parts being once stored in a storage part; and an H-function part which reads out a required number of L components from the storage part and generates subkeys by extracting the respective L components as uniformly as possible. Furthermore, in the H-function part partial information, which is used as subkeys, is extracted from the L components which are outputs from the G-function parts, then the extracted information is stored in a storage part, and the subkeys are generated by extracting the partial information from the required number of L components.

BEST MODE FOR CARRYING OUT THE INVENTION

First Embodiment

An embodiment of the present invention will be described below with reference to the accompanying drawings.

Figure 4:
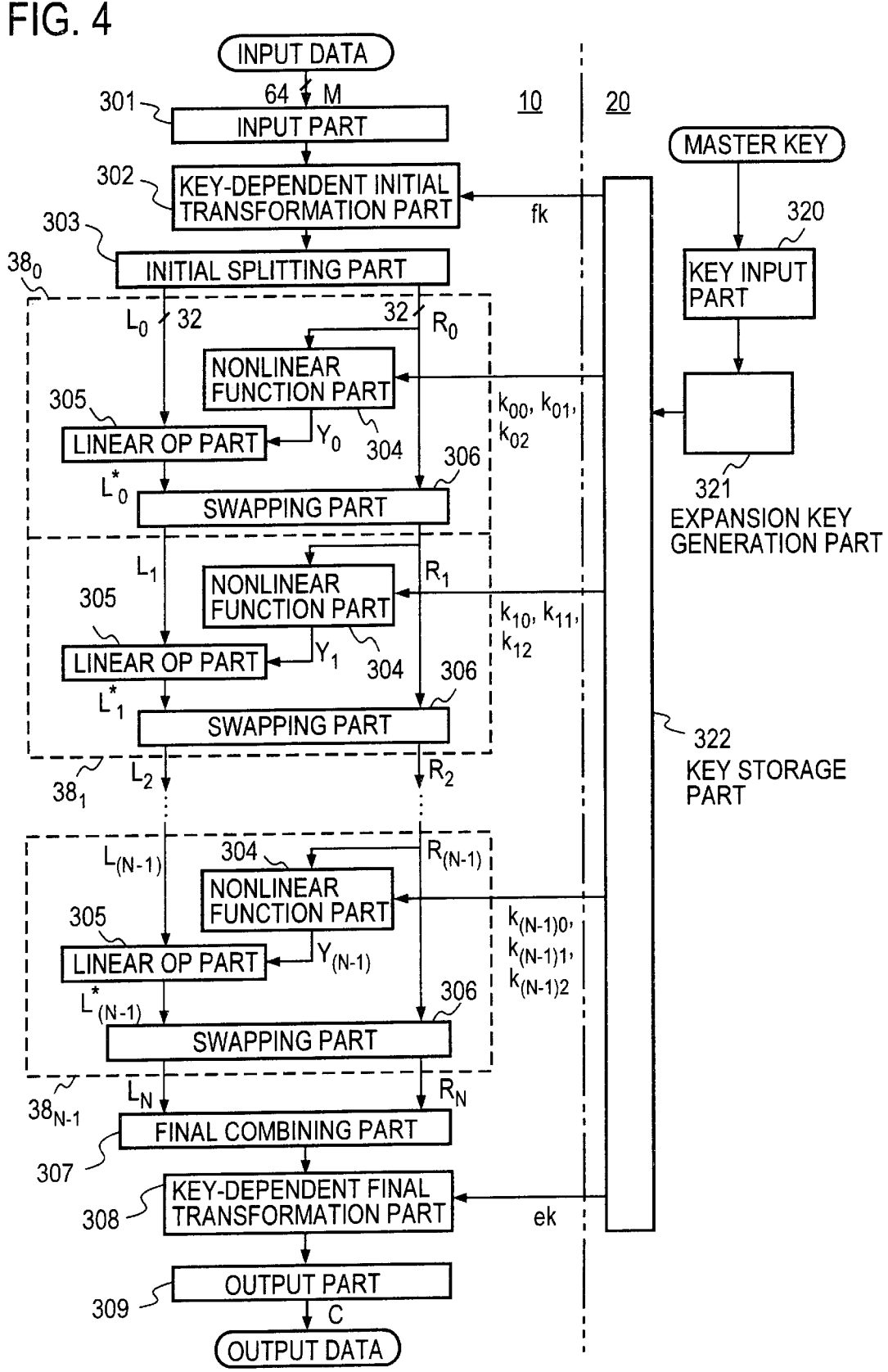
FIG. 4 is a diagram illustrating the functional configuration of the first embodiment of the present invention.

FIG. 4 illustrates the functional configuration for an encryption process in the data transformation device according to an embodiment of the present invention. The data transformation device comprises a data diffusion part 10 and a key scheduling part 20. In the data transformation device according to the present invention, too, the data diffusion part 10 comprises N rounds of cascade-connected round processing parts $38_0$ to $38_{N-1}$ which sequentially perform round processing of left and right pieces of data after input data is split into left and right pieces $L_0$, $R_0$; each round processing part $38_i$ (where i=0, 1, ... , N−1) is made up of a nonlinear function part 304 corresponding to the function operation part 12 in FIG. 1, a linear operation part 305 corresponding to the XOR circuit 13 in FIG. 1 and a swapping part 306.

Input data M, which corresponds to a plaintext, is entered into the cryptographic device via an input part 301. The key scheduling part 20 comprises a key input part 320, an expanded key generation part 321 and a key storage part 322. Based on input data (a master key K) from the key input part 320, the expanded key generation part 321 generates plural pieces of key data (subkeys)

$$\{fk; k_{00}, k_{01}; k_{10}, k_{11}, k_{12}; \ldots ; k_{(N-1)0}, k_{(N-1)1}, k_{(N-1)2}; ek\}$$

which are stored in the key storage part 322. The input data M is transformed in a key-dependent initial transformation part 302 with the key data fk stored in the key storage part 322, thereafter being split in an initial splitting part 303 into two pieces of left and right block data $L_0$ and $R_0$. For example, 64-bit data is split into two pieces of 32-bit block data $L_0$ and $R_0$. The key-dependent initial transformation part 302 performs a linear transformation such as exclusive ORing of the key data fk and the input data M or bit rotation of the input data M by the key data fk, or nonlinear transformation by a combination of multiplications.

The right block data $R_0$ is provided to the nonlinear function part 304 which is characteristic of the present invention, together with the key data $k_{00}$, $k_{01}$ and $k_{02}$ stored in the key storage part 322, and in the nonlinear function part 304 the right block data is nonlinearly transformed to data $Y_0$. The data $Y_0$ and the left block data $L_0$ are transformed to data $L_0^*$ through a linear operation in the linear operation part 305. The data $L_0^*$ and the data $R_0$ are swapped in the swapping part 306 to provide $L_1 \leftarrow R_0$, $R_1 \leftarrow L_0^*$; and these pieces of data $L_1$ and $R_1$ are input to the next first round processing part $38_1$.

Thereafter, in an i-th round processing parts $38_i$ (where i=0, 1, ... , N−1) the same processing as mentioned above is repeated for two pieces of input block data $L_i$ and $R_i$. That is, the right block data $R_i$ is input to the nonlinear function part 304 together with the key data $k_{i0}$, $k_{i1}$ and $k_{i2}$, and in the nonlinear function part 304 it is nonlinearly transformed to data $Y_i$. The data $Y_i$ and the data $L_i$ are transformed to data $L_i^*$ by a linear operation in the linear operation part 305. The data $L_i^*$ and the data $R_i$ are swapped in data position in the swapping part 306, that is, $L_{i+1} \leftarrow R_i$, $R_{i+1} \leftarrow L_i^*$. The linear operation part 305 is to perform, for instance, an exclusive OR operation.

Letting N represent the repeat count (the number of rounds) suitable to provide security of a data transformation device for encryption, two pieces of left and right data $L_N$ and $R_N$ are obtained as the result of such repeated processing by the round processing parts $38_0$ to $38_{N-1}$. These pieces of data $L_N$ and $R_N$ are combined into a single piece of block data in a final combining part 307; for example, the two pieces of 32-bit data $L_N$ and $R_N$ are combined to 64-bit data. Then the thus combined data is transformed in a final linear transformation part 308 using the key data ek stored in the key storage part 322, and output data C is provided as a ciphertext from an output part 309.

In decryption, the plaintext M can be derived from the ciphertext C by reversing the encryption procedure. In particular, when the key-dependent final transformation part 308 is one that performs a transformation inverse to that of the key-dependent initial transformation part 302, the decryption can be done by inputting ciphertext data in place of the input data in FIG. 4 and then inputting the key data in a sequential order reverse to that in FIG. 4, that is, ek, $k_{(N-1)0}$, $k_{(N-1)1}$, $k_{(N-1)2}$, ... , $k_{10}$, $k_{11}$, $k_{12}$, $k_{00}$, $k_{01}$, $k_{02}$, fk.

Figure 5:
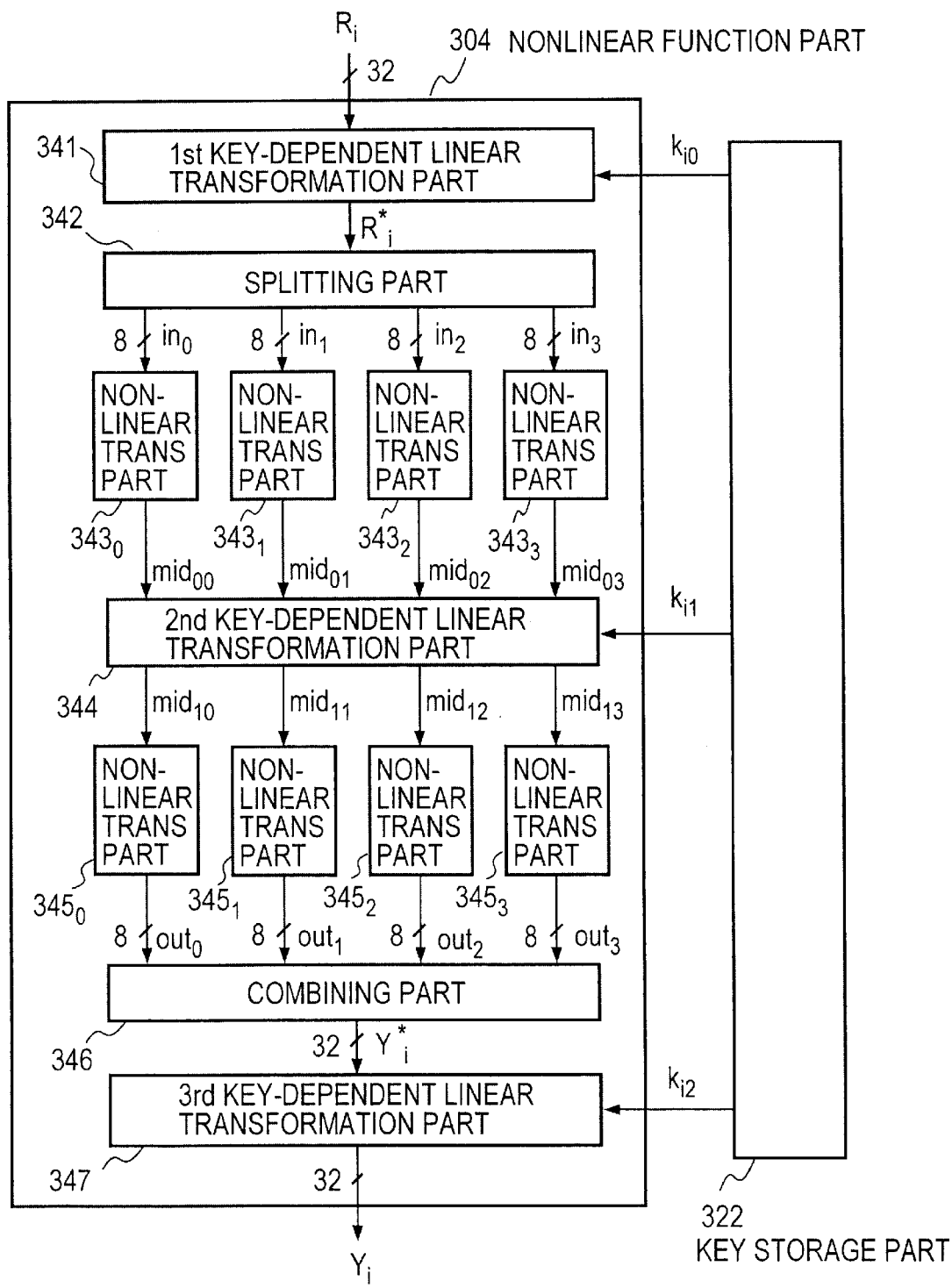
FIG. 5 is a diagram showing in detail an example of the functional configuration of a nonlinear function part 304 in the first embodiment.

Next, a detailed description will be given of the internal configuration of the nonlinear function part 304. FIG. 5 is a diagrammatic showing of the internal functional configuration of the nonlinear function part 304.

The input block data $R_i$ to the i-th round processing part $38_i$ constitutes input data to the nonlinear function part 304, together with the key data $k_{i0}$, $k_{i1}$, $k_{i2}$ stored in the key storage part 322. The block data $R_i$ is subjected to, for example, exclusive ORing with the key data $k_{i0}$ in a first key-dependent linear transformation part 341, by which it is linearly transformed to data $R_i^* = R_i \oplus k_{i0}$. Next, the thus transformed data $R_i^*$ is split into four pieces of, for instance, 8-bit data $in_0$, $in_1$, $in_2$ and $in_3$ in a splitting part 342. The four pieces of data $in_0$, $in_1$, $in_2$ and $in_3$ are nonlinearly transformed to four pieces of data $mid_{00}$, $mid_{01}$, $mid_{02}$ and $mid_{03}$ in nonlinear transformation parts $343_0$, $343_1$, $343_2$ and $343_3$, respectively, from which they are input to a second key-dependent linear transformation part 344.

The second key-dependent linear transformation part 344 performs linear transformation (XORing) among the pieces of input data $mid_{00}$, $mid_{01}$, $mid_{02}$ and $mid_{03}$ from four routes to provide new data of four routes, and further performs linear transformation (XORing) among these pieces of data of the four routes with four pieces of the key data $k_{i1}$ to provide output data $mid_{10}$, $mid_{11}$, $mid_{12}$ and $mid_{13}$ of the four routes. The four pieces of data are input to nonlinear transformation parts $345_0$, $345_1$, $345_2$ and $345_3$, wherein they are transformed to data $out_0$, $out_1$, $out_2$ and $out_3$, respectively. These four pieces of data are combined into data $Y_i^*$ in a combining part 346; furthermore, in a third key-dependent linear transformation part 347 the data $Y_i^*$ undergoes a linear operation with the key data $k_{i2}$ to generate output data $Y_i$.

Figure 6:
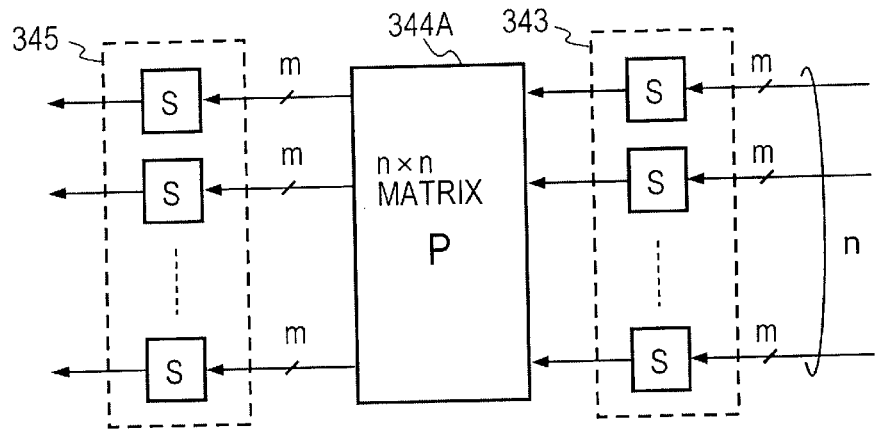
FIG. 6 is a diagram showing a basic configuration of a nonlinear function part for determining an optimal linear transformation part in FIG. 5.
Figure 7:
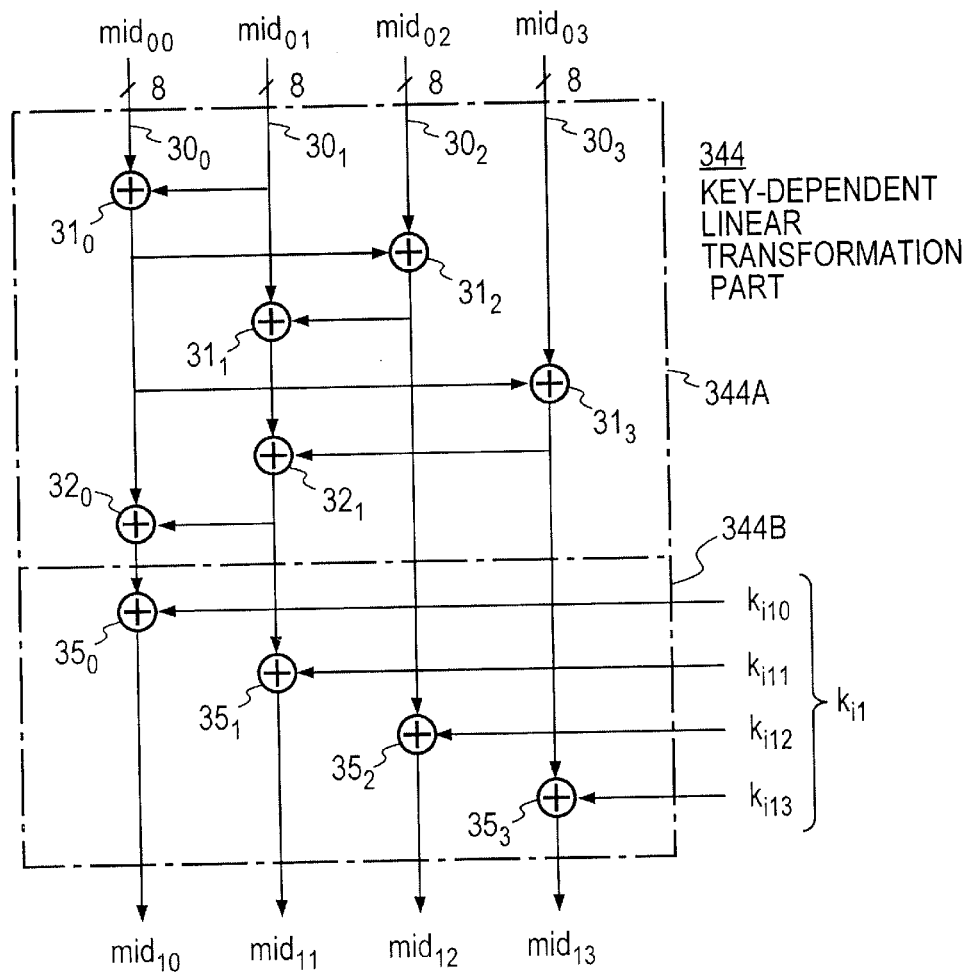
FIG. 7 is a diagram depicting a concrete example of the second key-dependent linear transformation part 344 in FIG. 5.
Figure 8B:
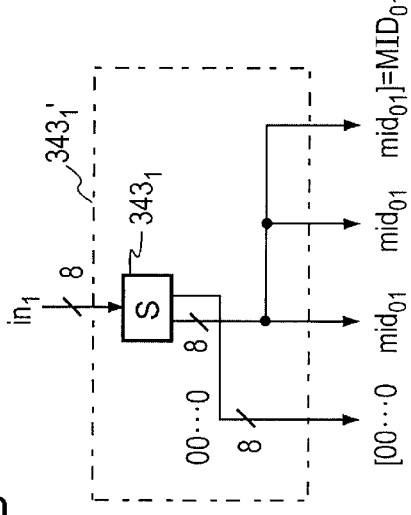
FIG. 8B is a diagram depicting a equivalent functional configuration of a nonlinear transformation part $343_1'$ in the second embodiment.
Figure 8D:
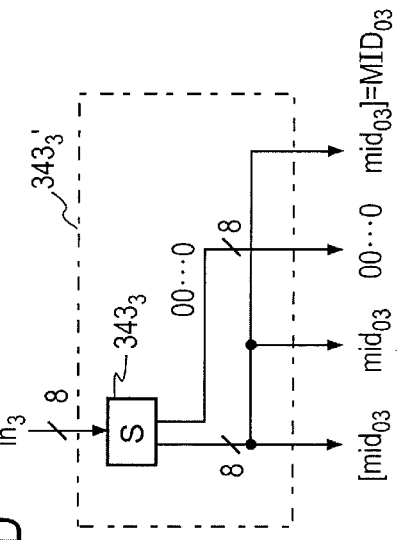
FIG. 8D is a diagram depicting an equivalent functional configuration of a nonlinear transformation part $343_2'$ in the second embodiment.
Figure 8A:
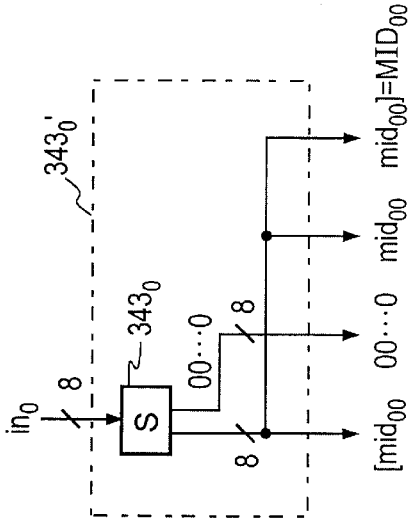
FIG. 8A is a diagram depicting an equivalent functional configuration of a nonlinear transformation part $343_0'$ in the second embodiment.
Figure 8C:
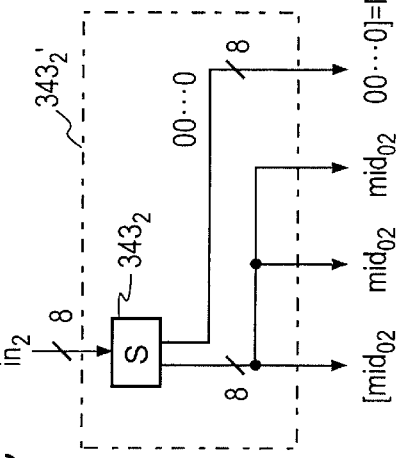
FIG. 8C is a diagram depicting an equivalent functional configuration of a nonlinear transformation part $343_2'$ in the second embodiment.

The above-mentioned second key-dependent linear transformation part 344 is configured to perform an exclusive OR operation of data between data processing routes $30_0$, $30_1$, $30_2$ and $30_3$ provided corresponding to the pieces of data $mid_{00}$, $mid_{01}$, $mid_{02}$ and $mid_{03}$, respectively, through the use of an algorithm according to the present invention, thereby providing increased security without increasing the number of rounds of the data transformation device depicted in FIG. 4. The security of he data transformation device of FIG. 4 against differential cryptanalysis and linear cryptanalysis is dependent on the configuration of the nonlinear function part 304 of each round; in particular, when the nonlinear function part 304 in FIG. 5 has such a basic configuration as shown in FIG. 6, the security depends on a first nonlinear transformation part 343 composed of n nonlinear transformation parts (S-boxes) with m-bit input data, a linear transformation part 344A for linearly transforming the n outputs and a second nonlinear transformation part 345 composed of n nonlinear transformation parts (S-boxes) for nonlinearly transforming the n m-bit outputs, respectively. It is particularly important how an optimal linear transformation part 344A is constructed which is secure against differential and linear cryptanalysis. According to the present invention, the linear transformation part 344A is represented as an n×n matrix P over $\{0, 1\}$, and the optimal linear transformation part 344A is constructed by determining elements of the matrix P in such a manner as to minimize the maximum differential and linear characteristic probabilities p, q. In this instance, a linear transformation part using the subkey $k_{i1}$, which is contained in the second key-dependent linear transformation part 344, is added as a key-dependent transformation part 344B to the linear transformation part 344A determined by the matrix P as depicted in FIG. 7.

Incidentally, what is intended to mean by the word "optimal" is to provide the highest resistance to differential and linear cryptanalysis in the linear transformation part 344A of the above configuration, but it does not necessarily mean the optimum for other criteria, for example, an avalanche property. Empirically speaking, however, attacks other than differential and linear cryptanalysis can easily be avoided by only increasing the number of rounds, while it is not certain whether only some increase in the number of rounds serves to prevent differential and linear cryptanalysis unless a careful study is made of the round function used. In view of this, the present invention attaches the most importance to the resistance of the round function to differential and linear cryptanalysis and constructs the optimal linear transformation part 344A accordingly.

According to the present invention, the linear transformation part 344A in FIG. 6 is represented as the n×n matrix P over $\{0, 1\}$ as referred to above. This means that the matrix P performs a linear transformation in units of m bits, and that the linear transformation part 344A can be formed by only exclusive ORs. That is, this transformation can be expressed by the following equation:

$$z'_i = \bigoplus_{j=0}^{n-1} t_{ij} z_j. \tag{1}$$

In particular, when m=8, the linear transformation is made in units of bytes, and can be efficiently implemented on any platforms where the word width is 8-bit or more.

As a concrete example in the case of n=4, a 4×4 matrix $P_E$ will be described which is expressed by the following equation:

$$\begin{bmatrix} z'_0 \\ z'_1 \\ z'_2 \\ z'_3 \end{bmatrix} = \begin{bmatrix} 0 & 1 & 1 & 1 \\ 1 & 0 & 1 & 1 \\ 1 & 1 & 1 & 0 \\ 1 & 1 & 1 & 1 \end{bmatrix} \begin{bmatrix} z_0 \\ z_1 \\ z_2 \\ z_3 \end{bmatrix}. \tag{2}$$

The round function using the matrix $P_E$ has the following features. Let it be assumed, however, that the S-box is bijective. $z'_0$, $z'_1$, $z'_2$ and $z'_3$ defined by the above matrix represent the following operations, respectively.

$$z'_0 = 0 \cdot z_0 \oplus 1 \cdot z_1 \oplus 1 \cdot z_2 \oplus 1 \cdot z_3 = z_1 \oplus z_2 \oplus z_3 \tag{3-1}$$

$$z'_1 = 1 \cdot z_0 \oplus 0 \cdot z_1 \oplus 1 \cdot z_2 \oplus 1 \cdot z_3 = z_0 \oplus z_2 \oplus z_3 \tag{3-2}$$

$$z'_2 = 1 \cdot z_0 \oplus 1 \cdot z_1 \oplus 1 \cdot z_2 \oplus 0 \cdot z_3 = z_0 \oplus z_1 \oplus z_2 \tag{3-3}$$

$$z'_3 = 1 \cdot z_0 \oplus 1 \cdot z_1 \oplus 1 \cdot z_2 \oplus 1 \cdot z_3 = z_0 \oplus z_1 \oplus z_2 \oplus z_3 \tag{3-4}$$

The resistance of the round function to differential and linear cryptanalysis can be determined by the smallest numbers $n_d$, $n_1$ of active s-boxes, and these values are those determined at the time of determining the matrix P (see Appendix). In differential cryptanalysis an s-box whose input difference value Δx is nonzero is called an active s-box, and in linear cryptanalysis an s-box whose output mask value Γy is nonzero is called an active box.

In general, when given a certain matrix P, there exist a plurality of constructions of the linear transformation part 344A corresponding thereto. This is because the matrix P represents only the relationship between input and output data of the linear transformation part 344A and does not define its concrete construction. That is, if it is common in the matrix P which represents the relationship between their input and output data, linear transformation parts can be considered to have the same characteristic regardless of their individual constructions. Accordingly, in the following description, the matrix P is determined first which provides high invulnerability against differential and linear cryptanalysis and good avalanche effect, followed by determining the construction of the linear transformation part 344A. This method is more effective in finding out a linear transformation part 344A of an optimal characteristic than a method of checking individual constructions of linear transformation parts to see if they have the optical characteristic.

The elements of the n×n matrix P are determined by the following search algorithm taking the differential characteristic into account.

Step 1: Set a security threshold T (where T is an integer such that $2 \leq T \leq n$).

Step 2: Prepare a set C of column vectors whose Hamming weights are equal to or larger than T−1. More specifically, prepare n or more n-dimensional column vectors which have T−1 or more elements "1."

Step 3: Select a subset $P_c$ of n column vectors from the set C. Repeat the following steps until all subsets have been checked.

Step 3-1: Compute $n_d$ for the subset $P_c$ of n column vectors. This is represented as $n_d(P_c)$.

Step 3-2: If $n_d(P_c) \geq T$, then accept a matrix $P_c$ consisting of the n column vectors as a candidate matrix.

Step 4: Output matrices P and a value $n_d(P)$ that yields the maximum value of $n_d$ among all candidate matrices.

If the candidate matrix by the above search algorithm is adopted, then it is guaranteed that the value $n_d$ is equal to or larger than T. The matrix P that maximizes $n_d$ can efficiently be found by incrementing T by one in the order T=n, n−1, . . . , 3, 2 upon each execution of the above search algorithm.

In the above search algorithm, if it is possible to obtain relatively satisfactory invulnerability against differential and linear cryptanalysis, then a matrix with $n_d(P_c) \geq T$ obtained by performing steps up to 3-2 may be used as the desired matrix P. Alternatively, the matrix Pc composed of n vectors whose Hamming weights are equal to or larger than T−1 selected in step 2 after step 1 may be used as the matrix P.

The input mask values of the linear transformation part 344A can be represented by exclusive ORs of its output mask values, and hence they can be expressed by a certain matrix as is the case with differential characteristic. As the result of our checking the relationship between the matrix for differential characteristic and the matrix for linear expression in several linear transformation parts of different constructions, the following theorem were made.

Theorem 1: Assume that an n×n matrix P over $\{0, 1\}$ is given for the linear transformation part 344A. At this time, the relationship between input and output difference values Δz and Δz' of the linear transformation part 344A (a difference path) is given by the matrix P, and the relationship between input and output mask values Γz and Γz' (a mask value path) is given by a transposed matrix $^TP$. That is, $$\Delta z' = P\Delta z \quad (4)$$

$$\Gamma z = {}^T P \Gamma z'. \quad (5)$$

(See Appendix) The minimum number $n_d$ of active s-boxes in the difference value path using the matrix P is equal to the minimum number $n_1$ of active s-boxes in the mask value path using the transposed matrix $^TP$.

Because of (See Appendix) $n_1$ is also equal to or larger than T when the candidate matrices by the search algorithm are adopted. For example, in the case of the afore-mentioned matrix $P_E$, the matrix $P_E$ for the difference value path and the matrix $^TP_E$ for the mask value path bear the following relationship.

$$P_E = \begin{bmatrix} 0 & 1 & 1 & 1 \\ 1 & 0 & 1 & 1 \\ 1 & 1 & 1 & 0 \\ 1 & 1 & 1 & 1 \end{bmatrix} \Leftrightarrow {}^T P_E = \begin{bmatrix} 0 & 1 & 1 & 1 \\ 1 & 0 & 1 & 1 \\ 1 & 1 & 1 & 1 \\ 1 & 1 & 0 & 1 \end{bmatrix} \quad (6)$$

It can be proven that $n_d=3$ and $n_1=3$ for the two matrices (see Appendix).

The following is an algorithm for determining the construction of the linear transformation part 344A when given the matrix P. Here, the following conditions are to be met.

(1) Minimization of the number of exclusive ORs (XORs), or (2) Repeated appearance of the similar subconstruction.

Step 1: In the matrix P, choose two rows and XOR the one row (rwo a) with the other row (row b) (hereinafter referred to as a primitive operation).

Step 2: Transform the matrix P into a unit matrix I by repeating the primitive operation, count the number of times the primitive operation was performed, and find a matrix transformation procedure that yields the minimum number of primitive operations.

Step 3: To construct the linear transformation part 344A, lines A and B, which correspond to the rows a and b chosen in step 2, are XORed in the order reverse to the transformation procedure.

In FIG. 7 there is depicted a concrete example of the second key-dependent linear transformation part 344 which has the linear transformation part 344A determined as described above. In the linear transformation part 344A, the four pieces of data $mid_{00}$, $mid_{01}$, $mid_{02}$ and $mid_{03}$ are input to the processing routes $30_0$ to $30_3$, respectively. In the processing route $30_0$, $mid_{00}$ and $mid_{01}$ are XORed by an XOR circuit $31_0$; in the processing route $30_2$, $mid_{02}$ and the output from the XOR circuit $31_0$ are XORed by an XOR circuit $31_2$; and the output from the XOR circuit $31_2$ is XORed with $mid_{01}$ by an XOR circuit $31_1$.

In the processing route $30_3$, the output from the XOR circuit $31_0$ and the data $mid_{03}$ are XORed by an XOR circuit $31_3$; in the processing route $30_1$, the outputs from the XOR circuits $31_1$ and $31_3$ are XORed by an XOR circuit $32_1$; and in the processing route $30_0$, the outputs from the XOR circuit $32_1$ and $31_0$ are XORed by an XOR circuit $32_0$.

The outputs from the XOR circuits $32_0$, $32_1$, $31_2$ and $31_3$ and subkey data $k_{i10}$, $k_{i11}$, $k_{i12}$ and $k_{i13}$ are XORed by XOR circuits $35_0$ to $35_3$ of the key-dependent transformation part 344B, respectively, from which are provided $mid_{10}$, $mid_{11}$, $mid_{12}$ and $mid_{13}$. In other words, the pieces of data $mid_{00}$, $mid_{01}$, $mid_{02}$ and $mid_{03}$ are associated with one another and then undergo linear transformation dependent on the 8-bit subkey data $k_{i10}$, $k_{i11}$, $k_{i12}$ and $k_{i13}$, respectively. In short, logical operations given by the following logical expression are performed.

$$mid_{10} = mid_{00} \oplus mid_{02} \oplus mid_{03} \oplus k_{i10} \quad (7\text{-}1)$$

$$mid_{11} = mid_{01} \oplus mid_{02} \oplus mid_{03} \oplus k_{i11} \quad (7\text{-}2)$$

$$mid_{12} = mid_{00} \oplus mid_{01} \oplus mid_{02} \oplus k_{i12} \quad (7\text{-}3)$$

$$mid_{13} = mid_{00} \oplus mid_{01} \oplus mid_{03} \oplus k_{i13} \quad (7\text{-}4)$$

Incidentally, the subkey $k_{i1}$ is composed of four pieces of data $k_{i10}$, $k_{i11}$, $k_{i12}$ and $k_{i13}$.

As depicted in FIG. 5, these pieces of data $mid_{10}$, $mid_{11}$, $mid_{12}$ and $mid_{13}$ are then nonlinearly transformed in the nonlinear transformation parts $345_0$, $345_1$, $345_2$ and $345_3$ into the data $out_0$, $out_1$, $out_2$ and $out_3$, respectively, which are combined into the single piece of data $Y_i^*$ in the combining part 346. Finally, the data $Y_i^*$ is linearly transformed into the data $Y_i$ by, for example, a $k_{i2}$-bit left rotation in the third key-dependent linear transformation part 347 using the key data $k_{i2}$, thereby generating the output data $Y_i$ from the nonlinear function part 304. The nonlinear transformation parts $343_0$ to $343_3$ and $345_0$ to $345_3$ function just like S-boxes for DES cipher, and they are constructed by, for example, ROM, which receives input data as an address to read out therefrom the corresponding data.

Since the four nonlinear transformation parts $343_0$ to $343_3$ are arranged in parallel and their transformation processes are not associated with one another, hence they can be executed in parallel. The same goes for the nonlinear transformation parts $345_0$ to $345_3$. Thus, the each linear transformation part can be executed in one step for each group (a total of two steps in the nonlinear function part 304). Letting p represent the differential/liner probability of the nonlinear transformation parts $343_0$ to $343_3$ and $345_0$ to $345_3$, the nonlinear function part 304 provides a differential/linear probability $p^4$ as a whole when the second key-dependent linear transformation 344 has such a construction as shown in FIG. 7. Accordingly, when the number of rounds of the entire data transformation device is 3r, an approximate representation is obtained with a probability $P \leq p^{8r}$; for example, when r=4 (12 rounds), $P \leq p^{32}$. In the case of DES cipher, this corresponds to 48 or more rounds, ensuring sufficiently secure against differential cryptanalysis and linear cryptanalysis.

Incidentally, the pieces of key data fk, $k_{00}$, $k_{01}$, $k_{02}$, $k_{10}$, $k_{12}, \ldots, k_{(N-1)1}, k_{(N-1)2}$, ek are data stored in the key storage part 322 in FIG. 4 after being transformed in the expanded key generation part 321 from the master key Key input via the key input part 320 of the key scheduling part 20. The generation of key data in the expanded key generation part 321 may be the same as in the expanded key generation part 21 for DES cipher in FIG. 1, or as in the expanded key generation part 21 by Miyaguchi et al. depicted in FIG. 3.

The initial key-dependent transformation 302 and the final key-dependent transformation part 308 shown in FIG. 4 and the key-dependent linear transformation parts 341, 344 and 347 in each nonlinear function part 304 shown in FIG. 5 are linear transformation parts which depend on keys; therefore, the device of this embodiment is a cryptographic device which is sufficiently secure against both of differential cryptanalysis and linear cryptanalysis and hence attaches primary importance to security.

The present invention is not limited specifically to this example; for example, if speedup is demanded, it is feasible to omit or modify any one of the initial key-dependent transformation part 302, the final key-dependent transformation part 308 and the key-dependent linear transformation parts 341, 344 and 347 to a key-independent transformation part. In this case, the encryption speed can be increased without significantly diminishing the security against differential cryptanalysis and the linear cryptanalysis.

Second Embodiment

Figure 9:
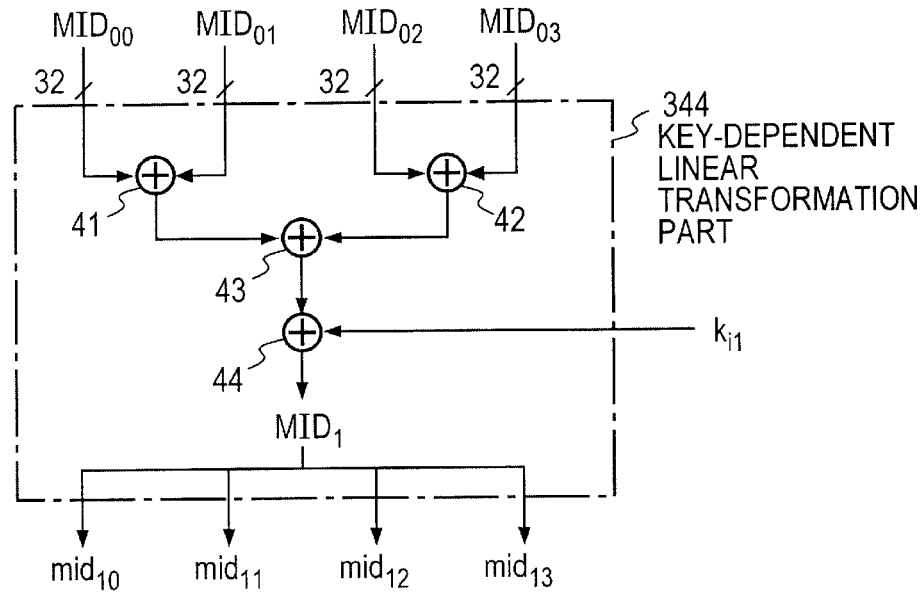
FIG. 9 is a diagram showing the functional configuration of a second key-dependent linear transformation part 344 in the second embodiment.

A description will be given of another embodiment of the nonlinear function part 304 of FIG. 5 in a data transformation device of the same construction as that of the first embodiment depicted in FIG. 4. In this embodiment the nonlinear transformation parts $343_0$, $343_1$, $343_2$ and $343_3$ in FIG. 5 are replaced with nonlinear transformation parts $343_0'$ to $343_3'$ which nonlinearly transform, for example, 8-bit inputs $in_0$ to $in_3$ into 32-bit expanded data $MID_{00}$, $MID_{01}$, $MID_{02}$ and $MID_{03}$ as equivalently shown in FIGS. 8A to 8D, respectively; furthermore, the key-dependent linear transformation part 344 has such a construction as depicted in FIG. 9.

As is the case with the FIG. 5, the data $R_i$ is input to the nonlinear function part 304 together with the key data $k_{i0}$, $k_{i1}$ and $k_{i2}$. The data $R_i$ is linearly transformed into data $R_i^* = R_i \oplus k_{i0}$, for example, by being XORed with the key data $k_{i0}$ in the first key-dependent linear transformation part 341. Next, the data $R_i^*$ is split into four pieces of data $in_0$, $in_1$, $in_2$ and $in_3$ in the splitting part 342. The four pieces of data $in_0$, $in_1$, $in_2$ and $in_3$ are nonlinearly transformed into data $MID_{00}$, $MID_{01}$, $MID_{02}$ and $MID_{03}$ in the nonlinear transformation parts $343_0'$, $343_1'$, $343_2'$ and $343_3'$ depicted in FIGS. 8A to 8D, respectively. In the first embodiment the nonlinear transformation part $343_0$ outputs the m-bit data $mid_{00}$ for the m-bit input $in_0$, whereas in this embodiment the nonlinear transformation part $343_0'$ has an S-box that outputs the same m-bit data $mid_{00}$ as high-order m bits as does the nonlinear transformation part $343_0$ in the first embodiment of FIG. 5 and outputs fixed data "$00 \ldots 0_{(2)}$" as low-order m bits; further, the nonlinear transformation part is designed to output the high-order m-bit data $mid_{00}$ to three routes by duplicating and output the m-bit data "$00 \ldots 0_{(2)}$." That is, the nonlinear transformation part $343_0'$ is means for transforming the m-bit data $in_0$ to 4m-bit data $$MID_{00} = [mid_{00}, 00 \ldots 0_{(2)}, mid_{00}, mid_{00}] \quad (8\text{-}1)$$

Similarly, the nonlinear transformation parts $343_1'$, $343_2'$ and $343_3'$ are means for transforming the input data in1, in2 and in3 to $$MID_{01} = [00 \ldots 0_{(2)}, mid_{01}, mid_{01}, mid_{01}] \quad (8\text{-}2)$$

$$MID_{02} = [mid_{02}, mid_{02}, mid_{02}, 00 \ldots 0_{(2)}] \quad (8\text{-}3)$$

$$MID_{03} = [mid_{03}, mid_{03}, 00 \ldots 0_{(2)}, mid_{03}] \quad (8\text{-}4)$$

The data $MID_{00}$ expressed by Equation (8-1) can be determined by presetting as $MID_{00}$ the entire data which is provided in the four output routes of the linear transformation part 344A when the pieces of data $mid_{01}$, $mid_{02}$ and $mid_{03}$ except $mid_{00}$ are each set as "$00 \ldots 0_{(2)}$." Similarly, the data $MID_{01}$, $MID_{02}$ and $MID_{03}$ expressed by Equations (8-2), (8-3) and (8-4) can also be easily determined. These nonlinear transformation parts $343_0'$ to $343_3'$ may be constructed in memory as transformation tables from which to read out the data $MID_{00}$, $MID_{01}$, $MID_{02}$ and $MID_{03}$ by using the data $in_0$, $in_1$, $in_2$ and $in_3$ as addresses.

Then, these pieces of data $MID_{00}$ to $MID_{03}$ are input to the second key-dependent linear transformation part 344 with the key data $k_{i1}$ as depicted in FIG. 9. $MID_{00}$ and $MID_{01}$ are XORed by an XOR circuit 41; $MID_{02}$ and $MID_{03}$ are XORed by an XOR circuit 42; the outputs from the XOR circuits 41 and 42 are XORed by an XOR circuit 43; and the output from the XOR circuit 43 and the key data $k_{i1}$ are XORed by an XOR circuit 44. The output MID1 from the XOR circuit 44 is split into m-bit outputs $mid_{10}$, $mid_{11}$, $mid_{12}$ and $mid_{13}$. After all, the second key-dependent linear transformation part 344 linearly transforms the input data by the following operation:

$$MID_1 = MID_{00} \oplus MID_{01} \oplus MID_{02} \oplus MID_{03} \oplus k_{i1}. \quad (9)$$

The components of the output $MID_1 = [mid_{10}, mid_{11}, mid_{12}, mid_{13}]$ by this linear transformation operation are expressed by the following equations, respectively:

$$mid_{10} = mid_{00} \oplus mid_{02} \oplus mid_{03} \oplus k_{i10} \quad (10\text{-}1)$$

$$mid_{11} = mid_{01} \oplus mid_{02} \oplus mid_{03} \oplus k_{i11} \quad (10\text{-}2)$$

$$mid_{12} = mid_{00} \oplus mid_{01} \oplus mid_{02} \oplus k_{i12} \quad (10\text{-}3)$$

$$mid_{13} = mid_{00} \oplus mid_{01} \oplus mid_{03} \oplus k_{i13} \quad (10\text{-}4)$$

These linear transformation operations are equivalent to those in FIG. 7 given by Equations (7-1) to (7-4). In this way, the same pieces of data $mid_{10}$, $mid_{11}$, $mid_{12}$ and $mid_{13}$ as those in the first embodiment are generated. Incidentally, $k_{i1}$ is composed of four pieces of data $k_{i10}$, $k_{i11}$, $k_{i12}$ and $k_{i13}$.

Then, the four pieces of data $mid_{10}$, $mid_{11}$, $mid_{12}$ and $mid_{13}$ are nonlinearly transformed into data $out_0$, $out_1$, $out_2$ and $out_3$ in the nonlinear transformation parts $345_0$, $345_1$, $345_2$ and $345_3$, respectively, as in the FIG. 5, and in the combining part 346 the four pieces of data $out_0$, $out_1$, $out_2$ and $out_3$ are combined into the single piece of data $Y_i^*$. Finally, the data $Y_i^*$ is linearly transformed into the data $Y_i$ by, for example, a $k_{i2}$-bit left rotation in the third key-dependent linear transformation part 347 using the key data $k_{i2}$, thereby generating the output data $Y_i$ from the nonlinear function part 304.

In the second embodiment depicted in FIGS. 8A to 8D and 9, it is also possible to form, as is the case with the first embodiment, the nonlinear transformation parts $343_0$ to $343_3$ of FIGS. 8A to 8D by only S-boxes which output 8-bit data $mid_{00}$ to $mid_{03}$, respectively, and to provide the wirings shown in FIGS. 8A to 8D and a register which outputs 8-bit data "$00 \ldots 0$" in the key-dependent linear transformation part 344 to generate therein the data $MID_{00}$ to $MID_{03}$.

The second key-dependent linear transformation part 344 in this embodiment implements linear transformation equivalent to that shown in FIG. 7 through the use of four XOR circuits as depicted in FIG. 9 (in FIG. 7 ten XORs), and hence permits faster transformation than in the first embodiment.

Furthermore, as is the case with the first embodiment, the four nonlinear transformation parts $343_0$ to $343_3$ and $345_0$ to $345_3$ are arranged in parallel and their nonlinear transformation processes are not associated with one another, and hence they can be executed in parallel. Besides, letting p represent the differential/liner probability of the nonlinear transformation parts $343_0$ to $343_3$ and $345_0$ to $345_3$, the differential/linear probability of the nonlinear function 304 becomes $p^4$ as a whole.

Third Embodiment

A description will be given of another embodiment of the nonlinear function part 304 of still another functional configuration in the data transformation device that has the functional configuration depicted in FIG. 4 as in the first embodiment.

As depicted in FIG. 5, for example, a 32-bit data $R_i$ is input to the nonlinear function part 304 together with the key data $k_{i0}$, $k_{i1}$ and $k_{i2}$ stored in the key storage part 322. The data $R_i$ is linearly transformed into data $R_i^* = R_i \oplus k_{i0}$ by, for example, XORing with the key data $k_{i0}$ in the first key-dependent linear transformation part 341. Then the data $R_i^*$ is split into four pieces of, for example, 8-bit data $in_0$, $in_1$, $in_2$ and $in_3$ in the splitting part 342.

Figure 10:
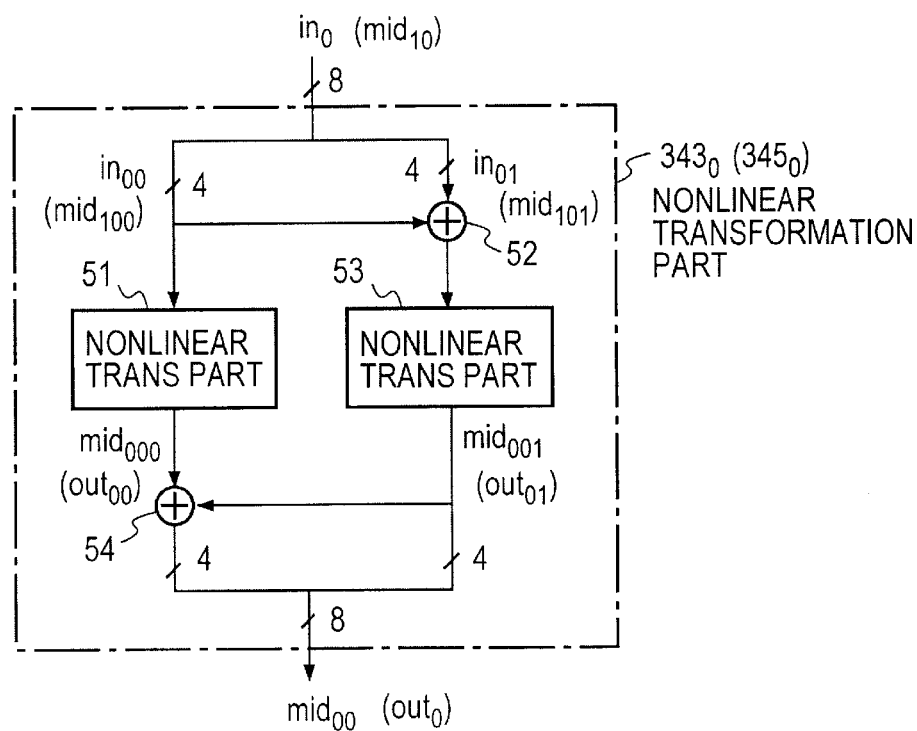
FIG. 10 is a diagrqm showing the functional configuration of a nonlinear function part $343_0$ ($345_0$) in the third embodiment.

In the nonlinear transformation part $343_0$, as shown in FIG. 10, for instance, the data $in_0$ is further split into two, for example, 4-bit subblocks $in_{00}$ and $in_{01}$; the subblock $in_{00}$ is transformed to data $mid_{000}$ in a sub-nonlinear transformation part 51 and, at the same time, it is XORed with the data $in_{01}$ by an XOR circuit 52, whose output $in_{00} \oplus in_{01}$ is transformed into data $mid_{001}$ in a sub-nonlinear transformation part 53. Thereafter, these outputs $mid_{000}$ and $mid_{001}$ are XORed by an XOR circuit 54, and its output and the data $mid_{001}$ are combined into the data $mid_{00}$. That is, the nonlinear transformation part $343_0$ splits the input $in_0$ into two subblocks, then performs linear transformation and nonlinear transformation of the two subblocks, and combines the two resulting output subblocks into the output from the nonlinear transformation part. Similarly, the other remaining pieces of data $in_1$, $in_2$ and $in_3$ are also transformed into the data $mid_{01}$, $mid_{02}$ and $mid_{03}$ in the nonlinear transformation parts $343_1$, $343_2$ and $343_3$ each having the functional configuration shown in FIG. 10 which comprises two nonlinear transformation parts and two XOR circuits.

These pieces of transformed data $mid_{00}$, $mid_{01}$, $mid_{02}$ and $mid_{03}$ input to the second key-dependent linear transformation part 344 depicted in FIG. 7 which uses the key data $k_{i1}$. The transformation part 344 performs the aforementioned operations of Equations (7-1) to (7-4).

Then, the data $mid_{10}$ is input to the nonlinear transformation part $345_0$ of the same functional consfiguration as shown in FIG. 10, wherein it is further split into two subblocks $mid_{100}$ and $mid_{101}$. The subblock $mid_{100}$ is transformed into data $out_{00}$ in the sub-nonlinear transformation part 51. The subblocks $mid_{100}$ and $mid_{101}$ are XORed by the XOR circuit 52, and its output $mid_{100} \oplus mid_{101}$ is transformed into data $out_{01}$ in the nonlinear transformation part 53. Then, the two pieces of data $out_{00}$ and $out_{01}$ are XORed by the XOR circuit 54, and its output $out_{00} \oplus out_{01}$ and the data $out_{01}$ are combined into $out_0$. Similarly, the other remaining pieces of data $mid_{11}$, $mid_{12}$ and $mid_{13}$ are also transformed into the data $out_1$, $out_2$ and $out_3$ in the nonlinear transformation parts $345_1$, $345_2$ and $345_3$ each having the functional configuration shown in FIG. 10 which comprises the two sub-nonlinear transformation parts 51, 53 and the two XOR circuits 52, 54.

The four pieces of thus nonlinearly transformed data $out_0$, $out_1$, $out_2$ and $out_3$ are combined into a single piece of data $Y_i^*$ in the combining part 346. Finally, the data $Y_i^*$ is linearly transformed into data $Y_i$, for example, by a $k_{i2}$-bit left rotation in the third key-dependent linear transformation part 347 using the key data $k_{i2}$, by which the output data $Y_i$ from the nonlinear function part 304 is generated.

As described above, according to this embodiment, in each of the nonlinear transformation parts $343_0$ to $343_3$ and $345_0$ to $345_3$ the input data is split to two pieces of data, which are nonlinearly transformed in the two sub-nonlinear transformation parts (51 and 53 in FIG. 10). Hence, it is possible to input to the nonlinear transformation parts $343_0$ to $343_3$ and $345_0$ to $345_3$ data of a bit length twice larger than that of data that the 16 sub-nonlinear transformation parts can handle. For example, assuming that the sub-nonlinear transformation parts 51 and 53 are 8-bit S-boxes, each input data to the nonlinear transformation parts $343_0$ to $343_3$ and $345_0$ to $345_3$ is 16 bits length and the input data to the nonlinear function part 304 is 64 bits length. As a result, the block length in the data transformation device of FIG. 4 can be made 128 bits length.

The sub-nonlinear transformation parts 51 and 53 are arranged in parallel in groups of eight and their nonlinear transformation processes are not associated with one another, and hence they can be executed in parallel. Further, letting p represent the differential/linear probabilities of the sub-nonlinear transformation parts 51 and 53, the nonlinear function part 304 provides a differential/linear probability $p^4$ as a whole.

In the above, the first key-dependent linear transformation part 341, the second key-dependent transformation part 344 and the third key-dependent transformation part 347 need not always be key-dependent, i.e., the linear transformation may be performed in subdata.

Figure 11:
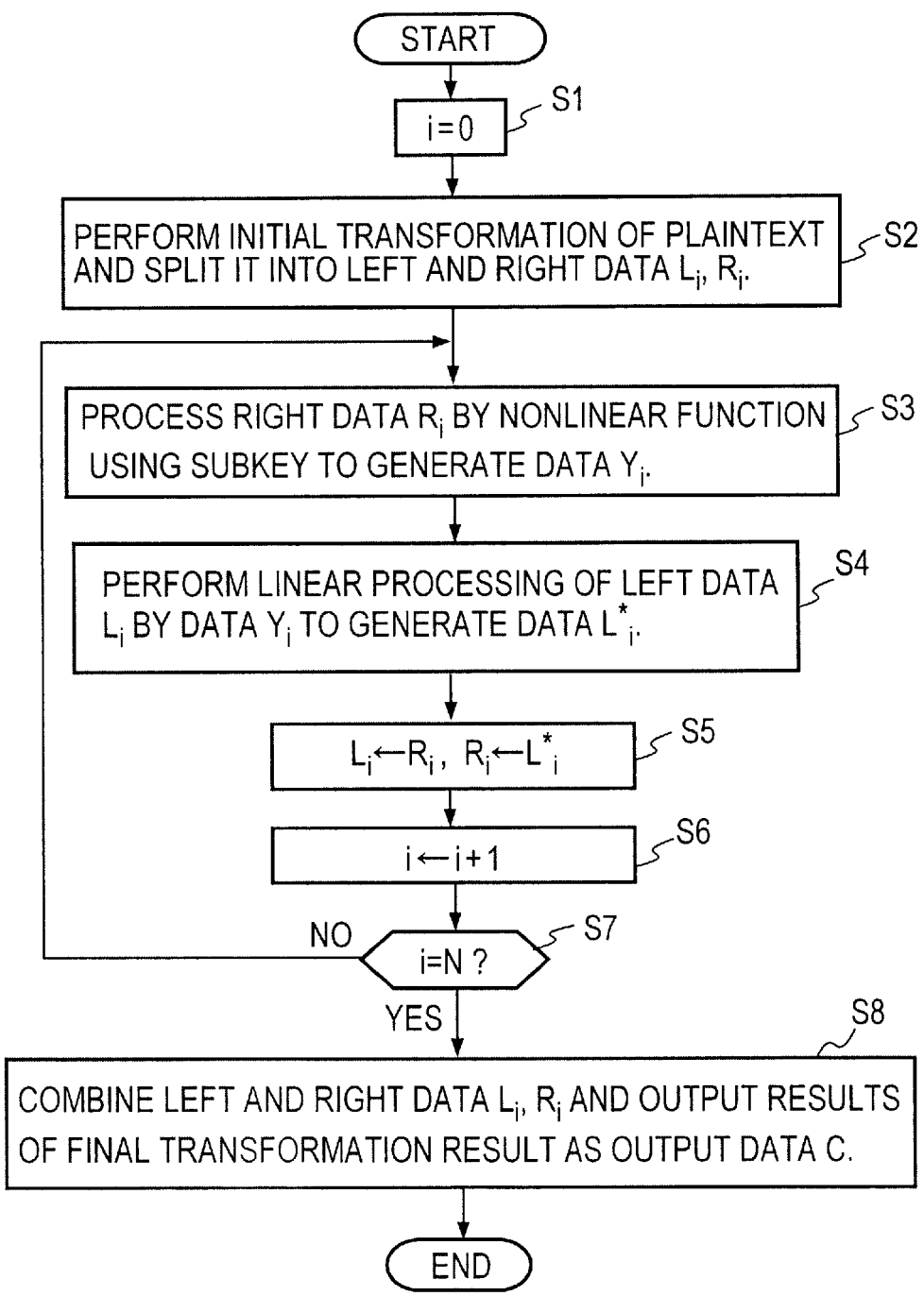
FIG. 11 is a flowchart showing the procedure for implementing a data transformation by a computer.

While in the above the data processing has been described to be performed using a hardware structure, it may also be implemented by software that follows a program. For example, FIG. 11 is a flowchart showing the principal part of the procedure for data processing. FIG. 11 shows the procedure corresponding to the entire procedure of FIG. 4.

Step S1: Initialize to 0 a variable i representing the repeat count of processing.

Step S2: Perform initial transformation of an input plaintext and split it into left and right block data $L_i$ and $R_i$.

Step S3: Process the right block data $R_i$ by a nonlinear function using the subkey $k_i$ to generate the block data $Y_i$.

Step S4: Perform linear processing of the left block data $R_i$ by the block data $Y_i$ to generate the block data $L_i^*$.

Step S5: Change the right block data $R_i$ to new left block data $L_i$ and the block data $L_i^*$ to new right block data $R_i$.

Sep S6: Increment the variable i by one.

Step S7: Check to see if i has reached N, and if not, return to step S3 and repeat steps S3 to S7.

Step S8: If it is decided in step S7 that the variable i has reached N, combine the left and right data $L_i$ and $R_i$ and output the result of final transformation as output data C.

Figure 12:
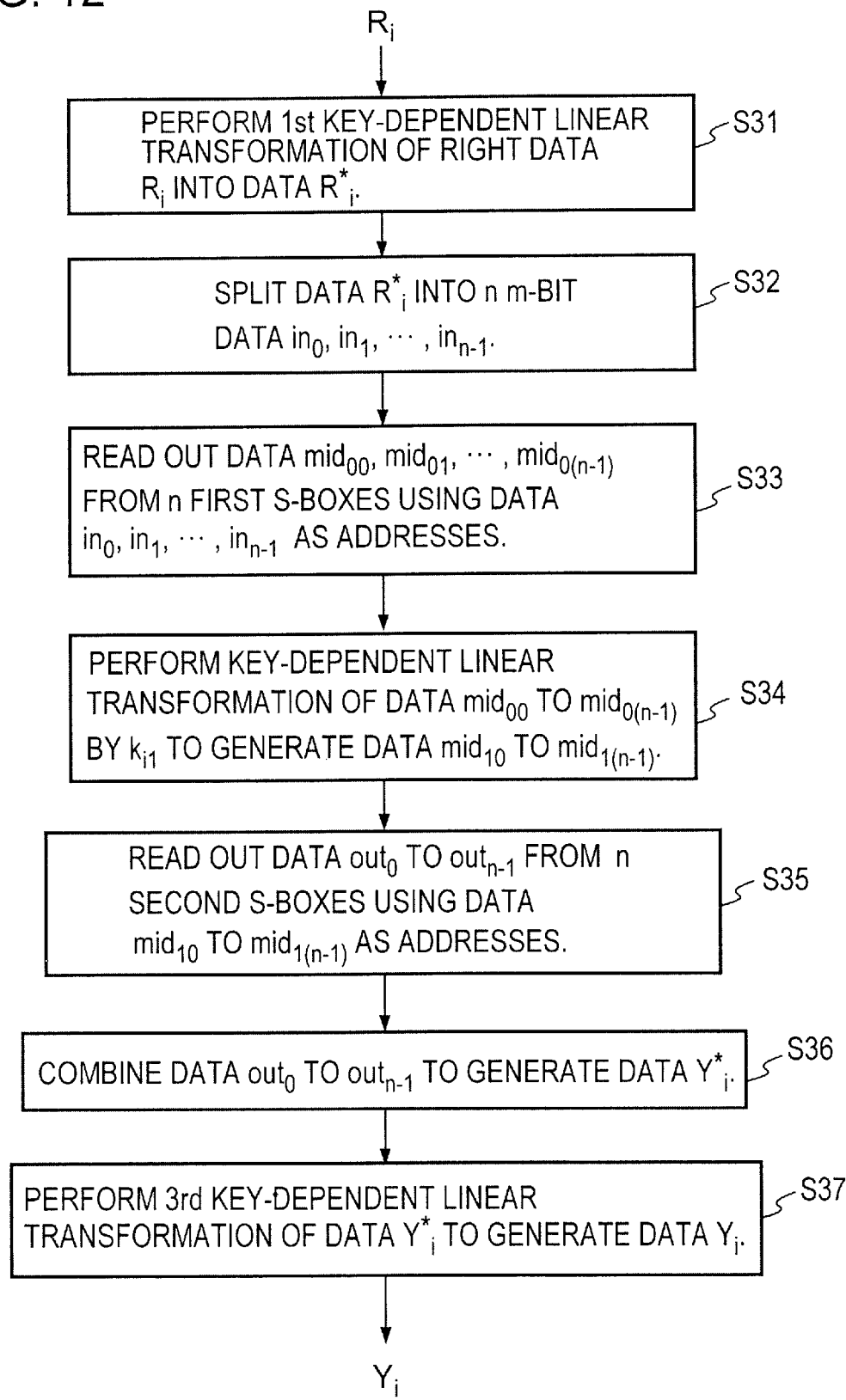
FIG. 12 is a flowchart showing in detail the procedure of step S3 in FIG. 11.

Details of the process by step S3 in FIG. 11 correspond to the process by the nonlinear function part 304 shown in FIG. 5, and the procedure is depicted in FIG. 12.

Step S31: Perform first key-dependent linear transformation of the right data $R_i$ into the data $R_i^*$.

Step S32: Split the data $R_i^*$ into n m-bit data $in_0$, $in_1$, ... $in_{n-1}$ (where m=8 and n=4, for instance).

Step S33: Read out data $mid_{00}$, $mid_{01}$, ..., $mid_{0(n-1)}$ from n first S-boxes using the data $in_0$, $in_1$, ..., $in_{n-1}$ as addresses.

Step S34: Perform key-dependent linear transformation of the data $mid_{00}$ to $mid_{0(n-1)}$ by the subkey $k_{i1}$ to generate data $mid_{10}$ to $mid_{1(n-1)}$.

Step S35: Read out data $out_0$ to $out_{n-1}$ from n second S-boxes using the data $mid_{10}$ to $mid_{1(n-1)}$ as addresses.

Step S36: Combine the data $out_0$ to $out_{n-1}$ into data $Y^*_i$.

Step S37: Perform third key-dependent linear transformation of the data $Y^*_i$ to generate data $Y_i$ and output it.

The operations in step S34 may be the operations by Equations (7-1) to (7-4) or Equation (9) using the definitions by Equations (8-1) to (8-4). While FIG. 11 depicts the procedure that repeats steps S3 to S7 by the number of rounds involved, the individual processes by the round processing parts $38_0$ to $38_{N-1}$ shown in FIG. 4 may also be programmed intact to implement the data diffusion part according to the present invention.

Fourth Embodiment

The first embodiment depicted in FIG. 4 is an embodiment in which the basic linear transformation part 344A of FIG. 6, which constitutes the second key-dependent linear transformation part 344 of the nonlinear function part 304 (FIG. 5), is represented by a 4×4 matrix (that is, four inputs-four outputs). The fourth embodiment will be described below in connection with the case where the linear transformation part 344A is represented by an 8×8 matrix.

Figure 13:
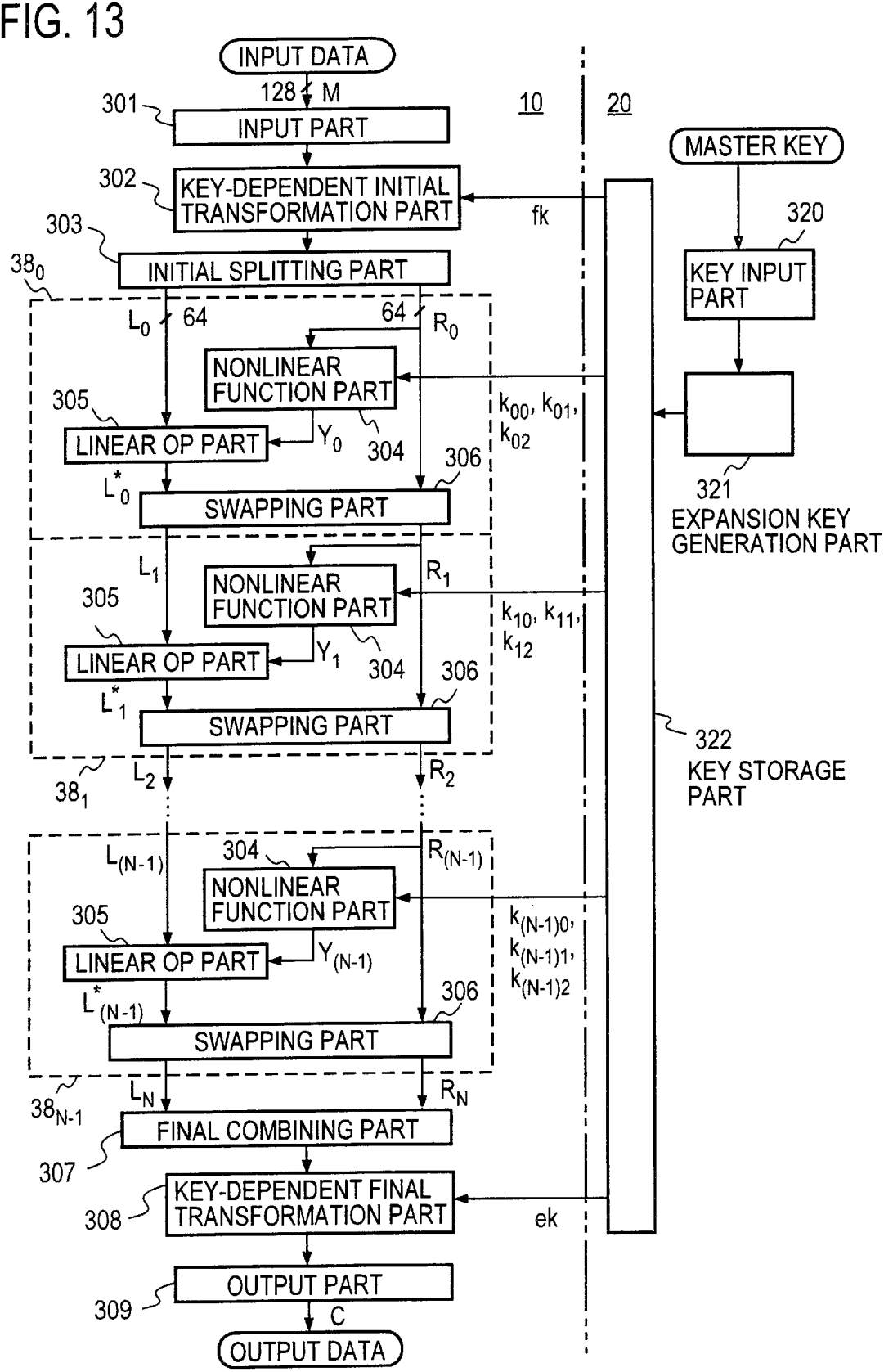
FIG. 13 is a diagram depicting the functional configuration of the fourth embodiment of the present invention.

FIG. 13 illustrates the function configuration of the encryption procedure in the data transformation device according to the fourth embodiment of the present invention. This configuration itself is identical with that of the first embodiment but differs from the latter in the data length and the split number n of data to be split in the nonlinear function part 304.

The input data M is transformed in the initial key-dependent transformation part 302 using the key data fk stored in the key storage part 322 and is split to left and right block data $L_0$ and $R_0$ in the initial splitting part 303. For example, 128-bit data is split into two pieces of 64-bit block data $L_0$ and $R_0$. The key-dependent initial transformation part 302 performs a linear transformation such as exclusive ORing of the key data fk and the input data M or bit rotation of the input data M by the key data fk, or nonlinear transformation by a combination of multiplications.

The right block data $R_0$ is provided to the nonlinear function part 304 together with the key data $k_{00}$, $k_{01}$ and $k_{02}$ stored in the key storage part 322, and in the nonlinear function part 304 it is nonlinearly transformed to data $Y_0$. The data $Y_0$ and the data $L_0$ are transformed by a linear operation to data $L_0^*$ in the linear operation part 305. The data $L_0^*$ and the data $R_0$ undergo data-position swapping in the swapping part 306 to provide $L_1 \leftarrow R_0$ and $R_1 \leftarrow L_0^*$, and the pieces of data $L_1$ and $R_1$ are fed to the next first round processing part $38_1$.

Thereafter, in an i-th round processing parts $38_i$ (where i=0, 1, ..., N-1) the same processing as mentioned above is repeated for two pieces of input block data $L_i$ and $R_i$. That is, the right block data $R_i$ is input to the nonlinear function part 304 together with the key data $k_{i0}$, $k_{i1}$ and $k_{i2}$, and in the nonlinear function part 304 it is nonlinearly transformed to block data $Y_i$. The block data $Y_i$ and the block data $L_i$ are transformed to data $L_i^*$ by a linear operation in the linear operation part 305. The data $L_i^*$ and the data $R_i$ are swapped in data position in the swapping part 306, that is, $L_{i+1} \leftarrow R_i$, $R_{i+1} \leftarrow L_i^*$. The linear operation part 305 is to perform, for instance, an exclusive OR operation.

Letting N represent the number of rounds suitable to provide security of a data transformation device, two pieces of left and right data $L_N$ and $R_N$ are obtained as the result of such repeated processing. These pieces of data $L_N$ and $R_N$ are combined into a single piece of block data in the final combining part 307; for example, the two pieces of 64-bit data $L_N$ and $R_N$ are combined to 128-bit data. Then the thus combined data is transformed in a final linear transformation part 308 using the key data ek stored in the key storage part 322, and output data C is provided as a ciphertext from the output part 309.

In decryption, the plaintext M can be derived from the ciphertext C by reversing the encryption procedure. In particular, when the key-dependent final transformation part 308 is one that performs transformation inverse to that of the key-dependent initial transformation part 302, the decryption can be done by inputting ciphertext data in place of the input data in FIG. 13 and then inputting the key data in a sequential order reverse to that in FIG. 13, that is, ek, $k_{(N-1)0}$, $k_{(N-1)1}$, $k_{(N-1)2}$, ..., $k_{10}$, $k_{11}$, $k_{12}$, $k_{00}$, $k_{01}$, $k_{02}$, fk.

Figure 14:
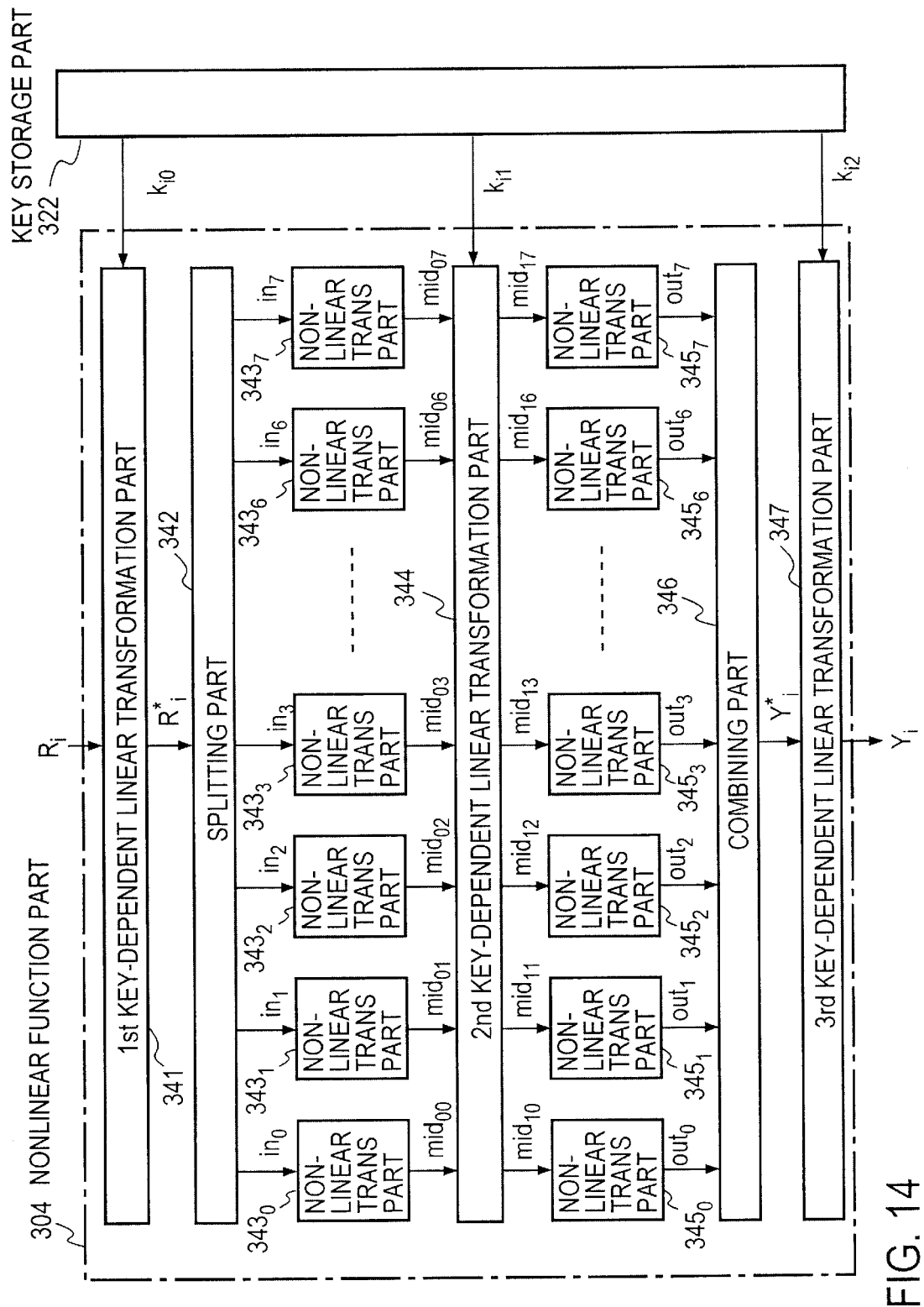
FIG. 14 is a diagram depicting the functional configuration of a nonlinear function part 304 in FIG. 13.

Next, a detailed description will be given of the internal configuration of the nonlinear function part 304. FIG. 14 is a diagrammatic showing of the internal functional configuration of the nonlinear function part 304.

The right block data $R_i$ is input to the nonlinear function part 304 together with the key data $k_{i0}$, $k_{i1}$ and $k_{i2}$ stored in the key storage part 322.

In the first key-dependent linear transformation part 341 the right block data $R_i$ is transformed to data $R_i^* = R_i \oplus k_{i0}$, for example, by XORing with the subkey data $k_{i0}$. The thus transformed data $R_i^*$ is split to n=8 pieces of data $in_0$, $in_1$, $in_2$, ..., $in_7$ in the splitting part 342. The eight pieces of data $in_0$ to $in_7$ are nonlinearly transformed to data $mid_{00}$ to $mid_{07}$ in nonlinear transformation parts $343_0$ to $343_7$, thereafter being input to the second key-dependent linear transformation part 344 using the key data $k_{i1}$.

The second key-dependent linear transformation part 344 performs linear transformation (XORing) among the pieces of data $mid_{00}$, $mid_{01}$, $mid_{02}$, ..., $mid_{07}$ input from eight routes to provide new data of eight routes, and further performs linear transformation (XORing) among these pieces of data of the eight routes with eight parts of the key data $k_{i1}$ to provide output data $mid_{10}$, $mid_{11}$, $mid_{12}$, ..., $mid_{17}$ of the eight routes. The eight pieces of data are input to nonlinear transformation parts $345_0$, $345_1$, $345_2$, ..., $345_7$, wherein they are transformed to data $out_0$, $out_1$, $out_2$, ..., $out_7$, respectively. These eight pieces of data are combined into data $Y_i^*$ in a combining part 346; furthermore, in the third key-dependent linear transformation part 347 the data $Y_i^*$ undergoes linear transformation with the key data $k_{i2}$ to generate output data $Y_i$.

The second key-dependent linear transformation part 344 contains the linear transformation part 344A expressed by an n×n matrix as described previously with respect to FIG. 6; in this embodiment n=8. In this instance, assume that the linear transformation part is bijective. That is, rank(P)=8. A description will be given of the determination of an 8×8 matrix P that yield a maximum value of $n_d$ as described in the embodiment 1. In this instance, the security threshold T is reduced one by one in the order T=8, 7, ..., and the following algorithm is executed for each value.

Step 1: Set the security threshold T (where T is an integer such that $2 \leq T \leq n$).

Step 2: Prepare a set of column vectors C whose Hamming weights are equal to or larger than T−1.

Step 3: Select a subset $P_c$ of eight column vectors from the set C. If rank($P_c$)≠8, then the subset $P_c$ is not accepted as a candidate.

Step 3-1: Compute $n_d$ for $P_c$ as follows.

For any two columns (columns a, b):

$$n_{d0} = 2 + \min_{(a,b)} \#\{(t_{ia}, t_{ib}) | t_{ia} \oplus t_{ib} \neq 0, 0 \leq i \leq 8\}$$

For any three columns (columns a, b, c):

$$n_{d1} = 3 + \min_{(a,b,c)} \#\{(t_{ia}, t_{ib}, t_{ic}) | t_{ia} \oplus t_{ib} \oplus t_{ic} \neq 0, 0 \leq i \leq 8\}$$

$$n_{d2} = 3 + \min_{(a,b,c)} \#\{(t_{ia}, t_{ib}, t_{ic})\}$$

Exception of (0,0,0),(1,1,1), $0 \leq i \leq 8$}

For any four columns (columns a, b, c, d):

$$n_{d3} = 4 + \min_{(a,b,c,d)} \#\left\{(t_{ia},t_{ib},t_{ic},t_{id})\Big|\begin{matrix}(0,0,0,1),(0,0,1,0),(1,0,0,0)\\(0,1,1,1),(1,0,1,1),(1,1,1,0)\end{matrix},0\leq i<8\right\}$$

$$n_{d4} = 4 + \min_{(a,b,c,d)} \#\{(t_{ia},t_{ib},t_{ic},t_{id})\}$$

Exception of $(0,0,0,0),(1,1,0,0),(0,1,1,1),(1,0,1,1)$, $0\leq i<8\}$ $$n_{d5} = 4 + \min_{(a,b,c,d)} \#\{(t_{ia},t_{ib},t_{ic},t_{id})\}$$

Exception of $(0,0,0,0),(1,0,1,0),(0,1,1,1),(1,1,0,1)$, $0\leq i<8\}$ $$n_{d6} = 4 + \min_{(a,b,c,d)} \#\{(t_{ia},t_{ib},t_{ic},t_{id})\}$$

Exception of $(0,0,0,0),(1,0,0,1),(0,1,1,1),(1,1,1,0)$, $0\leq i<8\}$ $$n_{d7} = 4 + \min_{(a,b,c,d)} \#\{(t_{ia},t_{ib},t_{ic},t_{id})\}$$

Exception of $(0,0,0,0),(0,1,1,0),(1,0,1,1),(1,1,0,1)$, $0\leq i<8\}$ $$n_{d8} = 4 + \min_{(a,b,c,d)} \#\{(t_{ia},t_{ib},t_{ic},t_{id})\}$$

Exception of $(0,0,0,0),(0,1,0,1),(1,0,1,1),(1,1,1,0)$, $0\leq i<8\}$ $$n_{d9} = 4 + \min_{(a,b,c,d)} \#\{(t_{ia},t_{ib},t_{ic},t_{id})\}$$

Exception of $(0,0,0,0),(0,0,1,1),(1,1,0,1),(1,1,1,0)$, $0\leq i<8\}$
$n_d = \min\{n_{di}|0\leq i \leq 9\}$ Intuitively, Equations $n_{d0}$ to $n_{d9}$ represent the minimum number of active s-boxes in the second nonlinear transformation part 345 (second term on the right-hand side) and the total number of active s-boxes (the left-hand side) at that time, when the number of active s-boxes in the first nonlinear transformation part 343 (first term on he right-hand side) is determined. For example, when there are two active s-boxes in the first nonlinear transformation part 343, its difference values can be represented as $\Delta z_a$ and $\Delta z_b$, respectively. At this time, $$[\Delta z'_i]=[t_{ia}\Delta z_a \oplus t_{ib}\Delta z_b](0\leq i<8) \quad (11)$$

In particular, when $\Delta z_a = \Delta z_b$, $$[\Delta z'_i]=[(t_{ia}\oplus t_{ib})\Delta z_n](0\leq i<8) \quad (12)$$

Accordingly, the minimum number of active s-boxes in this case is given by $n_{d0}$.

As a result of our search for the matrix P through of the above search algorithm, it has been found that there is no matrix with $n_d \geq 6 = T$ but that there are 10080 candidate matrices with $n_d = 5 = T$. Hence, the invulnerability of the round function using such a matrix P against differential cryptanalysis is $p \leq p_s^5$. And the invulnerability against linear cryptanalysis is also $q \leq p_s^5$.

Figure 15A:
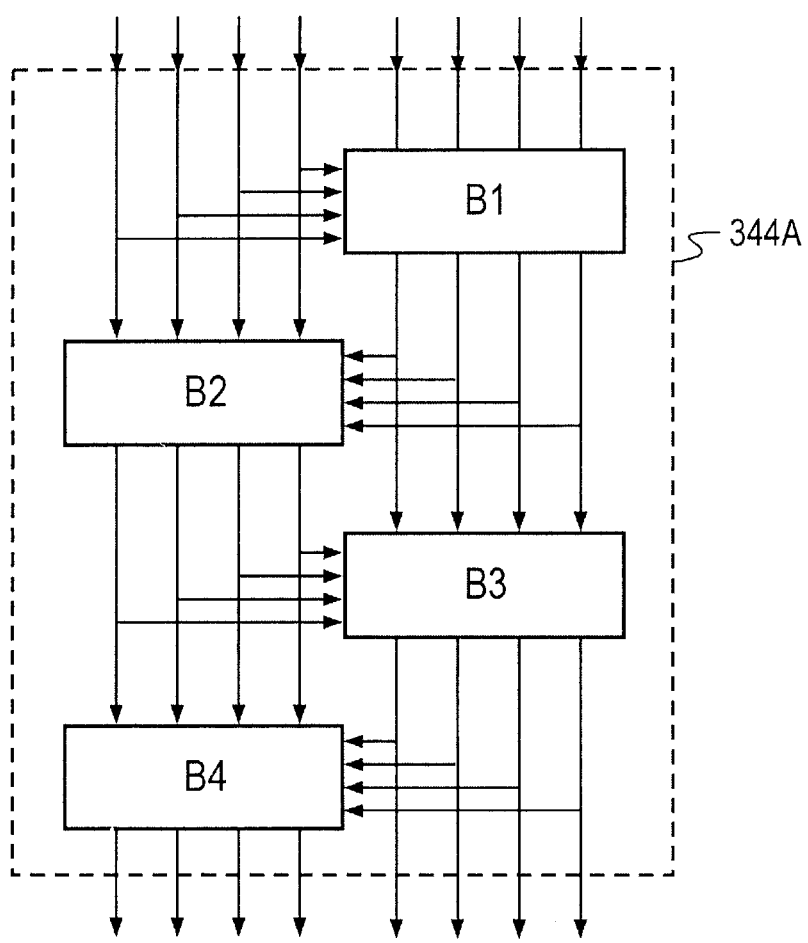
FIG. 15A is a diagram depicting a linear transformation part 334A of a limited structure intended to reduce the computational complexity involved in search.
Figure 15B:
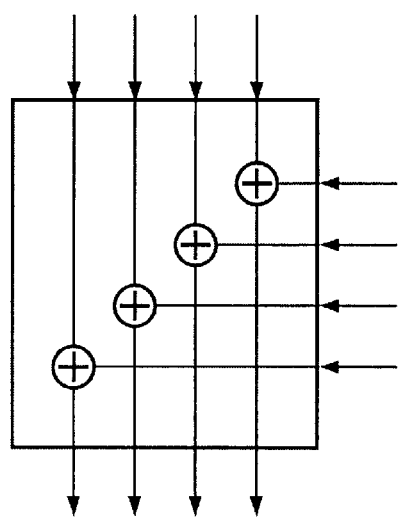
FIG. 15B is a diagram depicting an example of configuration of one transformation box in FIG. 15A.

The construction of the linear transformation part is determined among the above-mentioned 10080 candidate matrices P. The determination of the construction by an exhaustive search involves a computational complexity of approximately $(8\times 7)^{16} \approx 2^{93}$ when 16 XORs are used—this is impossible to perform. Then, the construction is limited to one that the linear transformation part 344A is composed of four boxes B1 to B4 with 8 inputs and 4 outputs as depicted in FIG. 15A. The boxes are each formed by four XOR circuits. as shown in FIG. 15B and designed so that every input line passes through one of the XOR circuit. Accordingly, the linear transformation part 344A comprises a total of 16 XOR circuits. In this instance, the computational complexity is around $(4\times 3\times 2\times 1)^4 \approx 2^{18}$, which is sufficiently small for the exhaustive search.

While in FIG. 15A four transformation boxes are alternately inserted in the lines of left and right four routes, these lines may be determined to be arbitrarily selected four lines and the other remaining four lines. Each transformation box is supplied with inputs from the four lines in which it is inserted and inputs from the remaining four lines and outputs the results of transformation to the former four lines.

As the result of searching the 10080 matrices obtained by the above search algorithm for matrices which constitute the unit matrix I with 16 primitive operations (XORs) while satisfying the construction of FIG. 15, it was found that there are 57 constructions. The matrix P of one of such construction is shown below.

$$P = \begin{bmatrix} 0 & 1 & 1 & 1 & 1 & 1 & 1 & 0 \\ 1 & 0 & 1 & 1 & 0 & 1 & 1 & 1 \\ 1 & 1 & 0 & 1 & 1 & 0 & 1 & 1 \\ 1 & 1 & 1 & 0 & 1 & 1 & 0 & 1 \\ 1 & 1 & 0 & 1 & 1 & 1 & 0 & 0 \\ 1 & 1 & 1 & 0 & 0 & 1 & 1 & 0 \\ 0 & 1 & 1 & 1 & 0 & 0 & 1 & 1 \\ 1 & 0 & 1 & 1 & 1 & 0 & 0 & 1 \end{bmatrix} \quad (13)$$

Figure 16:
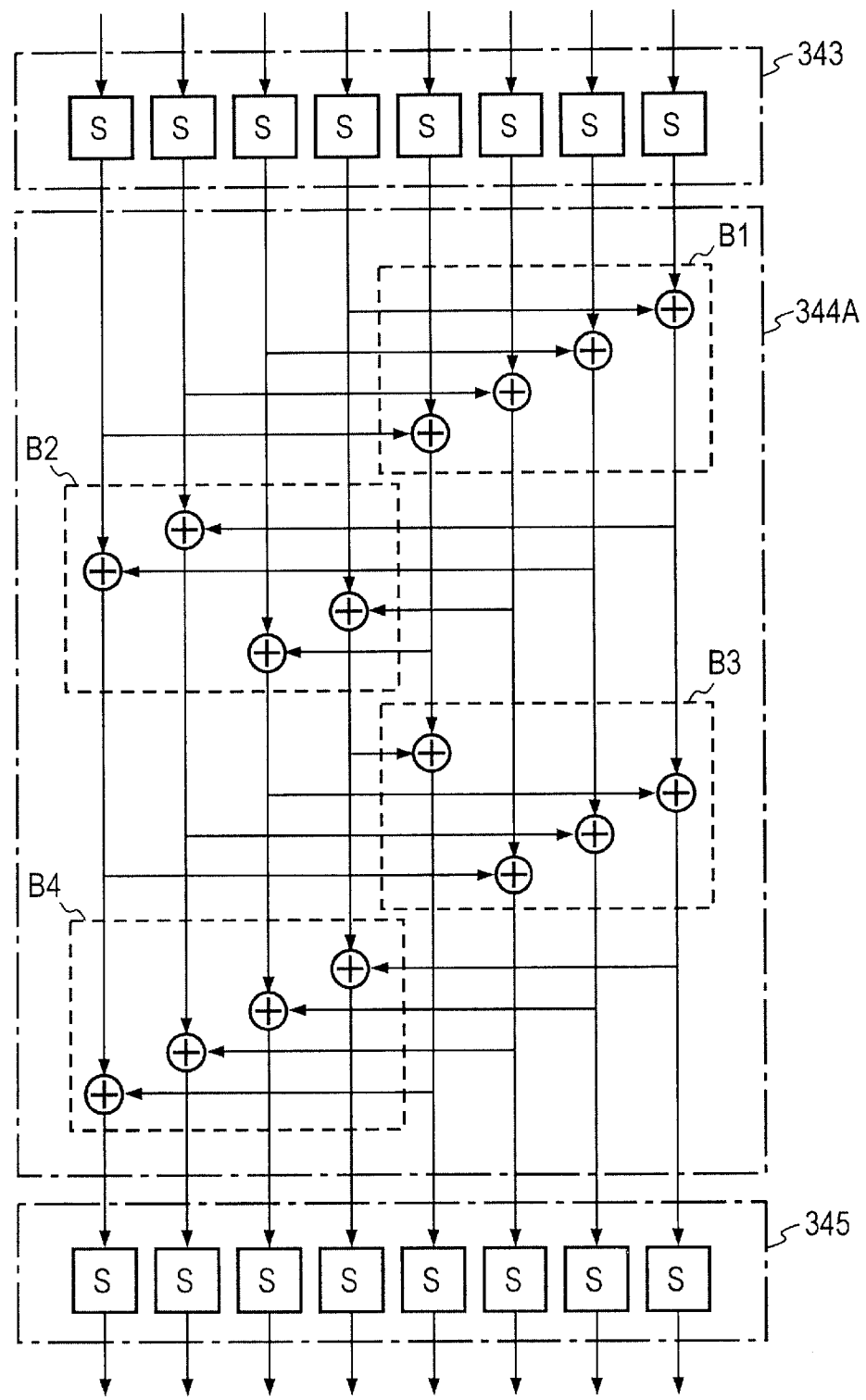
FIG. 16 is a diagram depicting an example of the configuration of a linear transformation part 344A determined by the search algorithm.

In FIG. 16 there is depicted an example of the construction of the linear transformation part 344A using this matrix, together with the nonlinear transformation parts 343 and 345. As shown, four transformation boxes B1 to B4 are alternately inserted in lines of four left and right routes from eight S-boxes forming the first linear transformation part 343, and consequently, two XOR circuits are inserted in each line.

As is the case with the 4×4 matrix in the first embodiment, it can be as certained as mentioned below whether the matrix for the mask value path is a transposed matrix of the matrix P in the linear transformation part 344A of FIG. 16 and whether $n_1 = 5$ correctly holds. By constructing a mask value path in the linear transformation part 344A of FIG. 16 using concatenation rules defined by Theorem 2 in the Appendix, the matrix $^TP$ for the mask value path can be computed as follows:

$$^TP = \begin{bmatrix} 0 & 1 & 1 & 1 & 1 & 1 & 0 & 1 \\ 1 & 0 & 1 & 1 & 1 & 1 & 1 & 0 \\ 1 & 1 & 0 & 1 & 0 & 1 & 1 & 1 \\ 1 & 1 & 1 & 0 & 1 & 0 & 1 & 1 \\ 1 & 0 & 1 & 1 & 1 & 0 & 0 & 1 \\ 1 & 1 & 0 & 1 & 1 & 1 & 0 & 0 \\ 1 & 1 & 1 & 0 & 0 & 1 & 1 & 0 \\ 0 & 1 & 1 & 1 & 0 & 0 & 1 & 1 \end{bmatrix} \quad (14)$$

This indicates that the matrix $^TP$ is a transposed matrix of the matrix P. Further, it can be confirmed that the minimum number of active s-boxes is $n_1 = 5$.

Figure 17:
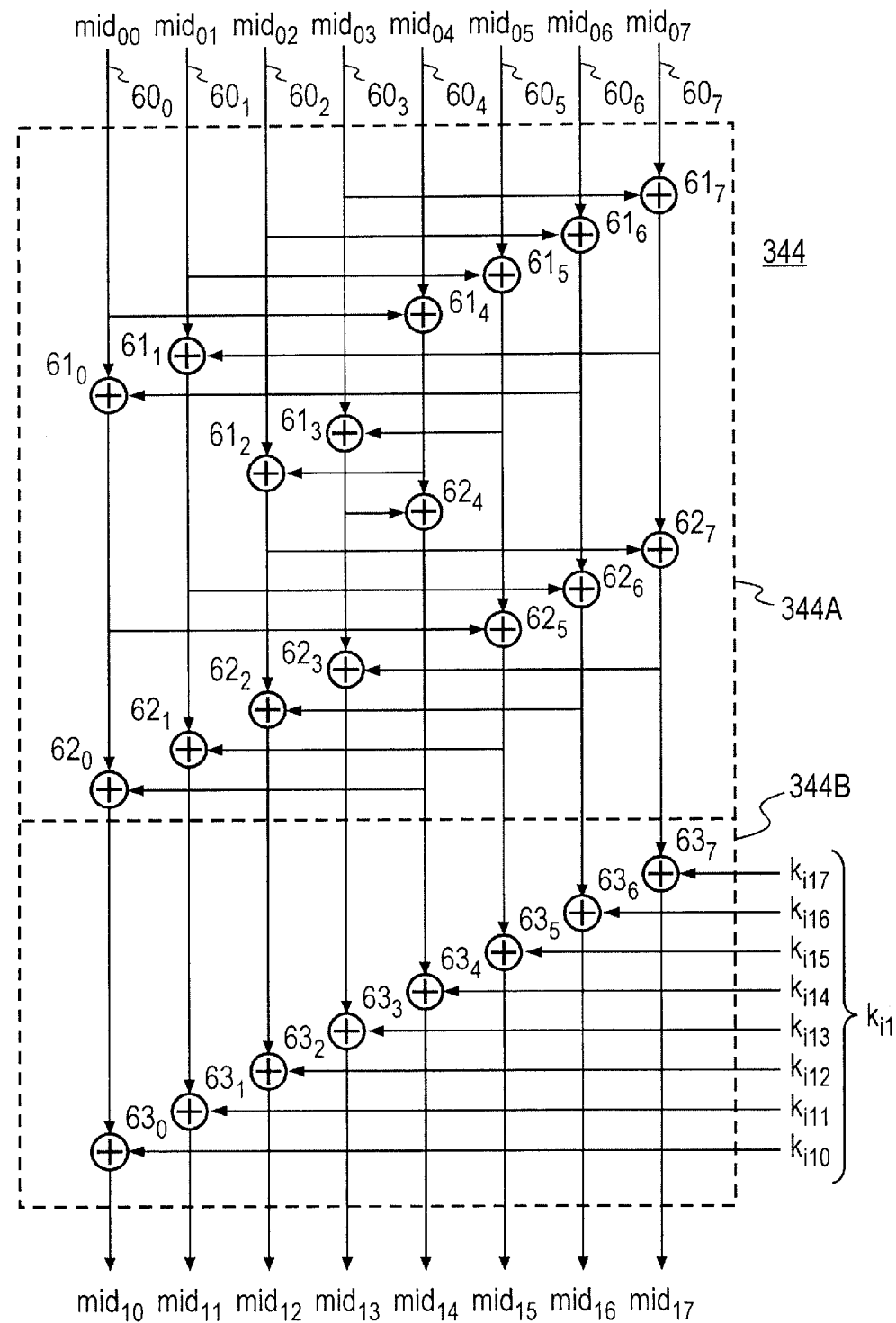
FIG. 17 is a diagram depicting an example of the functional configuration of a second key-dependent linear transformation part 344 in FIG. 14 in the fourth embodiment.

FIG. 17 illustrates concrete examples of the second key-dependent linear transformation part 344 which comprises the linear transformation part 344A of the construction determined above and a key transformation part 344B.

The key transformation part 344B calculates the XORs of the key data $k_{i10}, k_{i11}, k_{i12}, \ldots, k_{i17}$ and the outputs from the linear transformation part by XOR circuits $63_0, 63_1, 63_2, \ldots, 63_7$, and yield output data $mid_{10}, mid_{11}, mid_{12}, \ldots, mid_{17}$. With such a functional construction as depicted in FIG. 17, the following operations are performed.

$$mid_{10} = mid_{01} \oplus mid_{02} \oplus mid_{03} \oplus mid_{04} \oplus mid_{05} \oplus mid_{06} \oplus k_{i10} \quad (15\text{-}1)$$

$$mid_{11} = mid_{00} \oplus mid_{02} \oplus mid_{03} \oplus mid_{05} \oplus mid_{06} \oplus mid_{07} \oplus k_{i11} \quad (15\text{-}2)$$

$$mid_{12} = mid_{00} \oplus mid_{01} \oplus mid_{03} \oplus mid_{04} \oplus mid_{06} \oplus mid_{07} \oplus k_{i12} \quad (15\text{-}3)$$

$$mid_{13} = mid_{00} \oplus mid_{01} \oplus mid_{02} \oplus mid_{04} \oplus mid_{05} \oplus mid_{07} \oplus k_{i13} \quad (15\text{-}4)$$

$$mid_{14} = mid_{00} \oplus mid_{01} \oplus mid_{03} \oplus mid_{04} \oplus mid_{05} \oplus k_{i14} \quad (15\text{-}5)$$

$$mid_{15} = mid_{00} \oplus mid_{01} \oplus mid_{02} \oplus mid_{05} \oplus mid_{06} \oplus k_{i15} \quad (15\text{-}6)$$

$$mid_{16} = mid_{01} \oplus mid_{02} \oplus mid_{03} \oplus mid_{06} \oplus mid_{07} \oplus k_{i16} \quad (15\text{-}7)$$

$$mid_{17} = mid_{00} \oplus mid_{02} \oplus mid_{03} \oplus mid_{04} \oplus mid_{07} \oplus k_{i17} \quad (15\text{-}8)$$

The above operations generate the data $mid_{10}, mid_{11}, mid_{12}, \ldots, mid_{17}$. Incidentally, the subkey $k_{i1}$ is composed of eight pieces of data $k_{i10}, k_{i11}, k_{i12}, \ldots, k_{i17}$. In FIG. 17, the pieces of data $mid_{00}$ to $mid_{07}$ are input to routes $60_0$ to $60_7$, respectively.

The XOR circuits $61_4, 61_5, 61_6, 61_7$ on the routes $60_4, 60_5, 60_6, 60_7$ calculate the XORs of the data $mid_{04}$ and $mid_{00}$, $mid_{05}$ and $mid_{01}$, $mid_{06}$ and $mid_{02}$, $mid_{07}$ and $mid_{03}$, respectively.

The XOR circuits $61_0, 61_1, 61_2, 61_3$ on the routes $60_0, 60_1, 60_2, 60_3$ calculate the XORs of the data $mid_{00}$ and the output from the XOR circuit $61_6$, the data $mid_{01}$ and the output from the XOR circuit $61_7$, the data $mid_{02}$ and the output from the XOR circuit $61_4$, the data $mid_{03}$ and the output from the XOR circuit $61_5$, respectively.

The XOR circuits $62_4, 62_5, 62_6, 62_7$ on the routes $60_4, 60_5, 60_6, 60_7$ calculate the XORs of the outputs from the XOR circuits $61_3$ and $61_4$, the outputs from the XOR circuits $61_0$ and $61_5$, the outputs from the XOR circuits $61_1$ and $61_6$, the outputs from the XOR circuits $61_2$ and $61_7$, respectively.

The XOR circuits $62_0, 62_1, 62_2, 62_3$ on the routes $60_0, 60_1, 60_2, 60_3$ calculate the XORs of the outputs from the XOR circuits $61_0$ and $62_4$, the outputs from the XOR circuits $61_1$ and $62_5$, the outputs from the XOR circuits $61_2$ and $62_6$, the outputs from the XOR circuits $61_3$ and $62_7$, respectively.

Furthermore, the XOR circuits $63_0$ to $63_7$ on the routes $60_0$ to $60_7$ XOR the outputs from the XOR circuits $62_0$ to $62_7$ and the key data $k_{i10}$ to $k_{i17}$, respectively, providing the outputs $mid_{10}$ to $mid_{17}$ from the routes $60_0$ to $60_7$. That is, the outputs $mid_{10}$ to $mid_{17}$ are the XORs of six pieces of data selected from the input data $mid_{00}$ to $mid_{07}$ and the key data, and the outputs $mid_{14}$ to $mid_{17}$ are the XORs of five pieces of data selected from the input data $mid_{00}$ to $mid_{07}$ and the key data.

Turning back to FIG. 14, the pieces of data $mid_{10}, mid_{11}, mid_{12}, \ldots, mid_{17}$ are nonlinearly transformed to pieces of data $out_0, out_1, out_2, \ldots, out_7$ in the nonlinear transformation parts $345_0, 345_1, 345_2, \ldots, 345_7$, and in the combining part 346 the eight pieces of data $out_0, out_1, out_2, \ldots, out_7$ are combined into a single piece of data $Y_i^*$. Finally, the data $Y_i^*$ is linearly transformed to data $Y_i$, for example, by a $k_{i2}$-bit left rotation in the third key-dependent linear transformation 347 using the key data $k_{i2}$, thereby generating the output data $Y_i$ from the nonlinear function part 304.

The nonlinear transformation parts $343_0$ to $343_7$ and $345_0$ to $345_7$ function just like S-boxes for DES cipher, and they are each formed by, for example, ROM, which receives input data as an address to read out therefrom the corresponding data.

Figure 18:
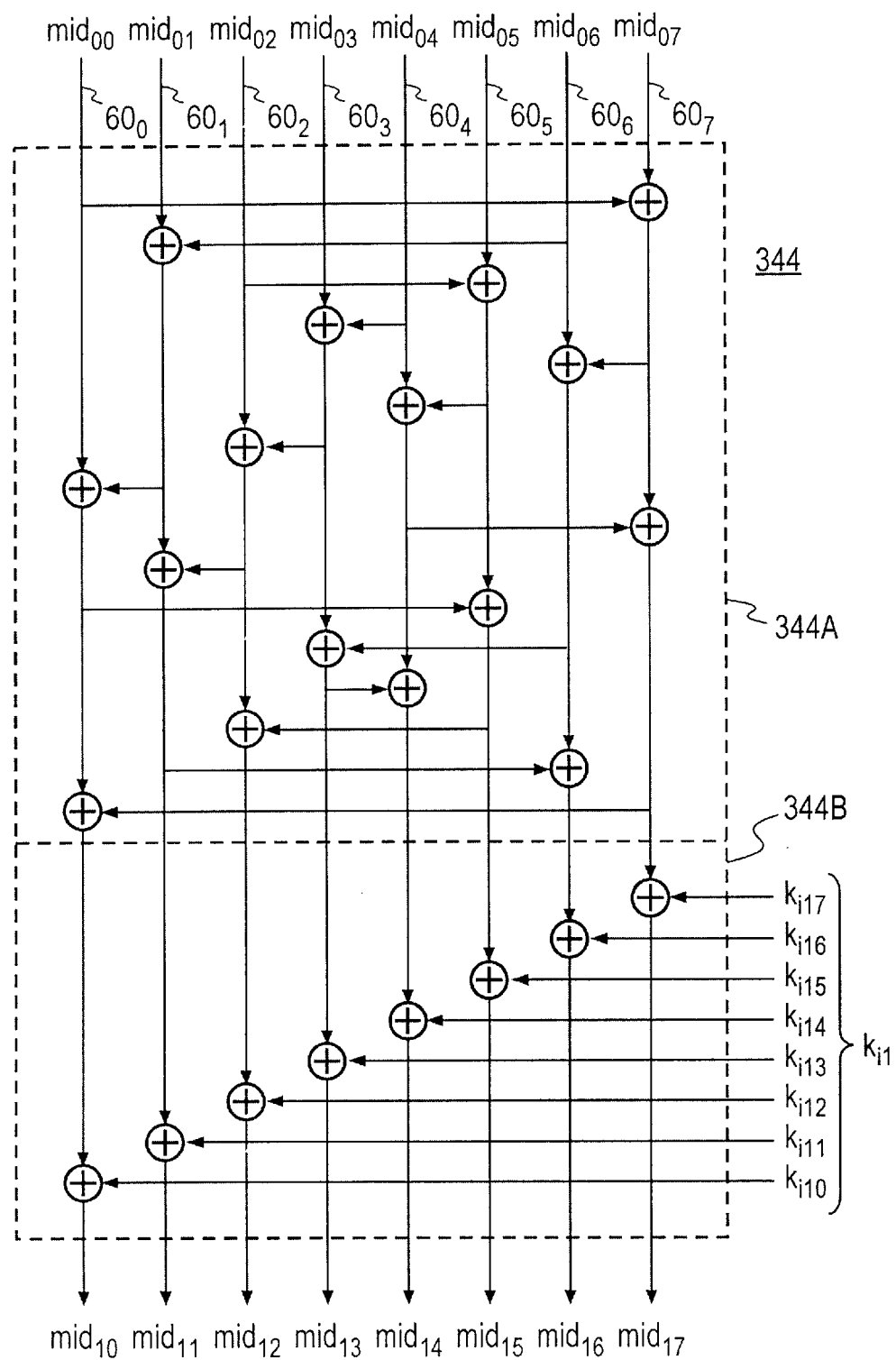
FIG. 18 is a diagram depicting another example of the functional configuration of a second key-dependent linear transformation part 344 in FIG. 14 in the fourth embodiment.

The eight nonlinear transformation parts $343_0$ to $343_7$ are arranged in parallel and their transformation processes are not associated with one another, and hence they can be executed in parallel. The same goes for the nonlinear transformation parts $345_0$ to $345_7$. Thus, the linear transformation operations can be executed in one step for each group (a total of two steps). Letting p represent the differential/liner probability of the nonlinear transformation parts $343_0$ to $343_7$ and $345_0$ to $345_7$, the nonlinear function part 304 provides a differential linear probability $p^5$ as a whole when the second key-dependent linear transformation 344 has such a construction as shown in FIG. 17. Accordingly, when the number of rounds of the entire data transformation device is 3r, an approximate representation is obtained with a probability $P \leq p^{10r}$; for example, when r=4 (12 rounds), $P \leq p^{40}$. In the case of DES cipher, this corresponds to 60 or more rounds, making it possible to provide a data transformation device sufficiently secure against differential cryptanalysis and linear cryptanalysis. Incidentally, the second key-dependent linear transformation part 344 is not limited specifically to the linear transformation part depicted in FIG. 17 but may be modified as shown in FIG. 18, for instance.

In this instance, the following operations are conducted.

$$mid_{10} = mid_{01} \oplus mid_{02} \oplus mid_{04} \oplus mid_{05} \oplus mid_{06} \oplus mid_{07} \oplus k_{i10} \quad (16\text{-}1)$$

$$mid_{11} = mid_{01} \oplus mid_{02} \oplus mid_{03} \oplus mid_{04} \oplus mid_{06} \oplus k_{i11} \quad (16\text{-}2)$$

$$mid_{12} = mid_{00} \oplus mid_{01} \oplus mid_{03} \oplus mid_{04} \oplus mid_{05} \oplus mid_{06} \oplus k_{i12} \quad (16\text{-}3)$$

$$mid_{13} = mid_{00} \oplus mid_{03} \oplus mid_{04} \oplus mid_{06} \oplus mid_{07} \oplus k_{i13} \quad (16\text{-}4)$$

$$mid_{14} = mid_{00} \oplus mid_{02} \oplus mid_{03} \oplus mid_{05} \oplus mid_{06} \oplus mid_{07} \oplus k_{i14} \quad (16\text{-}5)$$

$$mid_{15} = mid_{00} \oplus mid_{01} \oplus mid_{02} \oplus mid_{05} \oplus mid_{06} \oplus k_{i15} \quad (16\text{-}6)$$

$$mid_{16} = mid_{00} \oplus mid_{01} \oplus mid_{02} \oplus mid_{03} \oplus mid_{04} \oplus mid_{07} \oplus k_{i16} \quad (16\text{-}7)$$

$$mid_{17} = mid_{00} \oplus mid_{02} \oplus mid_{04} \oplus mid_{05} \oplus mid_{076} \oplus k_{i17} \quad (16\text{-}8)$$

Figure 19:
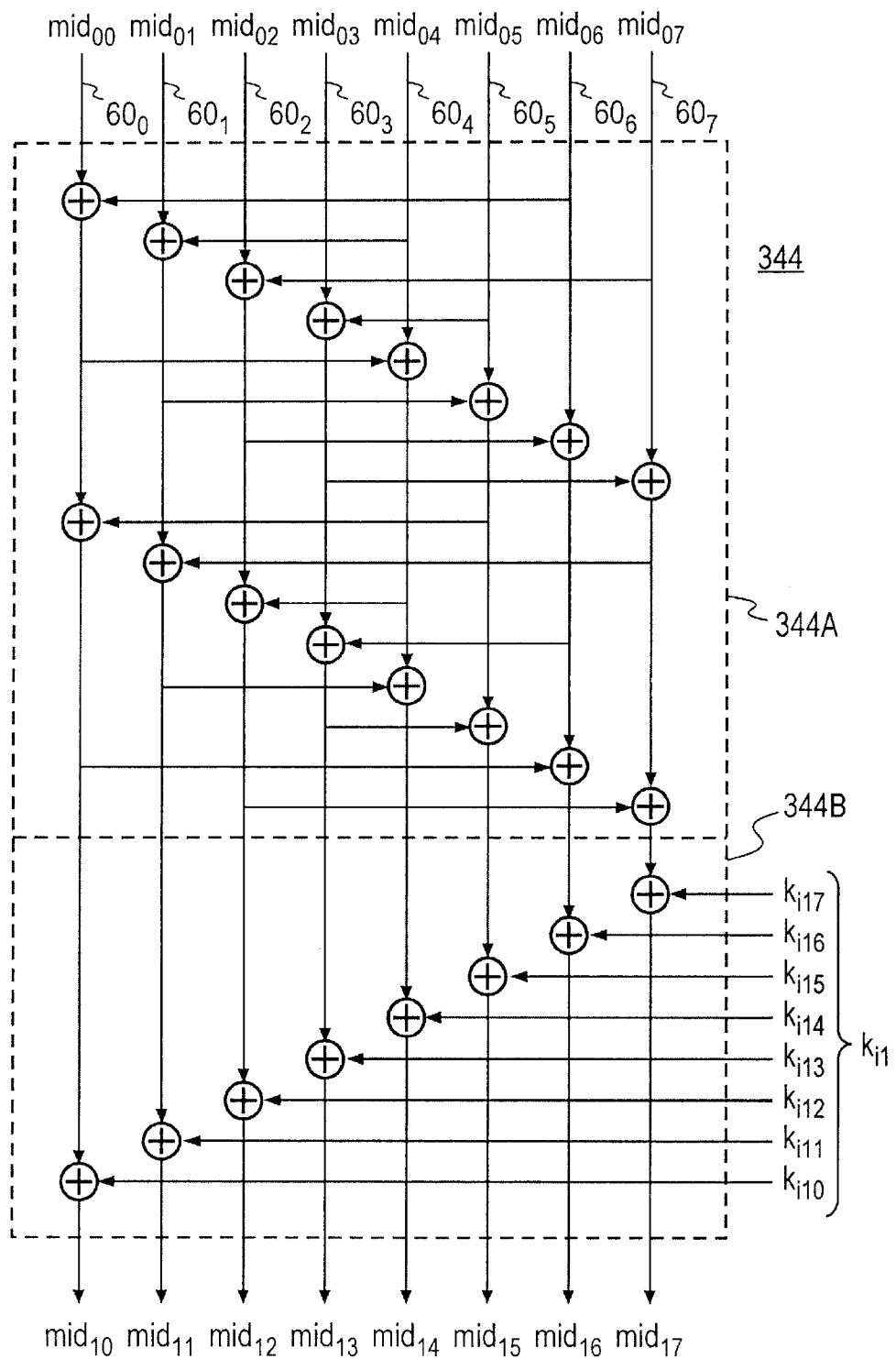
FIG. 19 is a diagram depicting still another example of the functional configuration of a second key-dependent linear transformation part 344 in FIG. 14 in the fourth embodiment.

Alternatively, the circuit construction of FIG. 19 may be used, in which case the following operations are performed.

$$mid_{10} = mid_{00} \oplus mid_{01} \oplus mid_{04} \oplus mid_{05} \oplus mid_{06} \oplus k_{i10} \quad (17\text{-}1)$$

$$mid_{11} = mid_{01} \oplus mid_{03} \oplus mid_{04} \oplus mid_{05} \oplus mid_{07} \oplus k_{i11} \quad (17\text{-}2)$$

$$mid_{12} = mid_{00} \oplus mid_{02} \oplus mid_{04} \oplus mid_{06} \oplus mid_{07} \oplus k_{i12} \quad (17\text{-}3)$$

$$mid_{13} = mid_{02} \oplus mid_{03} \oplus mid_{05} \oplus mid_{06} \oplus mid_{07} \oplus k_{i13} \quad (17\text{-}4)$$

$$mid_{14} = mid_{00} \oplus mid_{01} \oplus mid_{03} \oplus mid_{05} \oplus mid_{06} \oplus mid_{07} \oplus k_{i14} \quad (17\text{-}5)$$

$$mid_{15} = mid_{01} \oplus mid_{02} \oplus mid_{03} \oplus mid_{04} \oplus mid_{06} \oplus mid_{07} \oplus k_{i15} \quad (17\text{-}6)$$

$$mid_{16} = mid_{00} \oplus mid_{01} \oplus mid_{02} \oplus mid_{03} \oplus mid_{05} \oplus mid_{06} \oplus k_{i16} \quad (17\text{-}7)$$

$$mid_{17} = mid_{00} \oplus mid_{02} \oplus mid_{03} \oplus mid_{04} \oplus mid_{05} \oplus mid_{06} \oplus k_{i17} \quad (17\text{-}8)$$

As is evident from the operations in FIGS. 17 to 19, the second key-dependent linear transformation part 344 performs key-dependent linear transformation which yields a total of eight pieces of output data $mid_{10}, mid_{11}, mid_{12}, \ldots, mid_{17}$, that is, four pieces of output data derived from six pieces of data selected from the eight pieces of input data $mid_{00}, mid_{01}, mid_{02}, \ldots, mid_{07}$ and four pieces of output data derived from five pieces of data selected from the eight pieces of input data. If this linear transformation is one that the eight pieces of input data $mid_{00}, mid_{01}, mid_{02}, \ldots, mid_{07}$ each affect the output data of at least four or more other routes (for instance, in the FIG. 17 example the input data $mid_{00}$ affects the six pieces of output data $mid_{11}, mid_{12}, mid_{13}, mid_{14}, mid_{15}$ and $mid_{17}$), the nonlinear function part 304 provides a differential/linear probability $p^5$ as a whole as described previously with reference to the FIG. 17.

The key data $\{fk, k_{00}, k_{01}, k_{02}, k_{10}, k_{11}, k_{12}, \ldots, k_{(N-1)0}, k_{(N-1)1}, k_{(N-1)2}, ek\}$ is data provided by inputting the master key via the key input part 320 to the expanded key generation part 321, transforming it to key data and storing it in the key storage part 322.

Figure 1:
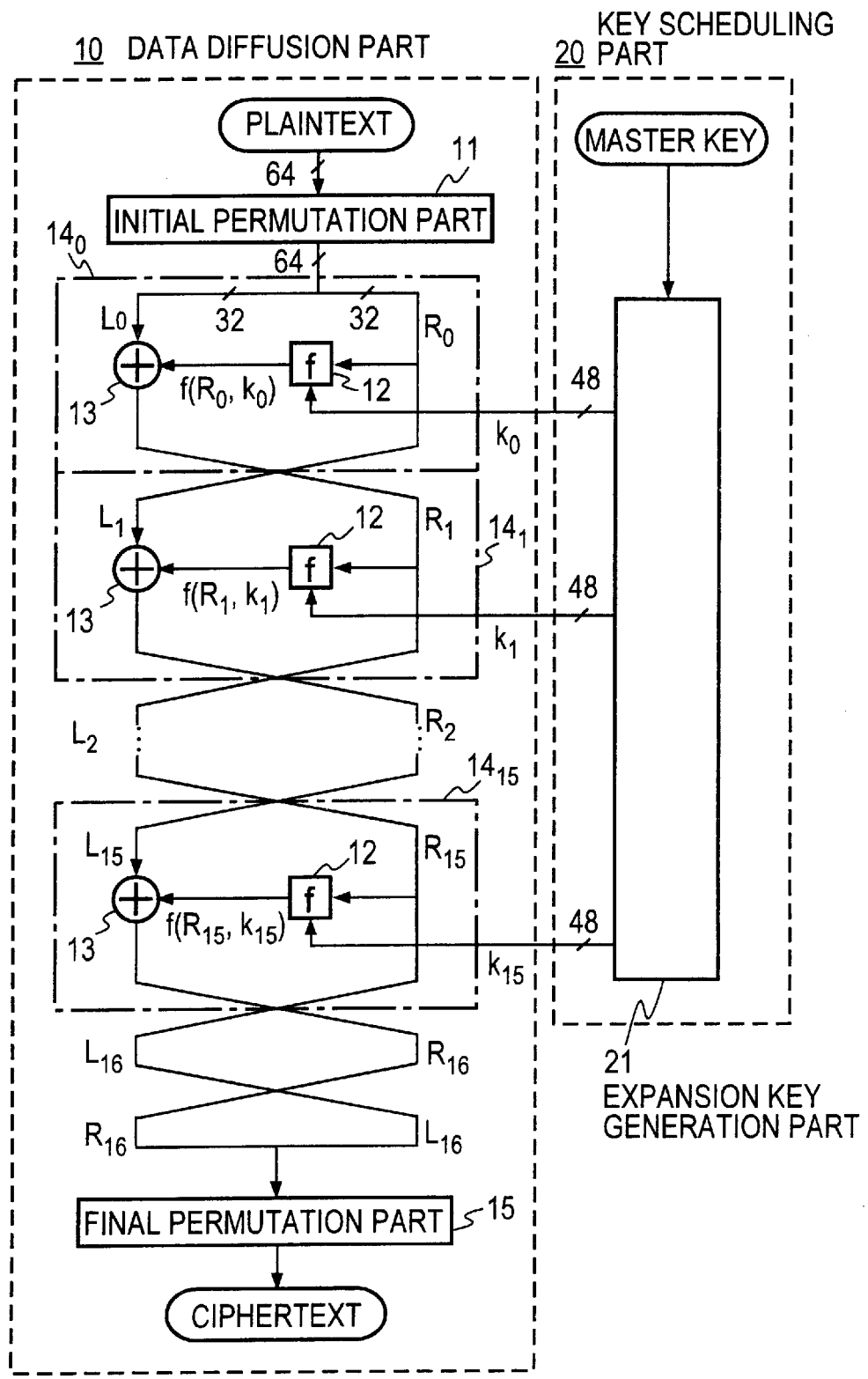
FIG. 1 is a diagram depicting the functional configuration of a conventional DES cryptographic device.
Figure 2:
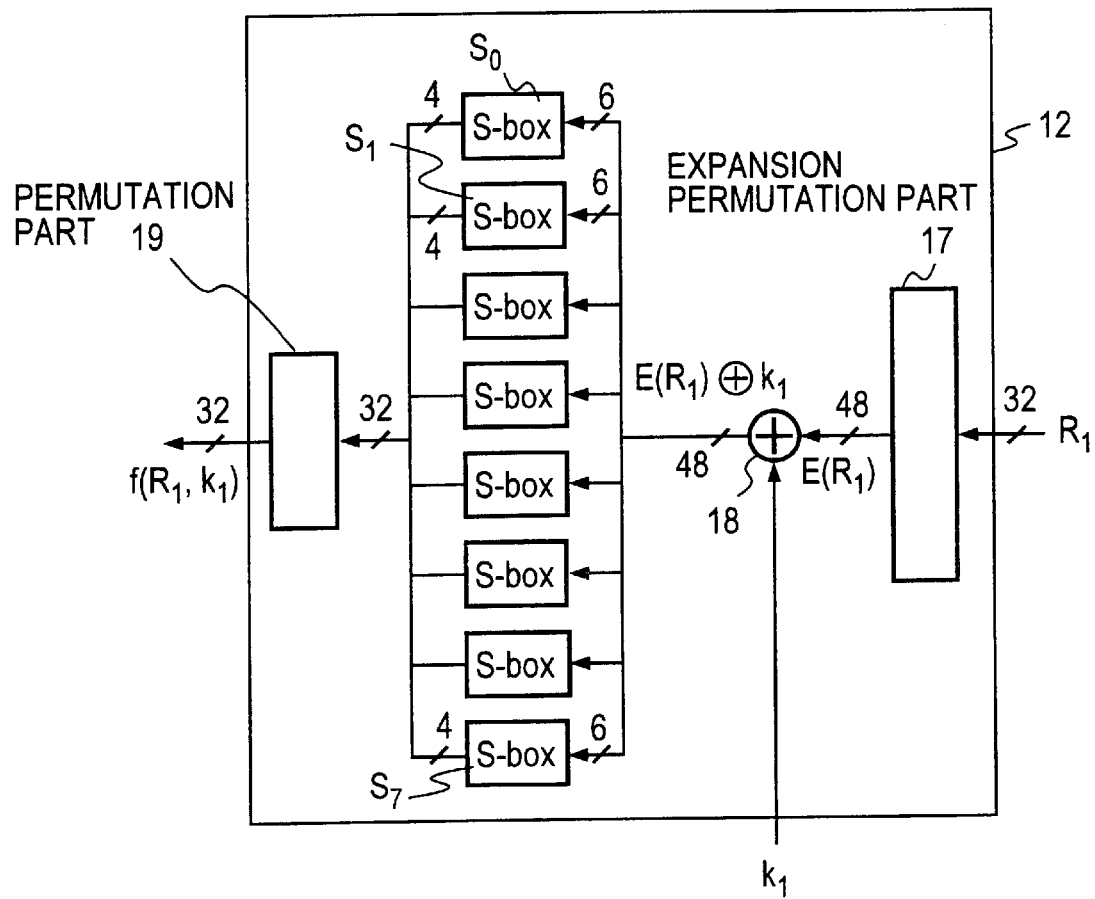
FIG. 2 is a diagram depicting a concrete functional configuration of a function operation part 12 in FIG. 1.

The expanded key generation part 321 may be made identical in construction with the expanded key generation part 21 for DES cipher shown in FIG. 1, or an expanded key generation part disclosed in U.S. Pat. No. 4,850,019.

Since the initial key-dependent transformation part 302, the final key-dependent transformation part 308 and the key-dependent linear transformation parts 341, 344 and 347 are key-dependent linear transformation means, the data transformation device is also sufficiently secure against other cryptanalysis techniques than differential and linear cryptanalysis.

The fourth embodiment is not limited specifically to the above constructions; if speedup is desired, any one of the initial key-dependent transformation part 302, the final key-dependent transformation part 308 and the key-dependent linear transformation parts 341, 344 and 347 may be omitted or modified to key-independent transformation means. In this case, the encryption speed can be increased without significantly diminishing the security against differential cryptanalysis and linear cryptanalysis.

Fifth Embodiment

A description will be given of a modified form of the functional configuration of the nonlinear function part 304 in the same data transformation device as the fourth embodiment depicted in FIG. 13. The basic construction of this embodiment is the same as that of the fourth embodiment of FIG. 13 except that the nonlinear transformation parts $343_0$ to $343_7$ in the nonlinear function part 304 of FIG. 14 are modified like the nonlinear transformation parts $343_0', 343_1', 343_2'$ and $343_3'$ in the second embodiment depicted in FIGS. 8A through 8D so that they output expanded data. The second key-dependent linear transformation part 344 is of similar construction to that shown in FIG. 9.

As depicted in FIG. 13, the right block data $R_i$ is input to the nonlinear function part 304 together with the key data $k_{i0}, k_{i1}, k_{i2}$ stored in the key storage part 322. In the first key-dependent linear transformation part 341 the data $R_i$ is, for example, XORed with the key data ko and hence is linearly transformed to data $R_i^* = R_i \oplus k_{i0}$ as in the case of FIG. 14. Then the data $R_i^*$ is split into eight pieces of data $in_0, in_1, in_2, \ldots, in_7$ in the splitting part 342. The eight pieces of data $in_0, in_1, in_2, \ldots, in_7$ are nonlinearly transformed to data $MID_{00}, MID_{01}, MID_{02}, \ldots, MID_{07}$ in the nonlinear transformation parts $343_0', 343_1', 343_2', \ldots, 343_7'$, respectively. The nonlinear transformation part $343_0'$ is so designed as to transform the m-bit data $in_0$ to the following 8×m-bit data.

$$MID_{00}=[00 \ldots 0_{(2)}, mid_{00}, mid_{00}, mid_{00}, mid_{00}, mid_{00}, 00 \ldots 0_{(2)}, mid_{00}] \quad (18\text{-}1)$$

Figure 20A:
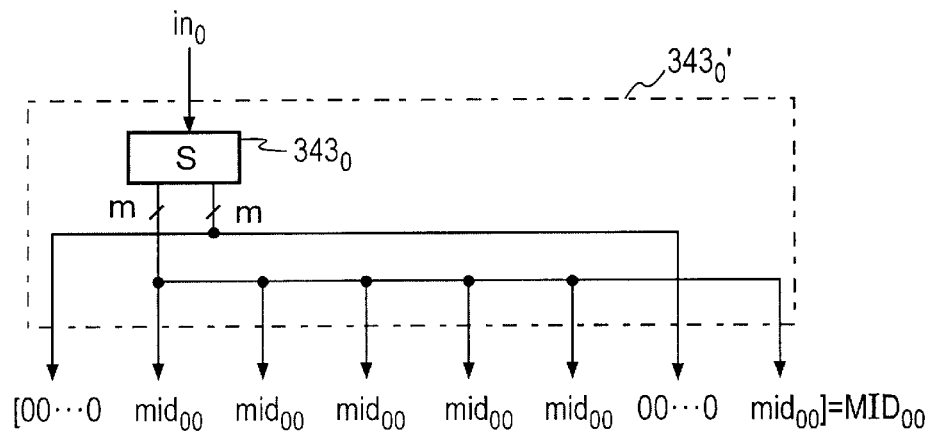
FIG. 20A is a diagram illustrating the functional configuration of a nonlinear transformation part $343_0'$ in the fifth embodiment.

That is, the nonlinear transformation part $343_0'$ has, for example, as shown in FIG. 20A, an S-box which outputs the data $mid_{00}$ in high-order m bits as does the nonlinear transformation part $343_0$ in the fourth embodiment of FIG. 14 and outputs "00 . . . 0$_{(2)}$" as low-order m bits; furthermore, it branches the output data $mid_{00}$ in six routes and "00 . . . 0$_{(2)}$" in two other routes.

Figure 20B:
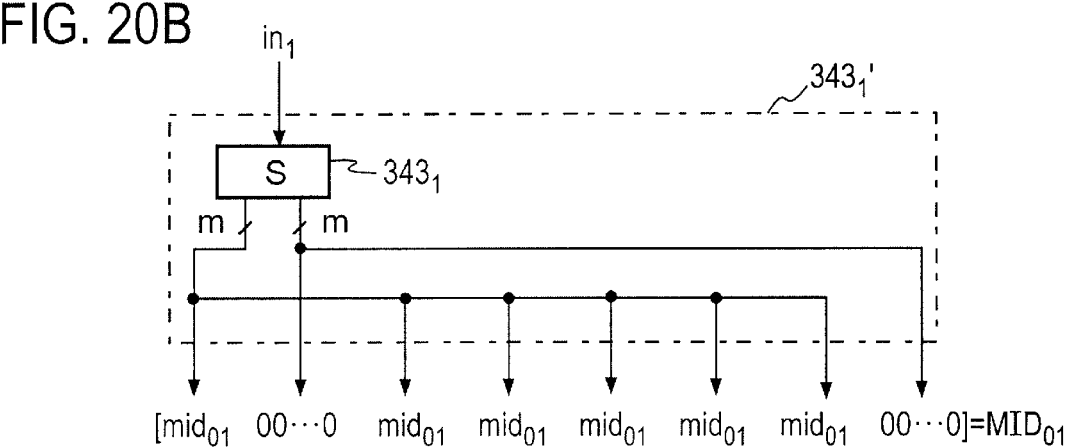
FIG. 20B is a diagram illustrating the functional configuration of a nonlinear transformation part $343_1'$.
Figure 20C:
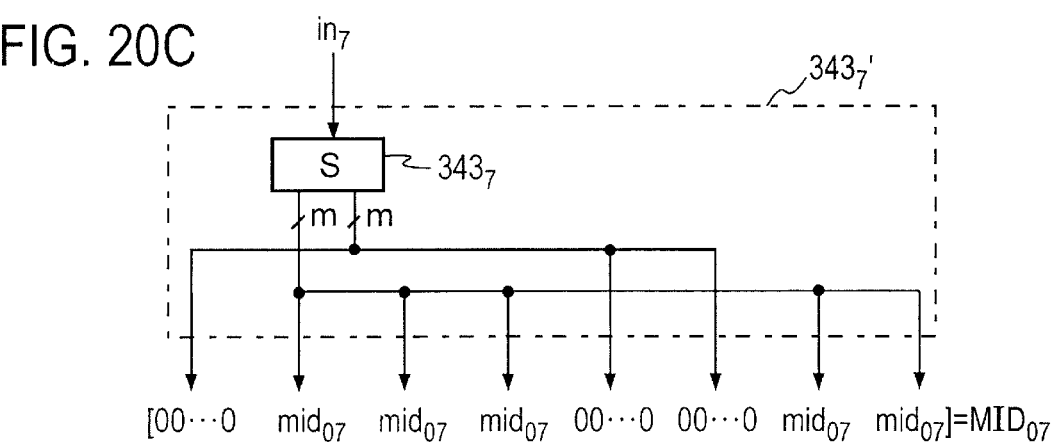
FIG. 20C is a diagram illustrating the functional configuration of a nonlinear transformation part $343_7'$.

The nonlinear transformation part $343_1'$ has, as depicted in FIG. 20B, an S-box $343_1$ which outputs the data $mid_{01}$ in high-order m bits and outputs "00 . . . 0$_{(2)}$" as low-order m bits; furthermore, it branches the output data $mid_{01}$ in six routes and m-bit data "00 . . . 0" in two other routes. The other nonlinear transformation parts $343_2'$ to $343_7'$ are also similarly constructed; in FIG. 20C there is depicted the construction of the nonlinear transformation part $343_7'$ but no description will be repeated. These nonlinear transformation parts $343_1'$ to $343_7'$ transform data $in_1$ to $in_7$ to the following data $MID_{01}$ to $MID_{07}$, respectively.

$$MID_{01}=[mid_{01}, 00 \ldots 0_{(2)}, mid_{01}, mid_{01}, mid_{01}, mid_{01}, mid_{01}, 00 \ldots 0_{(2)}] \quad (18\text{-}2)$$

$$MID_{02}=[mid_{02}, mid_{02}, 00 \ldots 0_{(2)}, mid_{02}, 00 \ldots 0_{(2)}, mid_{02}, mid_{02}, mid_{02}] \quad (18\text{-}3)$$

$$MID_{03}=[mid_{03}, mid_{03}, mid_{03}, 00 \ldots 0_{(2)}, mid_{03}, 00 \ldots 0_{(2)}, mid_{03}, mid_{03}] \quad (18\text{-}4)$$

$$MID_{04}=[mid_{04}, 00 \ldots 0_{(2)}, mid_{04}, mid_{04}, mid_{04}, 00 \ldots 0_{(2)}, 00 \ldots 0_{(2)}, mid_{04}] \quad (18\text{-}5)$$

$$MID_{05}=[mid_{05}, mid_{05}, 00 \ldots 0_{(2)}, mid_{05}, mid_{05}, mid_{05}, 00 \ldots 0_{(2)}, 00 \ldots 0_{(2)}] \quad (18\text{-}6)$$

$$MID_{06}=[mid_{06}, mid_{06}, mid_{06}, 00 \ldots 0_{(2)}, 00 \ldots 0_{(2)}, mid_{06}, mid_{06}, 00 \ldots 0_{(2)}] \quad (18\text{-}7)$$

$$MID_{07}=[00 \ldots 0_{(2)}, mid_{07}, mid_{07}, mid_{07}, 00 \ldots 0_{(2)}, 00 \ldots 0_{(2)}, mid_{07}, mid_{07}] \quad (18\text{-}8)$$

These pieces of data $MID_{00}$ to $MID_{07}$ can be predetermined in the same manner as described previously in connection with Equations (8-1) to (8-4) in the second embodiment. That is, the data $MID_{00}$ is a set of data which is obtained at the outputs of the eight routes of the linear transformation part 344A in FIG. 17 when pieces of data $mid_{00}$ and $mid_{02}$ to $mid_{07}$ except $mid_{01}$ are all set as "00 . . . 0$_{(2)}$." The same goes for the data $MID_{02}$ to $MID_{07}$. These nonlinear transformation parts $343_0'$ to $343_7'$ may be formed by memory from which the pieces of data $MID_{00}$ to $MID_{07}$ are directly read out using the data $in_0$ to $in_7$ as addresses.

Figure 21:
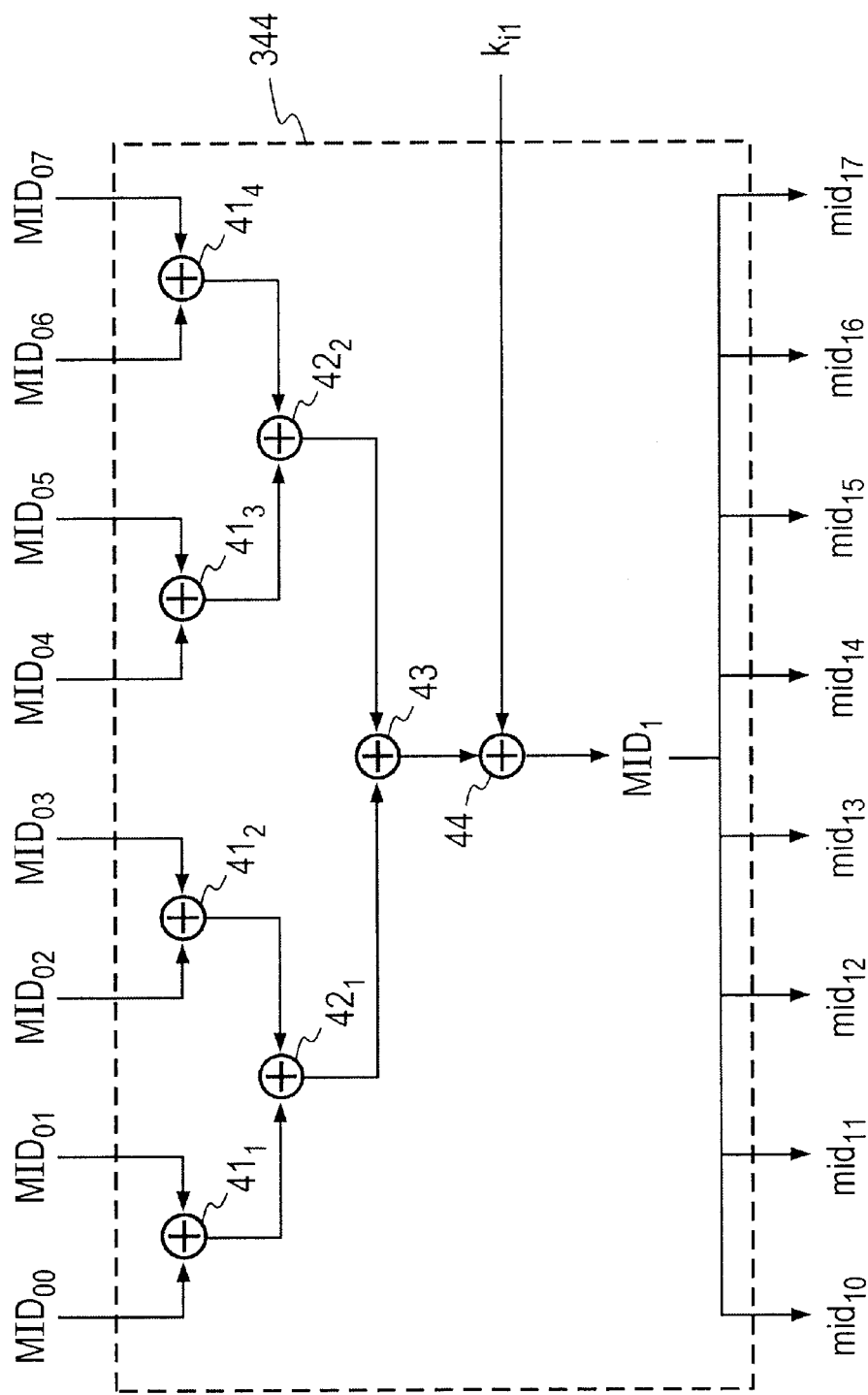
FIG. 21 is a diagram showing the functional configuration of a second key-dependent linear transformation part 344 in the fifth embodiment.

Then the pieces of data $MID_{00}$ to $MID_{07}$ are input to the second key-dependent linear transformation part 344 using the key data $k_{i1}$ as shown in FIG. 21. The second key-dependent linear transformation part 344 is made up of XOR circuits $41_1$ to $41_4$ each of which XORs two pieces of input data, XOR circuits $42_1$ and $42_2$ each of which XORs the outputs from two of them, an XOR circuit 43 which XORs their outputs, and an XOR circuit 44 which XORs its output and the key data $k_{i1}$. With this construction, the following operation is conducted.

$$MID_1=MID_{00} \oplus MID_{01}MID_{02} \oplus MID_{03} \oplus MID_{04} \oplus MID_{05} \oplus MID_{06} \oplus MID_{07} \oplus k_{i1} \quad (19)$$

This output $MID_1$ is split into eight blocks, which are output as data $mid_{10}, mid_{11}, mid_{12}, \ldots, mid_{17}$. Eventually, the linear transformation by the second key-dependent linear transformation part 344, expressed in units of m-bit subblocks, becomes as follows:

$$mid_{10}=mid_{01} \oplus mid_{02} \oplus mid_{03} \oplus mid_{04} \oplus mid_{05} \oplus mid_{06} \oplus k_{i10} \quad (20\text{-}1)$$

$$mid_{11}=mid_{00} \oplus mid_{02} \oplus mid_{03} \oplus mid_{05} \oplus mid_{06} \oplus mid_{07} \oplus k_{i11} \quad (20\text{-}2)$$

$$mid_{12}=mid_{00} \oplus mid_{01} \oplus mid_{03} \oplus mid_{04} \oplus mid_{06} \oplus mid_{07} \oplus k_{i12} \quad (20\text{-}3)$$

$$mid_{13}=mid_{00} \oplus mid_{01} \oplus mid_{02} \oplus mid_{04} \oplus mid_{05} \oplus mid_{07} \oplus k_{i13} \quad (20\text{-}4)$$

$$mid_{14}=mid_{00}\oplus mid_{01}\oplus mid_{03}\oplus mid_{04}\oplus mid_{05}\oplus k_{i14} \quad (20\text{-}5)$$

$$mid_{15}=mid_{00}\oplus mid_{01}\oplus mid_{02}\oplus mid_{05}\oplus mid_{06}\oplus k_{i15} \quad (20\text{-}6)$$

$$mid_{16}=mid_{01}\oplus mid_{02}\oplus mid_{03}\oplus mid_{06}\oplus mid_{07}\oplus k_{i16} \quad (20\text{-}7)$$

$$mid_{17}=mid_{00}\oplus mid_{02}\oplus mid_{03}\oplus mid_{04}\oplus mid_{07}\oplus k_{i17} \quad (20\text{-}8)$$

The above equations express a linear transformation equivalent to that by Equations (15-1) to (15-8) described previously with reference to FIG. 17. As a result, the same pieces of data $mid_{10}$, $mid_{11}$, $mid_{12}$, . . . , $mid_{17}$ are generated. Incidentally, the subkey data $k_{i1}$, is composed of eight pieces of data $k_{i10}$, $k_{i11}$, $k_{i12}$, . . . , $k_{i17}$.

Next, the eight pieces of data $mid_{10}$, $mid_{11}$, $mid_{12}$, . . . , $mid_{17}$ are nonlinearly transformed to eight pieces of data $out_0$, $out_1$, $out_2$, . . . , $out_7$ in the nonlinear transformation parts $345_0$, $345_1$, $345_2$, . . . , $345_7$ in FIG. 14, and the eight pieces of data $out_0$, $out_1$, $out_2$, . . . , $out_7$ are combined into a single piece of data $Y_i^*$ in the combining part 346. Finally, the data $Y_i^*$ is linearly transformed to data $Y_i$ by, for example, a $k_{i2}$-bit left rotation in the third key-dependent linear transformation part 347 using the key data $k_{i2}$.

As depicted in FIG. 21, the second key-dependent linear transformation part 344 uses eight XOR circuits but implements the linear transformation equivalent to that in FIG. 17 (which uses 24 XOR circuits), and hence it permits faster transformation than the fourth embodiment.

Furthermore, as is the case with the fourth embodiment, the eight nonlinear transformation parts $343_0$ to $343_3$ and $345_0$ to $345_3$ are arranged in parallel and their nonlinear transformation processes are not associated with one another, and hence they can be executed in parallel. Besides, letting p represent the differential/liner probability of the nonlinear transformation parts $343_0'$ to $343_7'$, the differential/linear probability of the nonlinear function 304 becomes $p^5$ as a whole.

In the above, the second (key-dependent) linear transformation part 344 may perform the transformation by XORing of the input subdata without depending on the key $k_{i1}$. That is, the XOR circuits $63_0$ to $63_7$ in FIG. 17 and the circuits corresponding thereto in FIGS. 18, 19 and 21 may be omitted.

Moreover, in the above, the first key-dependent linear transformation part 341, the second key-dependent transformation part 344 and the third key-dependent transformation part 347 need not always be key-dependent, that is, the linear transformation may be performed in subdata without inputting the key data to them.

The data transformation processing in the fourth and fifth embodiments described above may also be implemented by executing a program of its procedure by a computer. The procedure is the same as shown in FIGS. 11 and 12; hence, no description will be repeated.

Figure 22:
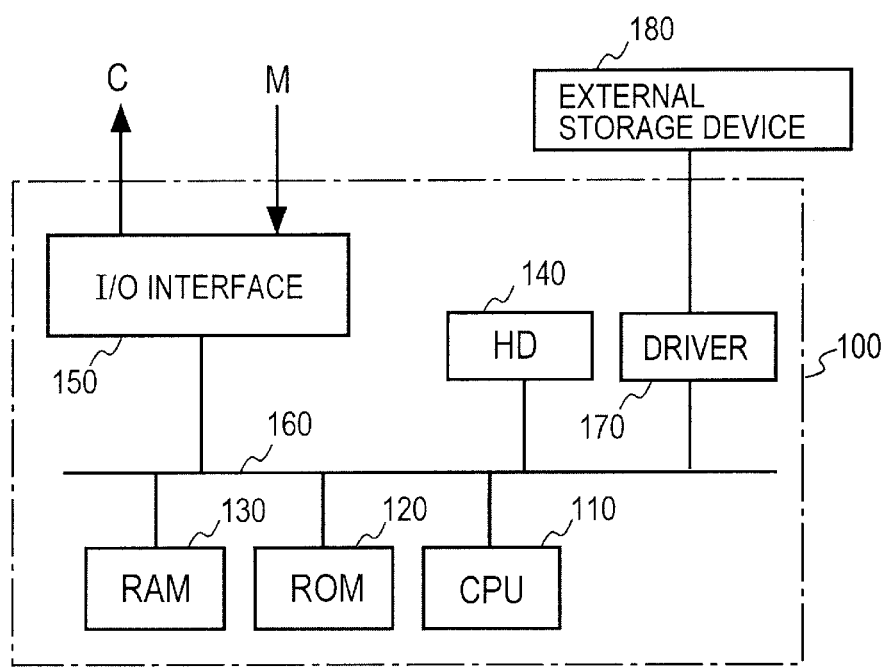
FIG. 22 is a diagram showing a configuration for executing a data processing program recorded on a recording medium.

FIG. 22 illustrates an example of the system configuration wherein the program for the data transformation processing described in connection with the first to fifth embodiment is prerecorded on a recording medium and is read out therefrom to perform the data transformation according to the present invention. A central processing unit (CPU) 110, a read-only memory (ROM) 120, a random access memory (RAM) 130, a storage device (a hard disk HD, for instance) 140, an I/O interface 150 and a bus interconnecting them constitute an ordinary computer 100. The program for implementing the data transformation process according to the present invention is prestored on the recording medium such as the hard disk HD. In the ROM 120 there are stored respective S-boxes in tabular form. In the execution of the data transformation the program is read into the RAM 130 from the hard disk HD 140, and upon input of the plaintext M via the interface 150, then the program is executed under the control of the CPU 110, and the resulting output data C is output via the interface 150.

The program for the data transformation process may be one that is prestored in an arbitrary external storage device 180. In such an instance, the program can be used after once transferred via a driver 170 from the external storage device 180 to the hard disk 140 or the RAM 130.

Though not shown, when the output data C is sent over a communication line or the Internet, only a person who has a common secret key is qualified to decrypt the output data C. Since the data C transformed according to the present invention is highly resistant to differential cryptanalysis and linear cryptanalysis, it is possible to achieve transmission of information with increased security.

Figure 3:
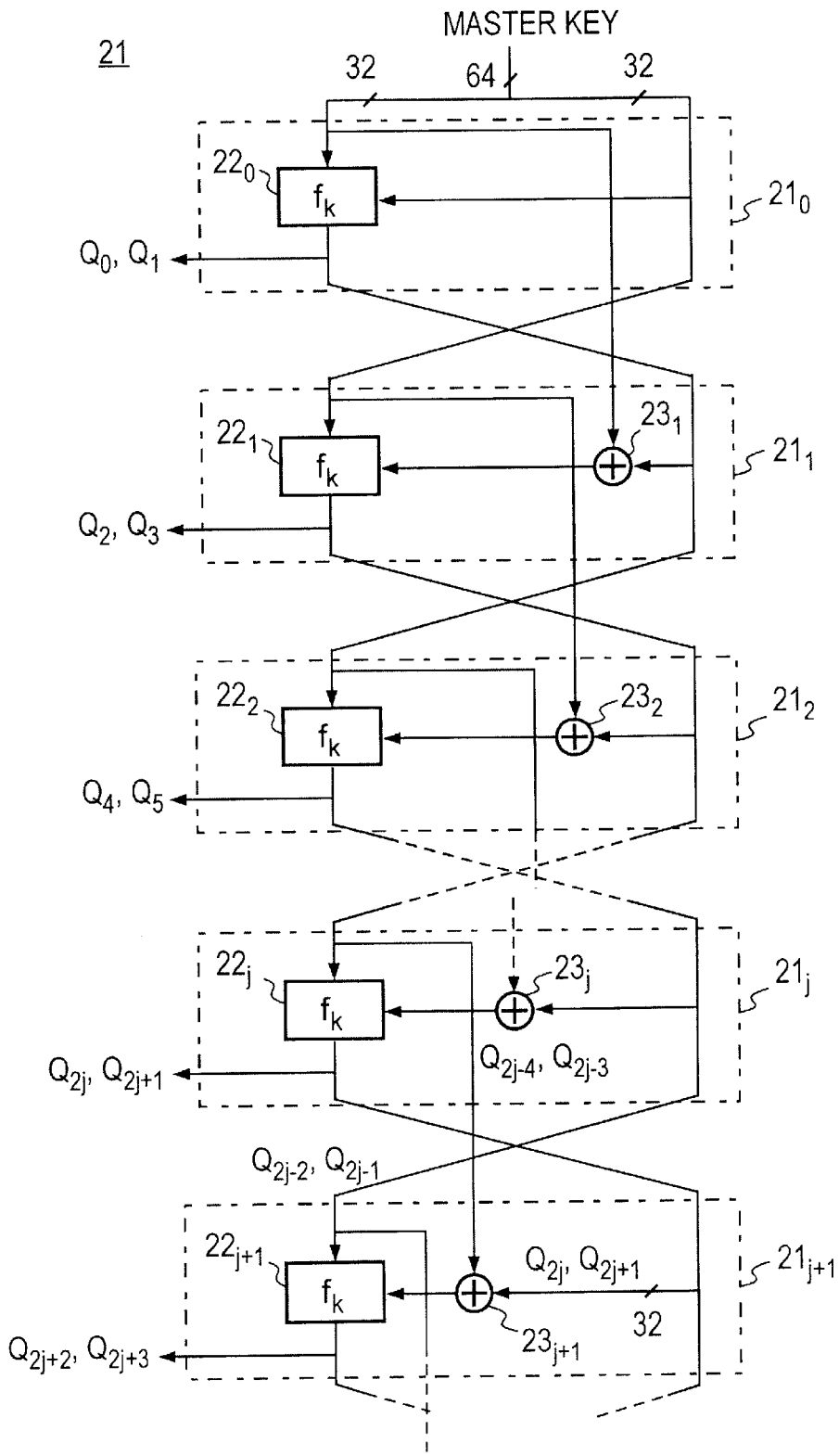
FIG. 3 is a diagram depicting an example of an expanded key generation part 21 in FIG. 2.

Incidentally, when in each embodiment the key scheduling part 20 has the same construction as depicted in FIG. 3, the subkeys used as $k_i$ and $k_{i+1}$ in the data diffusion part 10 become the outputs $Q_{2j}$ and $Q_{2j+1}$ (where i=2j) from the key processing part 21 in the key scheduling part 20. On the other hand, since it is the subkeys $k_N$ and $k_{N-1}$ that are very likely to be analyzed by differential cryptanalysis or linear cryptanalysis, a combination of data diffusion parts with these pieces of information allows ease in finding other subkeys.

The embodiment described below is intended to solve this problem by using a more complex key scheduling algorithm in the key scheduling part 20 for generating subkeys in the data transformation device of FIG. 4 that is typical of the embodiments described above. With a view to preventing that success in analyzing the subkeys $k_N$ and $k_{N-1}$ leads to the leakage of much information about the outputs from other data diffusion parts, the following embodiment employs a G-function part which performs the same function as that of the key diffusion part 22 depicted in FIG. 3 (the function fk in FIG. 3); furthermore, there is provided an H-function part which possesses a data extracting function by which information necessary for generating subkeys is extracted from a required number of L components as uniformly as possible which were selected from L components once stored in a storage part after being output from the G-function part according to a first aspect of key generation. According to a second aspect, partial information that is used as subkeys is extracted in the H-function part from the L-components output from the G-function part and is stored in a storage part, and necessary information is extracted from a required number of L-components to thereby generate the subkeys.

In the case of DES, since the subkeys are generated by only swapping bit positions of the master key, the key scheduling process is fast. However, there is a problem that if the some subkeys is known, the corresponding master key can be obtained immediately.

To provide increased complexity in the relationship between the master key and the subkeys without involving a substantial increase in the computational complexity for key scheduling and without increasing the size program of the key scheduling part, the G-function is constructed as the data diffusion fumction through the use of the F-function to be used in the data diffusion part or a subroutine forming the F-function (which functions will hereinafter be denoted by f), and a plurality of intermediate values L are generated by repeatedly using the G-function.

The G-function is adapted to operate on two input components (Y, v) and generate three output components (L, Y, v). The bits of the component Y is equal to or larger than the bits of the master key K.

To supply subkeys to the data diffusion part, the G-function is called a required number (M) of times to generate M components L (where $0 \leq j \leq M-1$). Letting the output from the G-function called a j-th time be represented by $(L_j, Y_j, v_j)$, part of this value is used as the input $(Y_{j+1}=Y_j, v_{J+1}=v_j)$ to the G-function called a (j+1)-th time. Assume here that $Y_0$ is a value containing K and that $v_0$ is a predetermined value (0, for instance).

For the given master key K, the subkey $k_i$ (where i=0, 1, 2, ..., N-1) is determined as follows:

$$(L_i, (Y_1, v_1))=G(Y_0, v_0) \tag{21}$$

$$(L_{j+1}, (Y_{j+1}, v_{j+1}))=G(Y_j, v_j)\ (j=1, 2, \ldots, M-1) \tag{22}$$

$$k_i=H(i, L_1, L_2, \ldots, L_M)\ (i=0, 1, 2, \ldots, N-1) \tag{23}$$

where the H-function is means to extract from each component $L_i$ information about the bit position determined by the suffix i as required according to the suffix i of the subkey and the M components L output from the G-function.

Sixth Embodiment

Figure 23A:
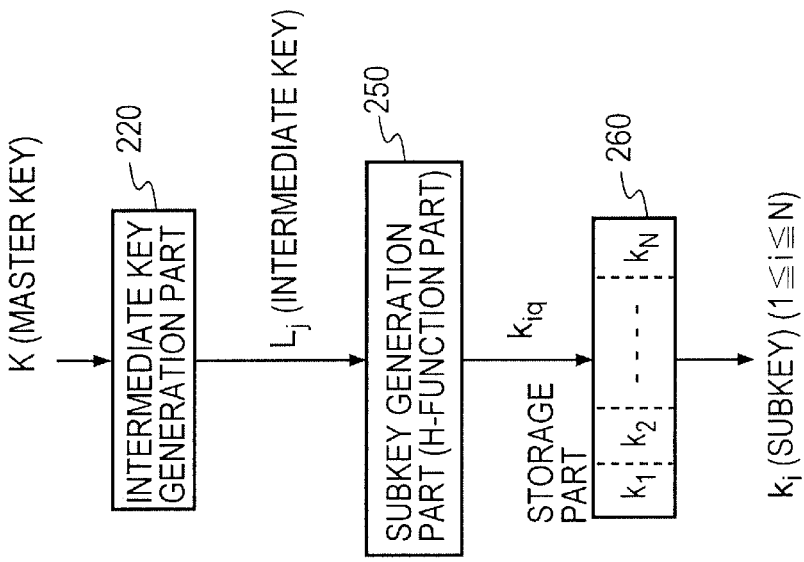
FIG. 23A is a block diagram depicting the basic functional configuration of a key generation part according to the present invention.

In FIG. 23A there is depicted the basic construction of the key scheduling part of this embodiment for application to the key scheduling part 20 shown in FIG. 4A. The master key K is input to an intermediate key generation part 220; the intermediate key generation part 220 has a plurality (M rounds) of G-function parts which operate in cascade, and generates intermediate keys $L_1$ to $L_M$, which are stored in a storage part 230. The intermediate keys $L_1$ to $L_M$ stored in the storage part 230 are provided to a subkey generation part 240, wherein subkeys $k_i$ are generated based on an H-function part. The structure and operation of each part will be concretely described below.

This example is intended to increase the security of the key scheduling part shown in FIG. 3 using a data randomization part disclosed in the aforementioned U.S. patent issued to Miyaguchi et al. This embodiment will be described as being applied to the key scheduling part (FIG. 3) in the U.S. patent of Miyagushi et al. when N=16.

In FIG. 3 16 Q components are obtained by an 8 (=N/2) rounds of data diffusion parts. Here, let $Q_j$ represent the respective Q component. Each $Q_j$ component is 16-bit. The subkey generation part 240 constructs the subkey $k_0$ from the value of a first bit of the respective $Q_j$ component, the subkey $k_1$ from the value of a second bit of the respective $Q_j$ component, and in general, the subkey $k_{i-1}$ from the value of an i-th bit of the $Q_j$ component. That is, letting $Q_j[i]$ represent the i-th bit of the $Q_j$ component, the subkey $k_i$ is expressed by the following equation.

$$K_{i-1}=(Q_1[i], Q_2[i], \ldots, Q_j[i], \ldots, Q_{16}[i]) \tag{24}$$

where $1 \leq i,j \leq 16$.

This processing method will be reviewed below in the framework of the G- and the H-function mentioned above. Here, $Y_j$ represents the value of 64 bits, $Y_j^L$ the value of high-order 32bits of $Y_j$ and $Y_j^R$ the value of low-order 32 bits of $Y_j$.

Letting the output from the G-function for the input $(Y_j, v_j)$ be represented by $$(L_{j+1}, (Y_{j+1}, v_{j+1}))=G(Y_j, v_j)\ (0 \leq j \leq 7), \tag{25}$$

the output $(L_{j+1}, (Y_{j+1}, v_{j+1}))$ is given by the following equations.

$$Y_{j+1}^L=Y_j^R \tag{26}$$

$$Y_{j+1}^R=L_{j+1}=f_k(Y_j^L, Y_j^R \oplus v_j) \tag{27}$$

$$v_{j+1}=Y_j^L \tag{28}$$

The subkey $k_i$ is given as a function of i and $L_1$ to $L_8$ by the following equation.

$$K_{i-1}=H(i, L_1, L_2, \ldots, L_8) \tag{29}$$

Letting each $L_j$ be represented by $(t_j^{(1)}, t_j^{(2)}, \ldots, t_j^{(32)})$ the H-function constructed the subkey $k_i$ as follows:

$$K_i=(t_1^{(i)}, t_1^{(16+i)}, t_2^{(i)}, t_2^{(16+i)}, \ldots, t_8^{(i)}, t_8^{(16+i)})\ (1 \leq i \leq 16) \tag{30}$$

Since this method provides 16 subkeys at the maximum, the encryption algorithm described in the U.S. patent by Miyaguchi et al. can be used for the structure with a maximum of eight rounds of F-functions.

The construction of the intermediate key generation part 220 shown in FIG. 23A will be described below with reference to FIG. 24. G-function parts 22-1 to 22-8 are provided in cascade. The master key K is input as $Y_0$ to the first-round G-function part 22-1 together with a constant $v_0$, and $Y_{j-1}$ and $v_{j-1}$ are input to the G-function part 22-j of each j-th round; each G-function part randomizes $Y_{j-1}$ and outputs $L_j$, $Y_j$ and $v_j$. $L_j$ is an intermediate key and $Y_j$ and $v_j$ are fed to the next G-function part 22-(j+1). That is, after setting $Y_0=K$ and $v_0=0$, the G-function part 22 is called eight times. The construction of the G-function part is depicted in FIG. 25, for which the following process is repeated from j=0 to j=7.

Step 1: Upon input $Y_j$ and $v_j$ to the G-function part 22-(j+1), split $Y_j$ into two blocks $(Y_j^L, Y_j^R)$ by a splitting part 221 in FIG. 25.

Step 2: Output $Y_j^L$ as $v_{j+1}$. Input $Y_j^L$ to a data diffusion part ($f_k$) 222.

Step 3: Input $Y_j^R$ to a data swapping part 224. Input $Y_j^R$ and $v_j$ to an XOR circuit 223 to compute $Y_j^R \oplus v_j$ and input the result of computation to the data diffusion part ($f_k$) 222.

Step 4: Upon receiving $Y_j^L$ and $Y_j^R \oplus v_j$ as inputs thereto, the data diffusion part ($f_k$) 222 outputs the result of computation as $L_{j+1}$ and, at the same time, input it to the swapping part 224.

Step 5: Upon receiving $Y_j^R$ and the result of computation $L_{j+1}$ by the data diffusion part ($f_k$) 222, the swapping part 224 renders $Y_j^R$ to $Y_{j+1}^L$ and $L_{j+1}$ to $Y_{j+1}^R$, then concatenates them to $Y_{j+1}=(Y_{j+1}^L, Y_{j+1}^R)$, and outputs it.

The eight $L_i$ components output from the G-function part 22-1 to 22-8 are once stored in the storage part 230 (FIG. 23A).

Figure 26:
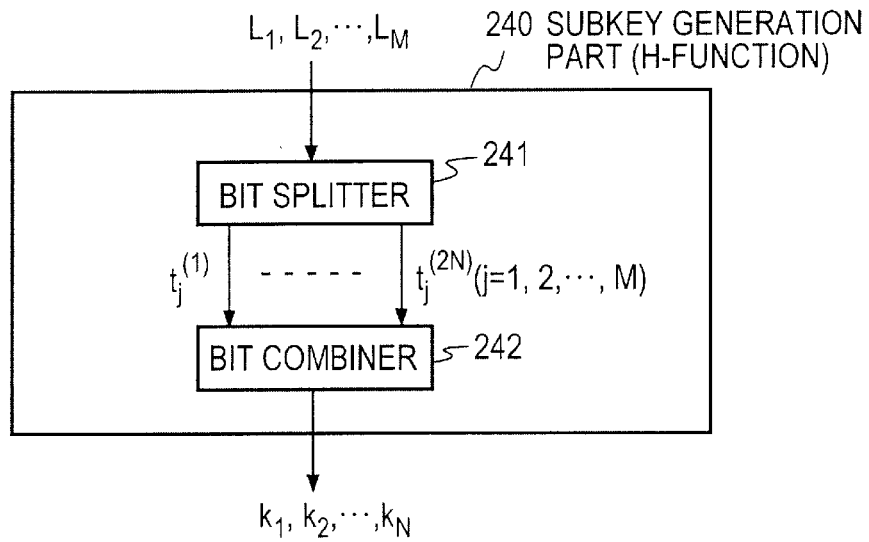
FIG. 26 is a block diagram depicting the functional configuration of a subkey generation part 240 in FIG. 23A when the present invention is applied to a key scheduling part in FIG. 3.

Next, a description will be given, with reference to FIG. 26, of the construction of the H-function part serving as the subkey generation part 240. The H-function part 240 performs the following steps after reading out the eight L components $L_1$ to $L_8$ from the storage part 230.

Step 1: Read out each component $L_j$ from the storage part 230 and input it to a bit splitter 241 to split it bitwise as follows:

$$(t_j^{(1)}, t_j^{(2)}, \ldots, t_j^{(32)})=L_j(j=1, 2, \ldots, 8) \tag{31}$$

Step 2: Input $(t_1^{(i)}, t_1^{(16+i)}, t_2^{(i)}, t_2^{(16+i)}, \ldots, t_8^{(i)}, t_8^{(16+i)})$ to a bit combiner 242 to obtain the subkey as follows:

$$k_i=(t_1^{(i)}, t_1^{(16+i)}, t_2^{(i)}, t_2^{(16+i)}, \ldots, t_8^{(i)}, t_8^{(16+i)})$$
$$(i=1, 2, \ldots, 16) \tag{32}$$

Seventh Embodiment

A description will be given, with reference to FIGS. 23B, 24, 25 and 27, of another embodiment which outputs the same subkey as does the six embodiment.

Figure 23B:
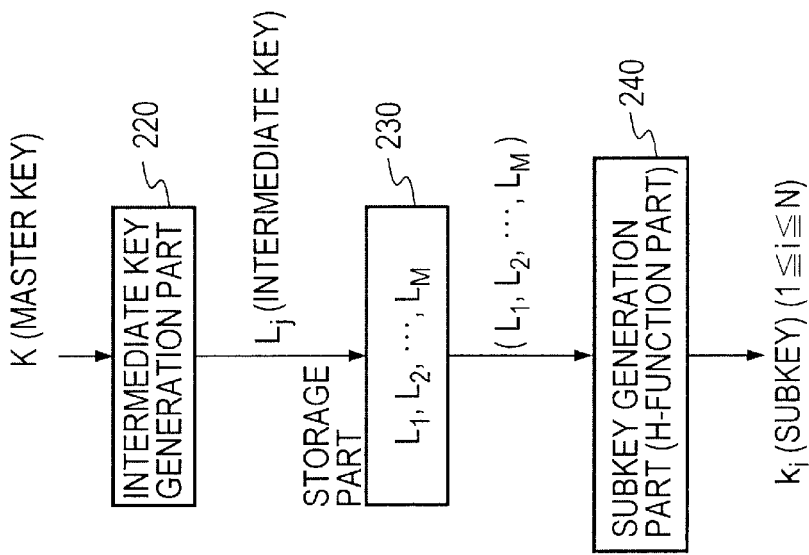
FIG. 23B is a block diagram depicting the basic functional configuration of another key generation part according to the present invention.

As shown in FIG. 23B, a plurality of intermediate keys $L_j$ are generated in the intermediate key generation part 220.

Figure 24:
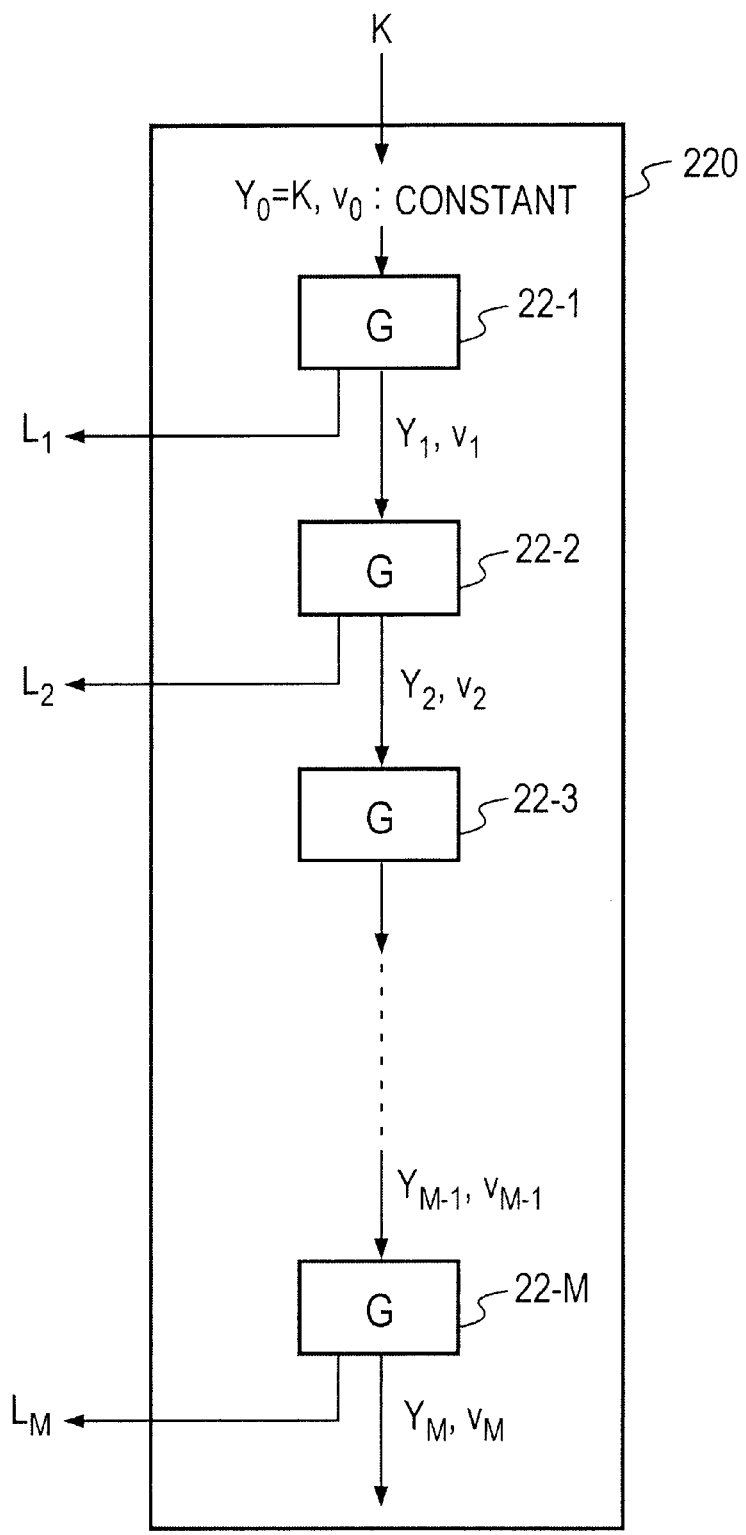
FIG. 24 is a block diagram depicting an example of the functional configuration of an intermediate key generation part 220 in FIGS. 23A or 23B.
Figure 25:
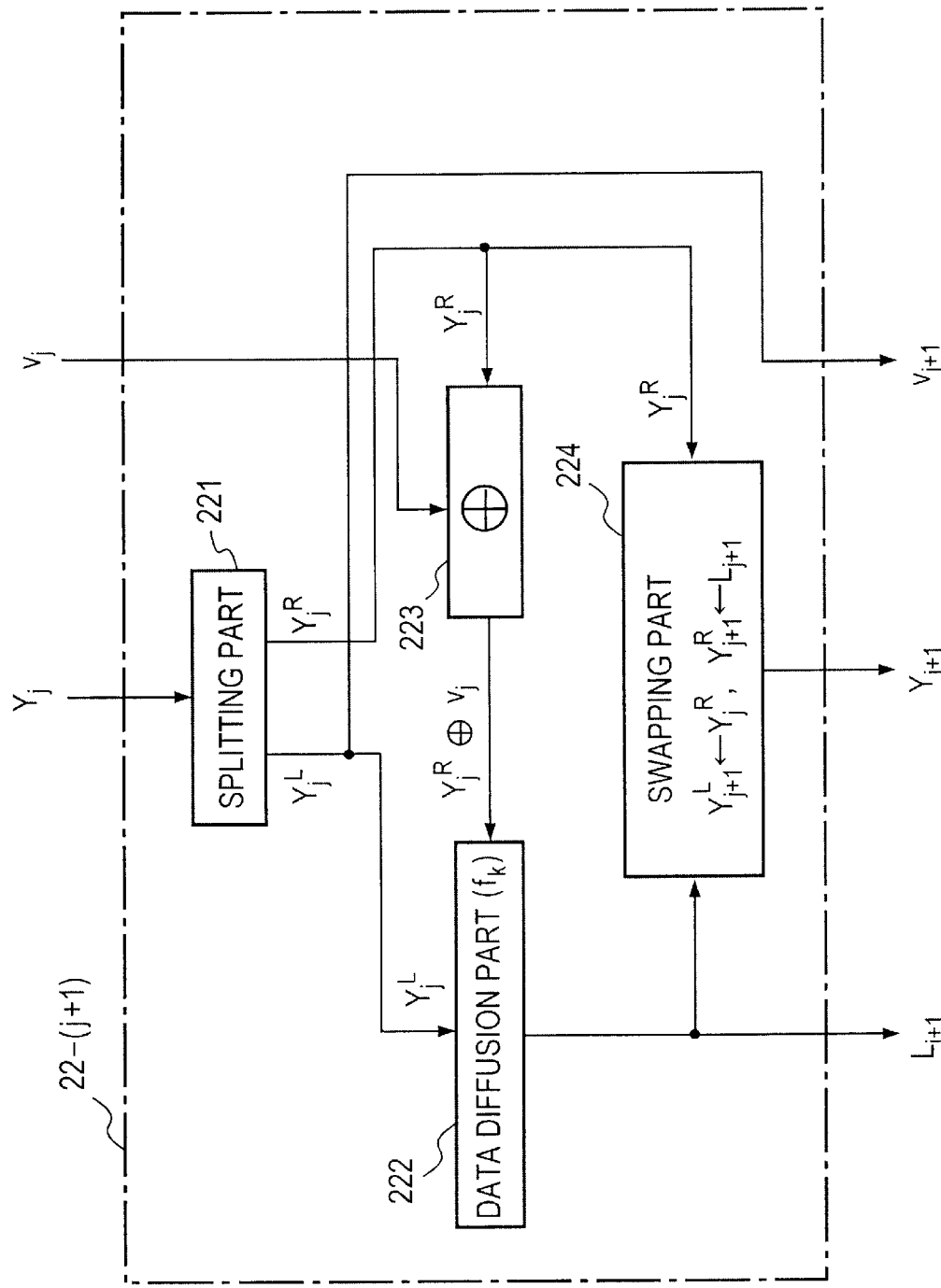
FIG. 25 is a block diagram depicting the functional configuration of a G-functional part in FIG. 24 when the present invention is applied to a key scheduling part in FIG. 3.

The intermediate key generation part 220 is identical in construction with that depicted in FIG. 23A; that is, it comprises the plurality of G-function parts 22 as shown in FIG. 24. Upon each generation of the intermediate key $L_j$ in the G-function part 22, the intermediate key $L_j$ is fed to the subkey generation part 250, from which bit position information, which is determined by the suffix i of the subkey $k_i$ and its bit position q, is output as information $k_{iq}$ and is stored in the storage part 260.

That is, the intermediate key generation part 220 and the subkey generation part 250 repeat the following steps 1 through 7 for each value from j=0 to j=7.

Step 1: Upon input of $Y_j$ and $v_j$ to the G-function part 22-(j+1), split $Y_j$ into two blocks ($Y_j^L$, $Y_j^R$) by the splitting part 221.

Step 2: Output $Y_j^L$ as $v_{j+1}$. And input $Y_j^L$ to the data diffusion part ($f_k$) 222.

Step 3: Input $Y_j^R$ to the swapping part 224. And input $Y_j^R$ and $v_j$ to the XOR circuit 223 to calculate $Y_j^R \oplus v_j$ and input it to the data diffusion part ($f_k$) 222.

Step 4: Upon receiving $Y_j^L$ and $Y_j^R \oplus v_j$, the data diffusion part ($f_k$) 222 inputs the result of its computation as $L_{j+1}$ to the subkey generation part 250 (FIG. 23B) and, at the same time, input it to the swapping part 224.

Step 5: Upon receiving $Y_j^R$ and the result of calculation $L_{j+1}$ from the data diffulsion part ($f_k$) 222, the swapping part 224 renders $Y_j^R$ to $Y_{j+1}^L$ and $L_{j+1}$ to $Y_{j+1}^R$, then concatenates them to $Y_{j+1} = (Y_{j+1}^L, Y_{j+1}^R)$ and outputs it.

Figure 27:
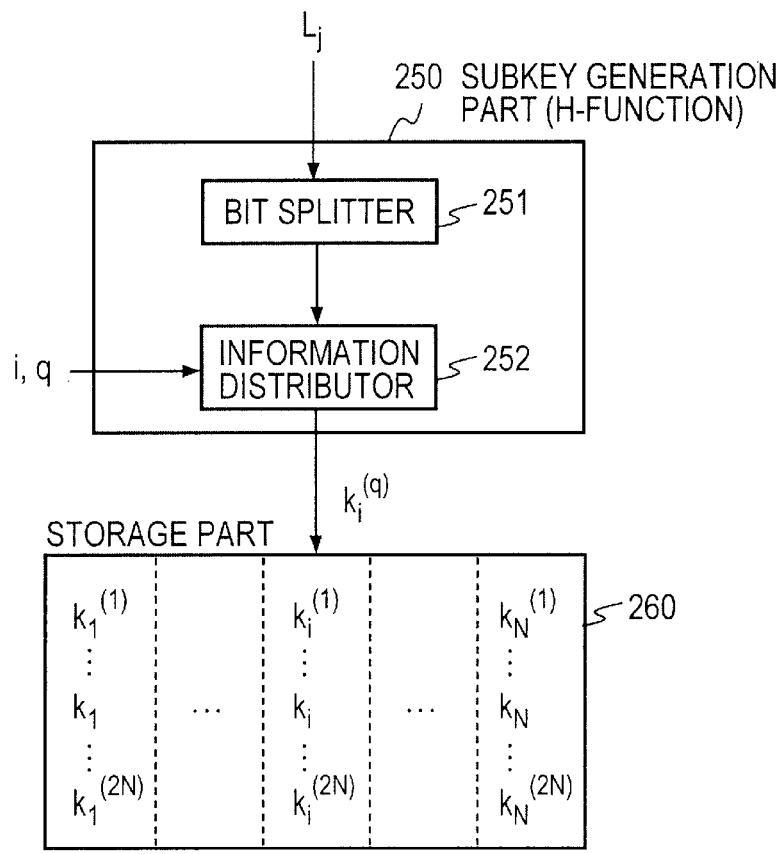
FIG. 27 is a block diagram depicting an example of the functional configuration of a subkey generation part 250 in FIG. 23B when the present invention is applied to a key scheduling part in FIG. 3 (In this embodiment the subkey generation part contains an H-function part equipped with a bit extraction function).

Step 6: As depicted in FIG. 27, the subkey generation part 250 input $L_j$ to a bit splitter 251 to split it bitwise as follows:

$$(t_j^{(1)}, t_j^{(2)}, \ldots, t_j^{(32)}) = L_j (j=1, 2, \ldots, 8) \quad (33)$$

and then input them to an information distributor 252.

Step 7: The bit string ($t_j^{(1)}$, $t_j^{(2)}$, . . . , $t_j^{(32)}$) input to the information distributor 252 is information on the bit position of $L_j$ determined by the bit position q of the subkey $k_i$ for a suffix i being used as information on the bit position q of the subkey $k_i$, and is stored for each $L_j$ in one of 16 storage areas of the storage part 260 divided for each subkey $$k_i = (t_1^{(i)}, t_1^{(16+i)}, t_2^{(i)}, t_2^{(16+i)}, \ldots, t_8^{(i)}, t_8^{(16+i)}) \quad (34)$$

Step 8: When 16-bit information is set for each $k_i$, that is, when the subkey $k_i$ generated, output its value (i=1, 2, . . . , 16).

Eighth Embodiment

With a view to reducing the device size or the number of program steps, this embodiment uses in key scheduling an f-function used for encryption.

This embodiment will also be described in the framework of the G- and H-function.

Let the output from the G-function for the input ($Y_j$, $v_j$) be represented by $$(L_{j+1}, (Y_{j+1}, v_{j+1})) = G(Y_j, v_j) \quad (0 \leq j \leq 7)$$

and let the output be set as follows:

$$((Y_j^{(1)}, Y_j^{(2)}, Y_j^{(3)}, Y_j^{(4)}), v_j) \to \quad (35)$$
$$((L_{j+1}^{(1)}, L_{j+1}^{(2)}, L_{j+1}^{(3)}, L_{j+1}^{(4)}), [(Y_{j+1}^{(1)}, Y_{j+1}^{(2)}, Y_{j+1}^{(3)}, Y_{j+1}^{(4)}), v_{j+1}])$$

Here, the following definitions are given.

$$Y_{j+1}^{(i)} = f(Y_j^{(i)}) \quad (i = 1, 2, 3, 4) \quad (36)$$

$$L_{j+1}^{(0)} = v_j \quad (37)$$

$$L_{j+1}^{(i)} = f(L_{j+1}^{(i-1)}) \oplus Y_{j+1}^{(i)} \quad (i = 1, 2, 3, 4) \quad (38)$$

$$v_{j+1} = L_{j+1}^{(4)} \quad (39)$$

Further, in $$k_i = H(i, L_1, L_2, \ldots L_8) \quad (40)$$

the following definitions are given.

$$q_{i+4j} = L_{j+1}^{(i+1)} \quad (i = 0, 1, 2, 3) \quad (41)$$

$$(t_i^{(0)}, t_i^{(1)}, \ldots, t_i^{(7)}) = q_i \quad (i = 0, 1, \ldots, 31) \quad (42)$$

$$k_{(i+1)} = (t_{0+(i \bmod 2)}^{(\lfloor i/2 \rfloor)}, t_{2+(i \bmod 2)}^{(\lfloor i/2 \rfloor)}, \ldots, t_{30+(i \bmod 2)}^{(\lfloor i/2 \rfloor)}) \quad (i = 0, 1, \ldots, 15) \quad (43)$$

Suppose that [i/2] in Equation (43) represents $\lfloor i/2 \rfloor$.

Figure 28:
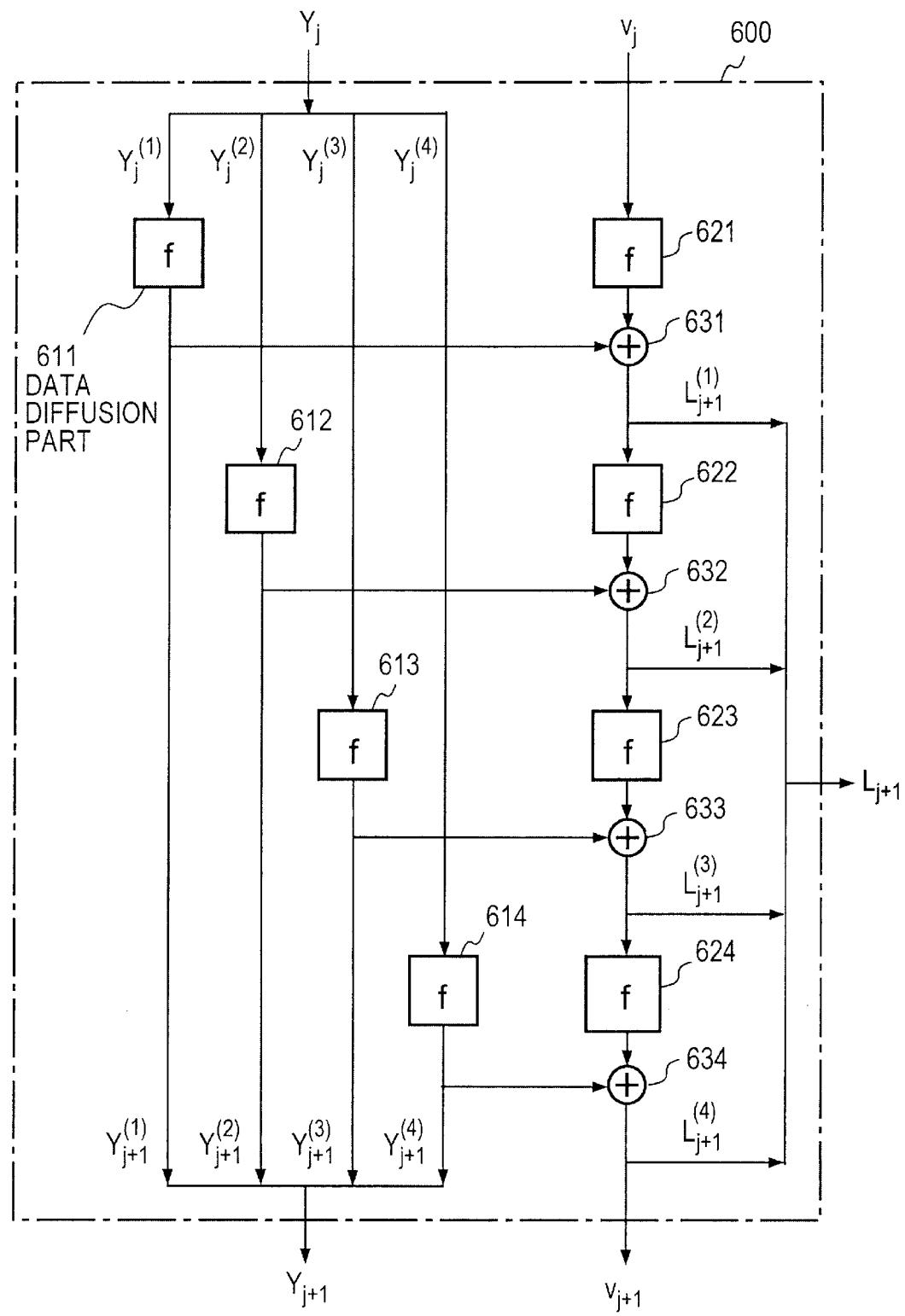
FIG. 28 is a block diagram depicting the functional configuration of the G-function part 22 designed for the application of the present invention to a Feistel cipher which uses 128 bits as one block.

This procedure will be described below with reference to FIGS. 28 and 26.

Preparation

Step 1: Set as $v_0$ a value extracted from 0123456789abcdef101112. . . (hex) by the same number of bits as the bit length of the function f.

Step 2: Set the master key K at $Y_0$.

Generation of Intermediate Key: The following procedure is repeated for j=0,1, 2, . . . , 7.

Step 1: Divide equally the input $Y_j$ into four ($Y_j^{(1)}$, $Y_j^{(2)}$, $Y_j^{(3)}$, $Y_j^{(4)}$).

Step 2: For i=1, 2, 3, 4, compute $Y_{j+1}^{(i)} = f(Y_j^{(i)})$ by data diffusion part 611 to 614.

Step 3: set $L_{j+1} = v_j$.

Step 4: For I=1, 2, 3, 4, compute $f(L_{j+1}^{(i-1)})$ by data diffusion part 621 to 624, and input the result of computation to an XOR circuit 63i to XOR it with $Y_{j+1}^{(i)}$ to obtain $L_{j+1}^{(i)} = f(L_{j+1}^{(i-1)}) \oplus Y_{j+1}^{(i)}$.

Step 5: set $Y_{j+1} = (Y_{j+1}^{(1)}, Y_{j+1}^{(2)}, Y_{j+1}^{(3)}, Y_{j+1}^{(4)})$.

Step 6: set $L_{j+1} = L_{j+1}^{(1)}, L_{j+1}^{(2)}, L_{j+1}^{(3)}, L_{j+1}^{(4)}$.

Step 7: Set $v_{j+1} = L_{j+1}^{(4)}$.

Generation of Subkey: As is the case with the sixth embodiment, Equation (43) is implemented to obtain $k_1$, $k_2$, . . . , $k_N$ (where $N \leq 16$).

This embodiment is not limited specifically to the above but can also be carried out in the following manner:

(1) When the size of $Y_0$ is larger than K, K is used as part of $Y_0$ and the remaining part is filled with a constant.

(2) An arbitrary constant is used as $v_0$.

(3) The bit length of respective characters are arbitrarily set in the ranges in which they are harmonized with one another.

(4) Functions other than that for encryption are used as f.

(5) Part of $L_j$ is not used to compute H, that is, this occurs when the number of subkeys $k_i$ is small and the bits of $L_j$ is large.

(6) H is computed in the same manner as in the sixth embodiment.

(7) G is computed in the same manner as in the sixth embodiment.

(8) As is the case with the seventh embodiment, upon each generation of one intermediate key, not on the generation of all the intermediate keys, the result of computation is stored in the storage part 260 in the corresponding bit position of $k_i$.

The intermediate key generation part 220, the subkey generation parts 240 and 250 may be adapted to be operated under program control by the computer depicted in FIG. 22.

EFFECT OF THE INVENTION

As described above in detail, according to the present invention, the data transformation device for use in an encryption device to conceal data is designed to simultaneously meet the requirements of security and speedup, thereby ensuring security and permitting fast encryption procedure without causing a significant increase in the number of rounds. Hence, the device of the present invention suitable for use in an encryption device of the common-key cryptosystem which encrypts or decrypts data in blocks using a secret key.

Furthermore, according to the key scheduling of the present invention, even if $k_6$, $k_7$, $k_8$, $k_9$, $k_{10}$ and $k_{11}$ are known in the sixth and seventh embodiment, only 12bits (for example, 6th, 7th, 8th, 9th, 10th, 11th, 22nd, 23rd, 24th 25th, 26th and 27th bits) of the respective $L_i$ components are known. Thus, the problems concerning the security of the key scheduling part raised in DES and the U.S. patent issued to Miyaguchi et al. have been solved.

What is claimed:

1. A data transformation device which has key storage means for storing plural pieces of key data and a plurality of cascade-connected round processing parts each composed of a nonlinear function part supplied with said plural pieces of key data to perform key-dependent nonlinear transformation, whereby input data is transformed to different data in dependence on key data, said nonlinear function part of each of said round processing parts comprising:

first key-dependent linear transformation means for linearly transforming input data to said round processing part based on first key data stored in said key storage means;

splitting means for splitting the output data from said first key-dependent linear transformation means to n pieces of subdata, said n being an integer equal to or larger than 4;

first nonlinear transformation means for nonlinearly transforming each of said n pieces of subdata;

second key-dependent linear transformation means for linearly transforming the output subdata from each of said first nonlinear transformation means based on second key data stored in said key storage means;

second nonlinear transformation means for nonlinearly transforming n pieces of output subdata from said second key-dependent linear transformation means; and combining means for combining n pieces of output subdata from said second nonlinear transformation means to provide the output from said nonlinear function means;

wherein said second key-dependent linear transformation means contains a linear transformation layer wherein the input thereto is transformed linearly using XORs defined by an n×n matrix.

2. The data transformation device as claimed in claim 1, which further comprises:

initial splitting means for splitting said input data into two pieces of data;

nonlinear function means supplied with one of said two pieces of data;

linear operation means for causing the output data from said nonlinear function means to act on the other piece of data; and final combining means for combining two pieces of data into a single piece of output data.

3. The data transformation device as claimed in claim 2, which further comprises initial transformation means for transforming said input data and for supplying said transformed input data to said initial splitting means.

4. The data transformation device as claimed in claim 2 or 3, which further comprises final transformation means for transforming the output data from said final combining means to provide output data from said data transformation device.

5. The data transformation device as claimed in claim 3, wherein at least one of said initial transformation means and said final transformation means is key-dependent transformation means which performs transformation based on key data stored in said key storage means.

6. The data transformation device as claimed in any one of claims 1, 2 or 3, wherein said nonlinear function part is provided with third key-dependent linear transformation means for linearly transforming the output data from said combining means based on third key data stored in said key storage means to provide the output from said nonlinear function part.

7. The data transformation device as claimed in any one of claims 1, 2 or 3, wherein said first key-dependent linear transformation means, said second key-dependent linear transformation means and/or said third key-dependent linear transformation means is linear transformation means which performs fixed linear transformation.

8. The data transformation device as claimed in any one of claims 1, 2 or 3, wherein said first nonlinear transformation means and said second nonlinear transformation means are each provided with: means for splitting the input subdata thereto into two subblocks; means for performing linear transformation and nonlinear transformation of each of said two split subblocks in cascade; and means for combining the transformed subblocks from said cascade transformation means to provide transformed output subdata corresponding to said input subdata.

9. The data transformation device as claimed in any one of claims 1, 2 or 3, wherein said n×n matrix is formed by n column vectors whose Hamming weights are equal to or larger than T−1 for a predetermined security threshold T.

10. The data transformation device as claimed in claim 9, wherein said matrix is selected from a plurality of matrix candidates which provides a maximum value of $n_d$, said $n_d$ being the minimum number of active s-boxes.

11. The data transformation device as claimed in any one of claims 1, 2 or 3, wherein said n×n matrix is a 4×4 matrix.

12. The data transformation device as claimed in claim 11, wherein said second linear transformation means is means which inputs thereto four data A1, A2, A3 and A4 from said first nonlinear transformation means, computes $B1=A1 \oplus A3 \oplus A4$ $B2=A2 \oplus A3 \oplus A4$ $B3=A1 \oplus A2 \oplus A3$ $B4=A1 \oplus A2 \oplus A4$ and outputs data B1, B2, B3 and B4.

13. The data transformation device as claimed in claim 12, wherein said second linear transformation means is key-dependent linear transformation means, which is also supplied with key data k2=[k21, k22, k23, k24] from said key storage means and performs XOR operations by said key data k21, k22, k23 and k24 in the computations for said output data B1, B2, B3 and B4, respectively.

14. The data transformation device as claimed in claim 11, wherein:
- said first nonlinear transformation means comprises: for four pieces of m-bit subdata in1, in2, in3 and in4 from said splitting means, for transforming said in1 to 4m-bit data MI1=[A1, 00 . . . $0_{(2)}$, A1, A1]; means for transforming said in2 to 4m-bit data MI2=[00 . . . $0_{(2)}$, A2, A2, A2]; means for transforming said in3 to 4m-bit data MI3=[A3, A3, A3, 00 . . . $0_{(2)}$]; and means for transforming said in4 to 4m-bit data MI4=[A4, A4, 00 . . . $0_{(2)}$, A4]; and
- said second linear transformation means is means supplied with said data MI1, MI2, MI3 and MI4 from said first nonlinear transformation means, for computing B=MI1⊕MI2⊕MI3⊕MI4 and for outputting B=[B1, B2, B3, B4].

15. The data transformation device as claimed in claim 14, wherein said second linear transformation means is a key-dependent linear transformation means, which is also supplied with 4m-bit key data k2 from said key storage means and performs an XOR operation by said key data k2 in the computation of said B.

16. The data transformation device as claimed in any one of claims 1, 2 or 3, wherein said n×n matrix is an 8×8 matrix.

17. The data transformation device as claimed in claim 16, wherein said second linear transformation means is means which provides its eight pieces of output data B1 to B8 by obtaining four pieces of said output subdata B1, B2, B3 and B4 through XOR operations using six of eight pieces of subdata A1, A2, . . . , A8 from said first nonlinear transformation means and by obtaining four pieces of said output subdata B5, B6, B7 and B8 through XORing using five of said eight pieces of subdata from said first nonlinear transformation means.

18. The data transformation device as claimed in claim 17, wherein said second linear transformation means is key-dependent linear transformation means, which is supplied with key data k2=[k21, k22, k23, k24, k25, k26, k27, k28] stored in said key storage means and performs XOR operations by said key data k21, k22, k23, k24, k25, k26, k27 and k28 for obtaining said output subdata [B1, B2, B3, B4, B5, B6, B7, B8].

19. The data transformation device as claimed in claim 16, wherein:
- said first nonlinear means is means for transforming eight pieces of m-bit subdata in1 to in8 from said splitting means to eight pieces of 8 m-bit data
  MI1=[00 . . . $0_{(2)}$, A1, A1, A1, A1, A1, 00 . . . $0_{(2)}$, A1],
  MI2=[A2, 00 . . . $0_{(2)}$, A2, A2, A2, A2, A2, 00 . . . $0_{(2)}$,]
  MI3=[A3, A3, 00 . . . $0_{(2)}$, A3, 00 . . . $0_{(2)}$, A3, A3, A3],
  MI4=[A4, A4, A4, 00 . . . $0_{(2)}$, A4, 00 . . . $0_{(2)}$, A4, A4],
  MI5=[A5, 00 . . . $0_{(2)}$, A5, A5, A5, 00 . . . $0_{(2)}$, 00 . . . $0_{(2)}$, A5],
  MI6=[A6, A6, 00 . . . $0_{(2)}$, A6, A6, A6, 00 . . . $0_{(2)}$, 00 . . . $0_{(2)}$,]
  MI7=[A7, A7, A7, 00 . . . $0_{(2)}$, 00 . . . $0_{(2)}$, A7, A7, 00 . . . $0_{(2)}$,], and
  MI8=[00 . . . $0_{(2)}$, A8, A8, A8, 00 . . . $0_{(2)}$, 00 . . . $0_{(2)}$, A8, A8]; and
- said second linear transformation means is means supplied with said data MI1 to MI8 from said first nonlinear transformation means, for computing B=MI1⊕MI2⊕MI3⊕MI4⊕MI5⊕MI6⊕MI7⊕MI8 and for outputting B=[B1, B2, B3, B4, B5, B6, B7, B8].

20. The data transformation device as claimed in claim 19, wherein said second linear transformation means is key-dependent linear transformation means, which is also supplied with 8 m-bit key data k2 stored in said key storage means and performs an XOR operation by said key data k2 for obtaining said B.

21. A recording medium on which there is recorded a data transformation program by which round processing containing nonlinear function process of performing key-dependent nonlinear transformations based on plural pieces of key data stored in key storage means is executed a plurality of times in cascade to thereby transform input data to different data in dependent on key data, said nonlinear function process of said round processing comprises:
- a first key-dependent linear transformation step of linearly transforming input data to a round processing part based on first key data stored in said key storage means;
- a splitting step of splitting output data by said first key-dependent linear transformation step into n pieces of subdata, said n being an integer equal to or larger than 4;
- a first nonlinear transformation step of nonlinearly transforming each of said n pieces of subdata;
- a second key-dependent linear transformation step of performing a linear transformation using second key data and output subdata by said nonlinear transformation step;
- a second nonlinear transformation step of performing a second nonlinear transformation of each of said n pieces of output subdata by said second key-dependent linear transformation step; and
- combining step of combining n pieces of output subdata by said second nonlinear transformation means into a single data for outputting as the result of said nonlinear function process;
- wherein said second key-dependent linear transformation step includes an XOR linear transformation step of performing, for the input thereto, XORing defined by an n×n matrix.

22. The recording medium as claimed in claim 21, wherein said data transformation program comprises:
- an initial splitting step of splitting said input data into two pieces of data;
- a step of performing said nonlinear function process using one of said two pieces of data as the input thereto;
- a linear operation step of causing the output data by said nonlinear function processing step to act on the other piece of said data; and
- a final combining step of combining two pieces of data into a single piece of output data.

23. The recording medium as claimed in claim 22, wherein said data transformation program includes an initial transformation step of transforming said input data and supplying said transformed input data to said initial splitting step.

24. The recording medium as claimed in claim 22 or 23, wherein said data transformation program includes a final transformation step of transforming the output data by said final combining step to provide output data.

25. The recording medium as claimed in claim 23, wherein at least one of said initial transformation step and said final transformation step of said data transformation program is a key-dependent transformation step of performing transformation based on key data.

26. The recording medium as claimed in any one of claims 21, 22 or 23, wherein said nonlinear function processing step includes a third key-dependent linear transformation step of linearly transforming the output data by said combining step based on third key data stored in said key storage means to provide the output of said nonlinear function processing step.

27. The recording medium as claimed in any one of claims 21, 22 or 23, wherein said first key-dependent linear transformation step, said second key-dependent linear transformation step and/or said third key-dependent linear transformation step is a linear transformation step of performing fixed linear transformation.

28. The recording medium as claimed in any one of claims 21, 22 or 23, wherein said first nonlinear transformation step and said second nonlinear transformation step are each include: a step of splitting the input data thereto into two subblocks; a step of performing linear transformation of each of said two split subblocks; a step of performing linear transformation and nonlinear transformation of each of said two split subblocks in cascade; and a step of combining the transformed subblocks by said cascade transformation step into nonlinearly transformed output data corresponding to said input data.

29. The recording medium as claimed in any one of claims 21, 22 or 23, wherein said n×n matrix is formed by n column vectors whose Hamming weights are equal to or larger than T−1 for a predetermined security threshold T.

30. The recording medium as claimed in claim 29, wherein said matrix is selected from a plurality of matrix candidates which provides a maximum value of $n_d$, said $n_d$ being the minimum number of active s-boxes.

31. The recording medium as claimed in any one of claims 21, 22 or 23, wherein said n×n matrix is a 4×4 matrix.

32. The recording medium as claimed in claim 31, wherein said second linear transformation step is a step of inputting thereto four data A1, A2, A3 and A4 by said first nonlinear transformation step, computing $B1 = A1 \oplus A3 \oplus A4$ $B2 = A2 \oplus A3 \oplus A4$ $B3 = A1 \oplus A2 \oplus A3$ $B4 = A1 \oplus A2 \oplus A4$ and outputting data B1, B2, B3 and B4.

33. The recording medium as claimed in claim 32, wherein said second linear transformation step is a key-dependent linear transformation step of inputting key data k2=[k21, k22, k23, k24] in said key storage means and performing XOR operations by said key data k21, k22, k23 and k24 in the computations for said output data B1, B2, B3 and B4, respectively.

34. The recording medium as claimed in claim 32, wherein:

said first nonlinear transformation step comprises: for four pieces of m-bit subdata in1, in2, in3 and in4 from said splitting means a step of transforming said in1 to 4 m-bit data MI1=[A1, 00 . . . $0_{(2)}$, A1, A1]; a step of transforming said in2 to 4 m-bit data MI2=[00 . . . $0_{(2)}$, A2, A2, A2]; a step of transforming said in3 to 4 m-bit data MI3=[A3, A3, A3, 00 . . . $0_{(2)}$]; and a step of transforming said in4 to 4 m-bit data MI4=[A4, A4, 00 . . . $0_{(2)}$, A4]; and said second linear transformation step is a step of inputting said data MI1, MI2, MI3 and MI4 by said first nonlinear transformation step, computing B=MI1⊕MI2⊕MI3⊕MI4 and outputting B=[B1, B2, B3, B4].

35. The recording medium as claimed in claim 34, wherein said second linear transformation step is a key-dependent linear transformation step of inputting 4m-bit key data k2 in said key storage means and performing an XOR operation by said key data k2 in the computation of said B.

36. The recording medium as claimed in any one of claims 21, 22 or 23, wherein said n×n matrix is an 8×8 matrix.

37. The recording medium as claimed in claim 36, wherein said second linear transformation step is a step of providing its eight pieces of output data B1 to B8 by obtaining four pieces of said output subdata B1, B2, B3 and B4 through XOR operations using six of eight pieces of subdata A1, A2, . . . , A8 by said first nonlinear transformation step and by obtaining four pieces of said output subdata B5, B6, B7 and B8 through XORing using five of said eight pieces of subdata by said first nonlinear transformation step.

38. The recording medium as claimed in claim 37, wherein said second linear transformation step is a key-dependent linear transformation step of inputting key data k2=[k21, k22, k23, k24, k25, k26, k27, k28] stored in said key storage means and performing XOR operations by said key data k21, k22, k23, k24, k25, k26, k27 and k28 for obtaining said output subdata [B1, B2, B3, B4, B5, B6, B7, B8].

39. The recording medium as claimed in claim 37, wherein:

said first nonlinear step is a step of transforming eight pieces of m-bit subdata in1 to in8 by said splitting means to eight pieces of 8 m-bit data

MI1=[00 . . . $0_{(2)}$, A1, A1, A1, A1, A1, 00 . . . $0_{(2)}$, A1],

MI2=[A2, 00 . . . $0_{(2)}$, A2, A2, A2, A2, A2, 00 . . . $0_{(2)}$]

MI3=[A3, A3, 00 . . . $0_{(2)}$, A3, 00 . . . $0_{(2)}$, A3, A3, A3],

MI4=[A4, A4, A4, 00 . . . $0_{(2)}$, A4, 00 . . . $0_{(2)}$, A4, A4],

MI5=[A5, 00 . . . $0_{(2)}$, A5, A5, A5, 00 . . . $0_{(2)}$, 00 . . . $0_{(2)}$, A5],

MI6=[A6, A6, 00 . . . $0_{(2)}$, A6, A6, A6, 00 . . . $0_{(2)}$, 00 . . . $0_{(2)}$]

MI7=[A7, A7, A7, 00 . . . $0_{(2)}$, 00 . . . $0_{(2)}$, A7, A7, 00 . . . $0_{(2)}$], and MI8=[00 . . . $0_{(2)}$, A8, A8, A8, 00 . . . $0_{(2)}$, 00 . . . $0_{(2)}$, A8, A8]; and said second linear transformation step is a step of inputting said data MI1 to MI8 by said first nonlinear transformation step, computing B=MI1⊕MI2⊕MI3⊕MI4⊕MI5⊕MI6⊕MI7⊕MI8 and outputting B=[B1, B2, B3, B4, B5, B6, B7, B8].

40. The recording medium as claimed in claim 39, wherein said second linear transformation step is a key-dependent linear transformation step of inputting 8 m-bit key data k1 stored in said key storage means and performing an XOR operation by said key data k2 for obtaining said B.

41. The data transformation device as claimed in any one of claims 1, 2 or 3, which further comprises:

G-function means composed of M rounds means which are supplied with a master key K and generate intermediate values $L_{j+1}$(j=0, 1, . . . , M−1);

intermediate value storage means for temporarily storing said each intermediate value $L_j$ from said G-function means; and H-function means equipped with a partial information extracting function of generating N subkeys from a plurality of $L_j$ and for storing them as said plural pieces of key data in said key storage means;

wherein:

said G-function means takes said master key as at least one part of $Y_0$, inputs $Y_j$ and $v_j$ in the output $(L_j, Y_j, v_j)$ from the j-th round, into its (j+1)-th round (where j=0, 1, ..., M−1) diffuses the inputs and outputs $L_{j+1}, Y_{j+1}$ and $v_{j+1}$; and said H-function means inputs i (where i=1, 2, ..., N) and $L_1, L_2, ..., L_M$ stored in said intermediate value storage means, extracts information about bit positions of subkeys $k_i$ determined by said i from said $L_1, ..., L_M$, and outputs said subkeys, said subkeys being stored in said key storage means.

42. The data transformation device as claimed in any one of claims 1, 2 or 3, which further comprises:

G-function means composed of M rounds means which are supplied with a master key K and generate intermediate values $L_{j+1}$ j=0, 1, ..., M−1);

H-function means equipped with a partial information extracting function of generating subkeys from a plurality of $L_j$ generated by said G-function means; and intermediate value storage means for storing outputs from said H-function means as values corresponding to said subkeys $k_i$;

wherein:

said G-function means takes said master key as at least one part of $Y_0$, inputs $Y_j$ and $v_j$ in the output $(L_j, Y_j, v_j)$ from the j-th round, into its (j+1)-th round, diffuses the inputs and outputs $L_{j+1}, Y_{j+1}$ and $v_{j+1}$; and said H-function means inputs i, q and $L_j$ ($1 \leq i \leq N$, $1 \leq j \leq M$, $1 \leq q \leq$ the numbers of bits $k_i$), and extracts bit position information defined by i and q from $L_j$ to provide information about the bit position q of the subkeys $k_i$, said subkeys being stored as said plurality of key data in said key storage means.

43. The data transformation device as claimed in claim 41, wherein said G-function means comprises:

data splitting means for splitting the input $Y_j$ into two blocks $(Y_j^L, Y_j^R)$ and for outputting $Y_j^L$ as $v_{j+1}$;

XOR means for computing $Y_j^R \oplus v_j$ from said $Y_j^R$ and said $v_j$;

data diffusion means supplied with said $Y_j^L$ and the output from said XOR means, for diffusing them and for outputting the result as $L_{j+1}$; and data swapping means for rendering said $Y_j^R$ into $Y_{j+1}^L$ and said $L_{j+1}$ into $Y_{j+1}^R$ and for concatenating said $Y_{j+1}^L$ and said $Y_{j+1}^R$ into an output $Y_{j+1} = (Y_{j+1}^L, Y_{j+1}^R)$.

44. The data transformation device as claimed in claim 41, wherein said H-function means comprises:

bit splitting means for splitting bitwise each $L_j$ read out of said intermediate value storage means into $$(t_j^{(1)}, t_j^{(2)}, \ldots, t_j^{(2N)}) = L_j (j=1, 2, \ldots, M); \text{ and}$$

bit combining means for combining the resulting $(t_1^{(i)}, t_1^{(N+i)}, t_2^{(i)}, t_2^{(N+i)}, \ldots, t_M^{(i)}, t_M^{(N+i)}$ and for outputting subkeys $$k_i = (t_1^{(i)}, t_1^{(N+i)}, t_2^{(i)}, t_2^{(N+i)}, \ldots, t_M^{(i)}, t_M^{(N+i)}) \ (i=1, 2, \ldots, N).$$

45. The data transformation device as claimed in claim 42, wherein said H-function means comprises:

bit splitting means for splitting said each $L_j$ bitwise into $$(t_j^{(1)}, t_j^{(2)}, \ldots, t_j^{(2N)}) = L_j (j=1, 2, \ldots M); \text{ and}$$

bit combining means for combining said bits $(t_j^{(1)}, t_j^{(2)}, \ldots, t_j^{(2N)})$ so that information about the bit position defined by the bit position q of $k_i$ for i becomes the bit position of $k_i$, and for outputting subkeys $$k_i = (t_1^{(i)}, t_1^{(N+i)}, t_2^{(i)}, t_2^{(N+i)}, \ldots, t_M^{(i)}, t_M^{(N+i)}) \ (i=1, 2, \ldots, N).$$

46. The data transformation device as claimed in claim 41, wherein said G-function means is means for performing the following operation:

For $(L_{j+1}, (Y_{j+1}, v_{j+1})) = G(Y_j, v_j)$ ($0 \leq j \leq M-1$), the output result $$((Y_j^{(1)}, Y_j^{(2)}, Y_j^{(3)}, v_j) \rightarrow$$
$$((L_{j+1}^{(1)}, L_{j+1}^{(2)}, L_{j+1}^{(3)}, L_{j+1}^{(4)}), [(Y_{j+1}^{(1)}, Y_{j+1}^{(2)}, Y_{j+1}^{(3)}, Y_{j+1}^{(4)}), v_{j+1}])$$

where:

$$Y_{j+1}^{(i)} = f(Y_j^{(i)})$$

(i=1, 2, 3, 4)

$$L_{j+1}^{(0)} = v_j$$

$$L_{j+1}^{(i)} = f(L_{j+1}^{(i-1)}) \oplus Y_{j+1}^{(i)}$$

(i=1, 2, 3, 4)

$$v_{j+1} = L_{j+1}^{(4)};$$

and said H-function means is means for performing the following operation:

For $k_i = H(i, L_1, L_2, \ldots, L_M)$ $$q_{4i+j} = L_{j+1}^{(i+1)}$$

(i=0, 1, 2, 3, 4)

$$(t_i^{(0)}, t_i^{(1)}, \ldots, t_i^{(7)}) = q_i (i=0, 1, \ldots, 31)$$

$$k_{(i+1)} = (t_{0+(i \bmod 2)}^{([i/2])}, t_{2+(i \bmod 2)}^{([i/2])}, \ldots, t_{30+(i \bmod 2)}^{([i/2])})$$

(i=0, 1, ..., N−1).

47. An encryption key scheduling device for scheduling subkeys from a master key, comprising:

G-function means composed of M rounds means which are supplied with a master key K and generate intermediate values $L_j$ (j=0, 1, ..., M−1);

intermediate value storage means for temporarily storing said each intermediate value $L_j$ from said G-function means; and H-function means equipped with a partial information extracting function of generating N subkeys from a plurality of $L_j$;

wherein:

said G-function means takes said master key as at least one part of $Y_0$, inputs $Y_j$ and $v_j$ in the output $(L_j, Y_j, v_j)$ from the j-th round, into its (j+1)-th round (where j=0, 1, ..., M−1) diffuses the inputs and outputs $L_{j+1}$, $Y_{j+1}$ and $v_{j+1}$; and said H-function means inputs i (where i=1, 2, ..., N) and $L_1, L_2, ..., L_M$ stored in said intermediate value storage means, extracts information about bit positions of subkeys $k_i$ determined by said i from said $L_1, ..., L_M$ and outputs said subkeys.

48. An encryption key scheduling device for scheduling subkeys from a master key, comprising:

G-function means composed of M rounds means which are supplied with a master key K and generate intermediate values $L_{j+1}$ (j=0, 1, ..., M−1);

H-function means equipped with a partial information extracting function of generating subkeys from a plurality of $L_j$ generated by said G-function means; and intermediate value storage means for storing outputs from said H-function means as values corresponding to said subkeys $k_i$;

wherein:

said G-function means takes said master key as at least one part of $Y_0$, inputs $Y_j$ and $v_j$ in the output ($L_j$, $Y_j$, $v_j$) from the j-th round, into its (j+1)-th round, diffuses the inputs and outputs $L_{j+1}$, $Y_{j+1}$ and $v_{j+1}$; and said H-function means inputs i, q and $L_j$ ($1 \leq i \leq N$, $1 \leq j \leq M$, $1 \leq q \leq$ the numbers of bits $k_i$), and extracts bit position information defined by i and q from $L_j$ to provide information about the bit position q of the subkeys $k_i$.

49. The encryption key scheduling device as claimed in claim 47 or 48, wherein said G-function means comprises:

data splitting means for splitting the input $Y_j$ into two blocks ($Y_j^L$, $Y_j^R$) and for outputting $Y_j^L$ as $v_{j+1}$;

XOR means for computing $Y_j^R \oplus v_j$ from said $Y_j^R$ and said $v_j$;

data diffusion means supplied with said $Y_j^L$ and the output from said XOR means, for diffusing them and for outputting the result as $L_{j+1}$; and data swapping means for rendering said $Y_j^R$ into $Y_{j+1}^L$ and said $L_{j+1}$ into $Y_{j+1}^R$ and for concatenating said $Y_{j+1}^L$ and said $Y_{j+1}^R$ into an output $Y_{j+1}=(Y_{j+1}^L, Y_{j+1}^R)$.

50. The encryption key scheduling device as claimed in claim 47, wherein said H-function means comprises:

bit splitting means for splitting bitwise each $L_j$ read out of said intermediate value storage means into $(t_j^{(1)}, t_j^{(2)}, ..., t_j^{(2N)})=L_j$ (j=1, 2, ..., M); and bit combining means for combining the resulting ($t_1^{(i)}, t_1^{(N+i)}, t_2^{(i)}, t_2^{(N+i)}, ..., t_M^{(i)}, t_M^{(N+i)}$) and for outputting subkeys $k_i=(t_1^{(i)}, t_1^{(N+i)}, t_2^{(i)}, t_2^{(N+i)}, ..., t_M^{(i)}, t_M^{(N+i)})$ (i=1, 2, ..., N).

51. The encryption key scheduling device as claimed in claim 48, wherein said H-function means comprises:

bit splitting means for splitting said each $L_j$ bitwise into $(t_j^{(1)}, t_j^{(2)}, ..., t_j^{(2N)})=L_j$ (j=1, 2, ..., M); and bit combining means for combining said bits ($t_j^{(1)}, t_j^{(2)}, ..., t_j^{(2N)}$) so that information about the bit position defined by the bit position q of $k_i$ for i becomes the bit position of $k_i$, and for outputting subkeys $k_i=(t_1^{(i)}, t_1^{(N+i)}, t_2^{(i)}, t_2^{(N+i)}, ..., t_M^{(i)}, t_M^{(N+i)})$ (i=1, 2, ..., N).

52. The encryption key scheduling device as claimed in claim 47 or 48, wherein said G-function means is means for performing the following operation:

For $(L_{j+1}, (Y_{j+1}, v_{j+1}))=G(Y_j, v_j)$ $(0 \leq j \leq M-1)$, the output result $((Y_j^{(1)}, Y_j^{(2)}, Y_j^{(3)}), v_j) \rightarrow$ $((L_{j+1}^{(1)}, L_{j+1}^{(2)}, L_{j+1}^{(3)}, L_{j+1}^{(4)},), [(Y_{j+1}^{(1)}, Y_{j+1}^{(2)}, Y_{j+1}^{(3)}, Y_{j+1}^{(4)}), v_{j+1}])$ where:

$Y_{j+1}^{(i)} = f(Y_j^{(i)})$ (i=1, 2, 3, 4)

$L_{j+1}^{(0)} = v_j$ $L_{j+1}^{(i)} = f(L_{j+1}^{(i-1)}) \oplus Y_{j+1}^{(i)}$ (i=1, 2, 3, 4)

$v_{j+1} = L_{j+1}^{(4)}$;

and said H-function means is means for performing the following operation:

For $k_i=H(i, L_1, L_2, ..., L_M)$ $q_{4i+j} = L_{j+1}^{(i+1)}$ (i=0, 1, 2, 3)

$t_i^{(0)}, t_i^{(1)}, ..., t_i^{(7)})=q_1$ (i=0, 1, ..., 31)

$k_{(i+1)} = (t_{0+(i \bmod 2)}^{([i/2])}, t_{2+(i \bmod 2)}^{([i/2])}, ..., t_{30+(i \bmod 2)}^{([i/2])})$ $(i = 0, 1, ..., N-1)$.

53. A recording medium on which there is recorded a program for a computer to implement an encryption key scheduling device which inputs a master key K and generates therefrom a plurality of subkeys $k_i$ (i=1, ..., N), said program comprising:

an intermediate key generation process in which said master key K as $Y_0$ and a constant $v_0$ are input, diffusion processing of said inputs is repeated in cascade a plurality of times and an intermediate value $L_j$ (j=1, 2, ..., M) is output for each diffusion processing;

a process of storing said intermediate key $L_j$ in a storage part; and a subkey generation process in which, upon storage of a part predetermined number of intermediate value $L_1$ to $L_M$ in said intermediate value storage part a process in which information about bit positions of subkeys $k_i$ determined by i from said $L_1$ to $L_M$ is extracted and said subkeys $k_i$ are generated.

54. A recording medium on which there is recorded a program for a computer to implement an encryption key scheduling device which inputs a master key K and generates therefrom a plurality of subkeys $k_i$ (i=1, ..., N), said program comprising:

an intermediate key generation process in which said master key K as $Y_0$ and a constant $v_0$ are input, diffusion processing of said inputs is repeated in cascade a plurality of times and an intermediate value $L_j$ (j=1, 2, ..., M) is output for each diffusion processing;

a process in which, upon each generation of said intermediate value $L_j$, information about the bit position of said $L_j$ defined by i of said subkeys $k_i$ and the bit position q of said $k_i$ is extracted as bit position information for said $k_i$ and is stored in an intermediate value storage part; and a process in which, upon determination of the information about each bit position of each of said subkeys $k_i$ in said storage part, said subkey $k_i$ is output.

\* \* \* \* \*

UNITED STATES PATENT AND TRADEMARK OFFICE
CERTIFICATE OF CORRECTION

PATENT NO. : 6,769,063 B1
DATED : July 27, 2004
INVENTOR(S) : Masayuki Kanda et al.

It is certified that error appears in the above-identified patent and that said Letters Patent is hereby corrected as shown below:

<u>Title page, Item [54] and Column 1, lines 1-4,</u>
Please change the Title to read
-- DATA TRANSFORMATION DEVICE AND RECORDING MEDIUM HAVING RECORDED THEREON A PROGRAM FOR IMPLEMENTING THE SAME --

Signed and Sealed this

Seventh Day of September, 2004

JON W. DUDAS
*Director of the United States Patent and Trademark Office*